(12) United States Patent
Funayama et al.

(10) Patent No.: US 6,332,038 B1
(45) Date of Patent: Dec. 18, 2001

(54) IMAGE PROCESSING DEVICE

(75) Inventors: Ryuji Funayama, Nara; Minehiro Konya, Daito; Hajime Takezawa, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/286,475

(22) Filed: Apr. 6, 1999

(30) Foreign Application Priority Data

Apr. 13, 1998 (JP) .................................................. 10-101600

(51) Int. Cl.[7] .............................. G06K 9/00; G06K 9/36; G06K 9/66; H04N 7/18; H04N 5/225
(52) U.S. Cl. ......................... 382/190; 382/103; 382/107; 382/118; 382/203; 382/205; 382/286; 382/288; 382/298; 348/135; 348/169; 348/171
(58) Field of Search ..................................... 382/103, 107, 382/115, 118, 181, 190, 203–206, 286, 288, 293, 298; 348/77, 78, 135, 152, 169, 171

(56) References Cited

U.S. PATENT DOCUMENTS

| 5,119,439 | * | 6/1992 | Osawa et al. ........................ 382/199 |
| 5,617,484 | * | 4/1997 | Wada et al. .......................... 382/172 |
| 5,982,912 | * | 11/1999 | Fukui et al. .......................... 382/118 |
| 6,072,903 | * | 6/2000 | Maki et al. ........................... 382/190 |
| 6,081,607 | * | 6/2000 | Mori et al. ............................ 382/110 |
| 6,097,840 | * | 8/2000 | Shitani et al. ........................ 382/203 |
| 6,118,888 | * | 9/2000 | Chino et al. .......................... 382/118 |
| 6,181,806 | * | 1/2001 | Kado et al. ........................... 382/118 |

FOREIGN PATENT DOCUMENTS 7-93561 A    4/1995   (JP) .

OTHER PUBLICATIONS

Fukui, "Contour Extraction Method Based on Separability of Image Features", Electronic Information and Communications Association, vol. J80–D–II, No. 6, Jun. 1997, pp. 1406–1414.

* cited by examiner

Primary Examiner—Leo Boudreau
Assistant Examiner—Daniel G. Mariam
(74) Attorney, Agent, or Firm—Nixon & Vanderhye P.C.

(57) ABSTRACT

The present image processing device includes an image obtaining device which obtains an electronic image (still image) or a series of electronic images (moving image), an image extraction processing device which performs image extraction processing for extracting from the image obtained by the image obtaining device a specified object domain an operator wishes to cut out, and a result output device which outputs an image extracted by the image extraction processing device. The image extraction processing device sets two mutually exclusive provisional domains in the obtained image, and, based on separability of the provisional domains, extracts a partial image containing the specified object domain.

58 Claims, 37 Drawing Sheets

FIG.14(a)
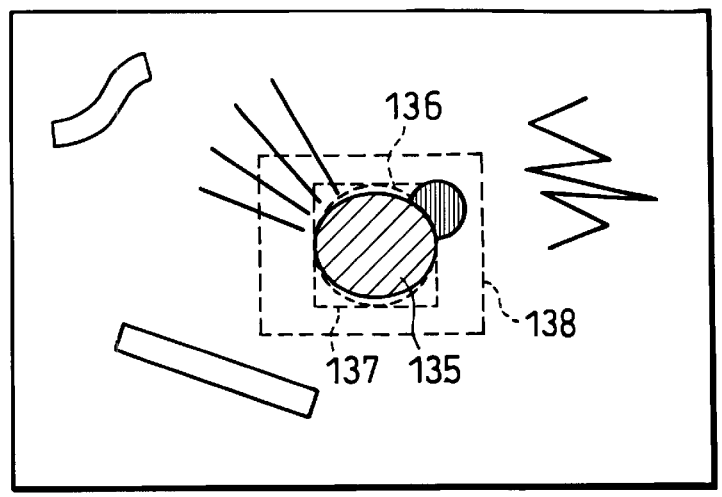
FIG.14(b)
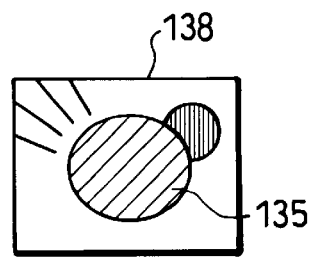
FIG.15
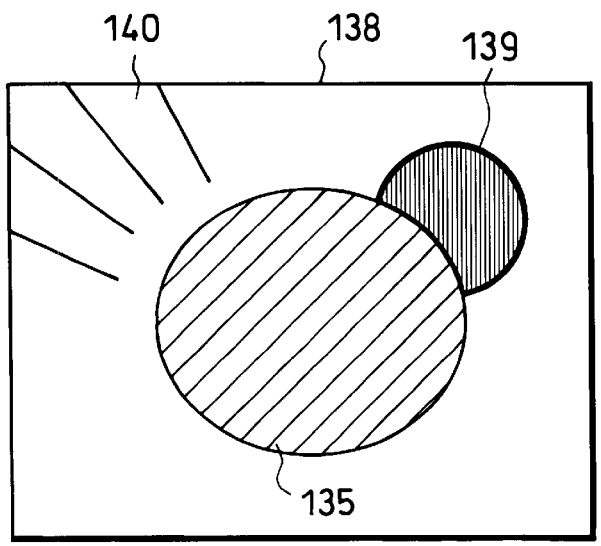

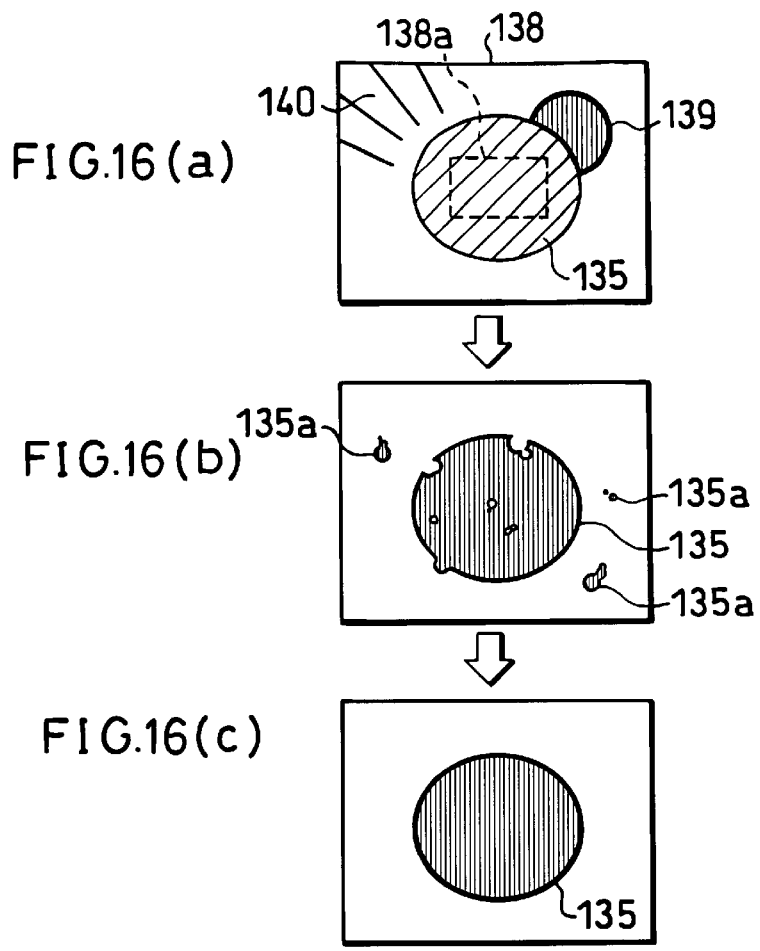
FIG.16(a)
FIG.16(b)
FIG.16(c)
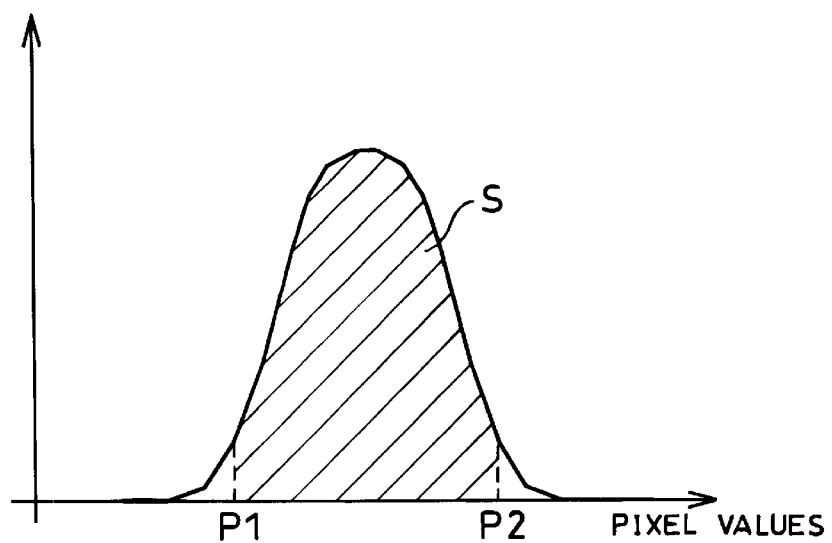
FIG.17

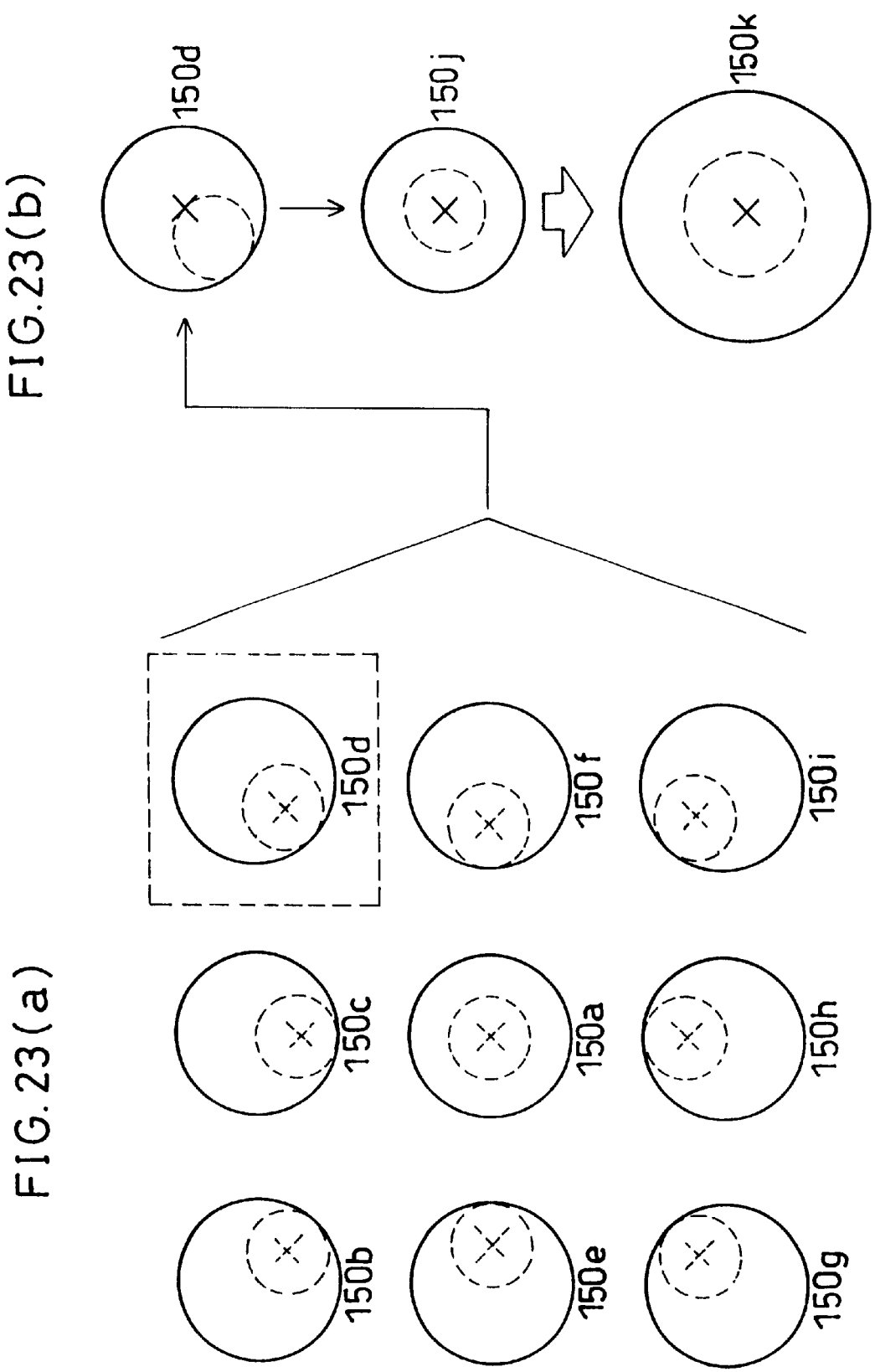

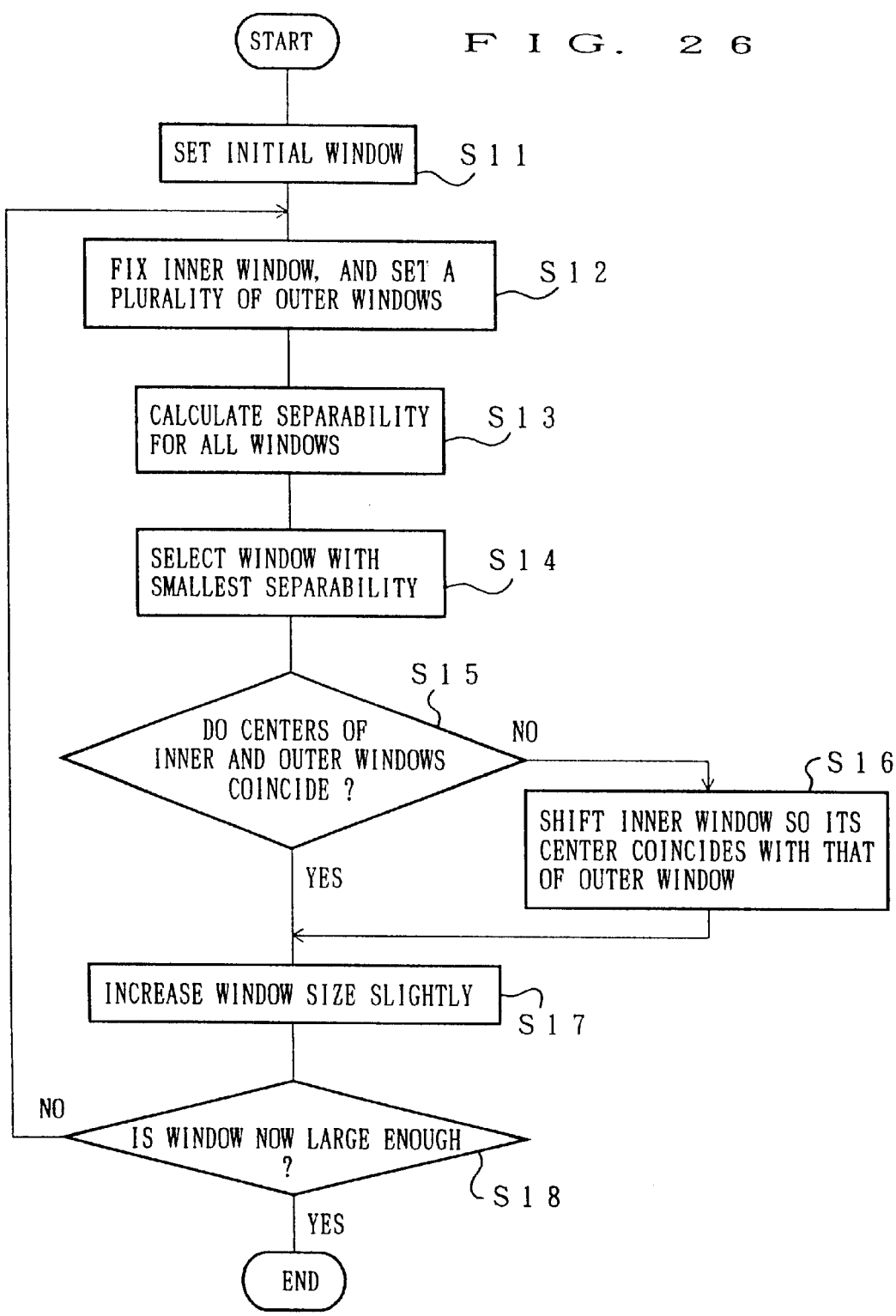

34a
34b

34c

34d

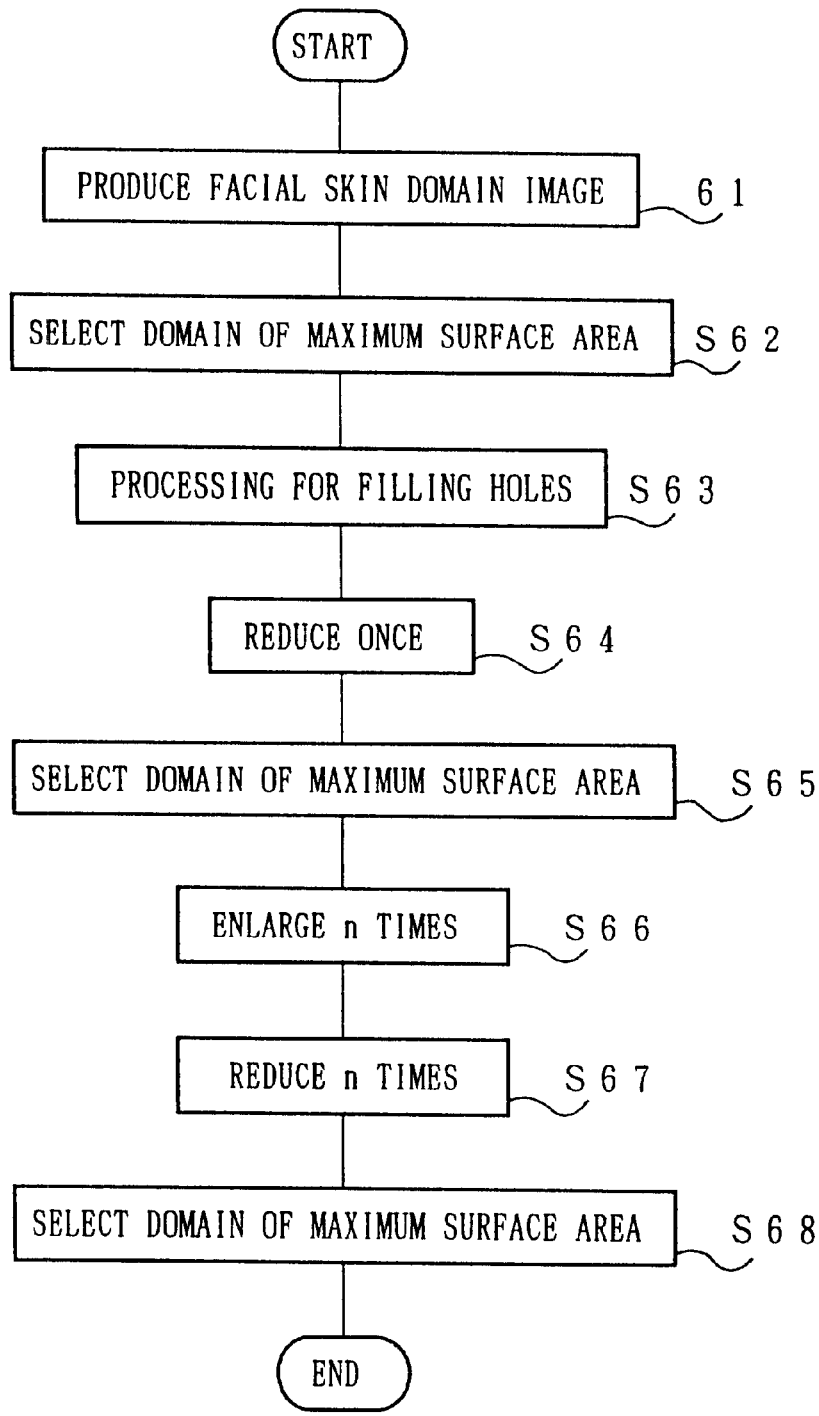

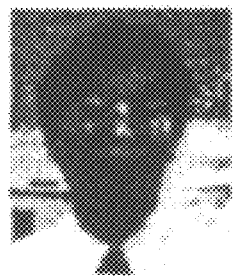 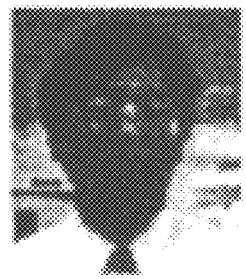 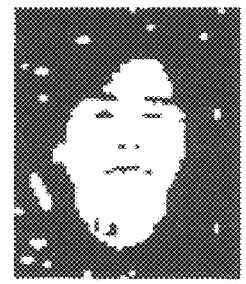 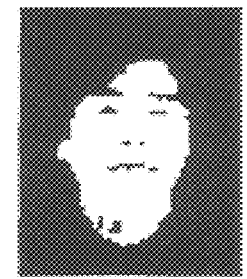
FIG.38(a)   FIG.38(b)   FIG.38(c)   FIG.38(d)
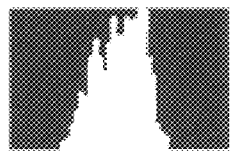
FIG.38(h)
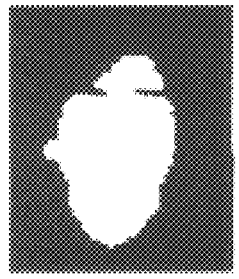 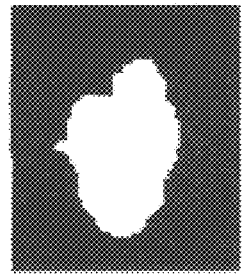 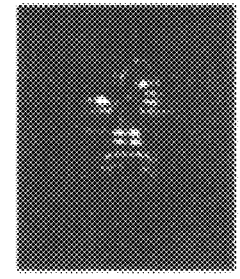
FIG.38(e)   FIG.38(f)   FIG.38(g)

 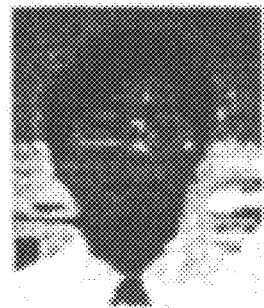 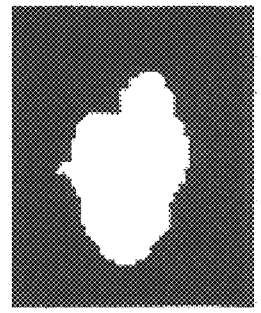
FIG.42(a)  FIG.42(b)  FIG.42(c)
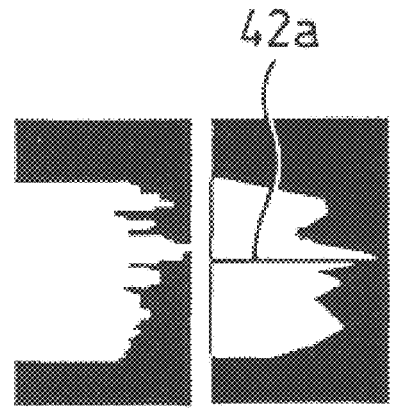 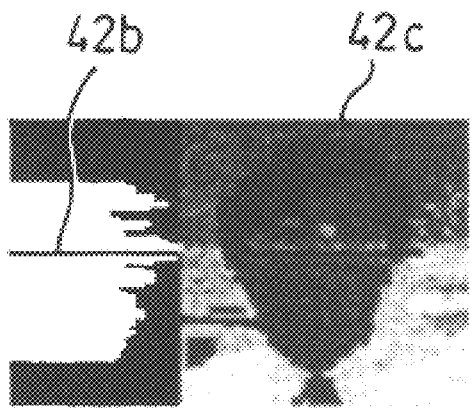
FIG.42(d) FIG.42(e)  FIG.42(f) FIG.42(g)

IMAGE PROCESSING DEVICE

FIELD OF THE INVENTION

The present invention relates to an image processing device for processing electronic images (still images and moving images), for use in video decks, video cameras, personal computers, word processors, work stations, office computers, portable information tools, copy machines, scanner devices, facsimile devices, televisions, TV telephones, teleconferencing systems, etc.

BACKGROUND OF THE INVENTION

Generally, when extracting from an obtained image an image containing a specific object domain such as a target image, human face, etc. (an image for extraction), the image extraction method differs depending on whether the obtained image is printed on paper or is in an electronically converted state.

For example, when an obtained image is printed on paper as a photograph, etc., an image for extraction can be extracted from the obtained image by cutting the target image out of the base image (photograph, etc.) using scissors, a cutter knife, etc. (image extraction method (1)).

With an image which has been electronically converted by an image obtaining device such as a CCD (charge coupled device) camera or scanner device, the image for extraction can be extracted from the obtained image by performing image processing (image extraction processing) on the base image obtained by the image obtaining device (hereinafter referred to as the "base image") using a computer, etc. (image extraction method (2)).

With image extraction method (1), the operations of actually cutting out the image for extraction using the scissors, cutter knife, etc. involve great effort, and experience is necessary to cut out the image for extraction from the base image in such a way that the target object is arranged in a balanced manner.

With image extraction method (2), in contrast, in a personal computer, etc., the image for extraction is extracted from the base image using software for image extraction.

In image extraction method (2), generally, the base image is displayed on a display device such as a monitor, and the operator specifies a desired image for extraction by indicating coordinates using a coordinate input device such as a mouse. Consequently, although the operator must become accustomed to using the software, less experience is required than in the case of image extraction method (1), and it is easy to cut out the image for extraction from the base image in such a way that the target object is arranged in a balanced manner.

Further, in image extraction method (2), one way to identify whether an image for extraction from the base image is an image containing a desired specified object domain is for the operator to perform this identification using the mouse, etc., while viewing the base image on the display device. Another method of identifying images for extraction which has been proposed is to identify images for extraction by means of a predetermined calculation method.

One example of a method of identifying images for extraction by calculation is template matching. In template matching, feature patterns possessed by objects (specific object domains) to be extracted are stored in memory in advance, and then a difference between a stored feature pattern and a corresponding feature pattern of a specified object domain of the base image is calculated to obtain an evaluation quantity. If the evaluation quantity is a value within a predetermined range, the feature pattern of the specified object domain is judged to be equivalent to the stored feature pattern, and thus an image for extraction is identified in the base image.

After identifying, as above, an image for extraction from the base image, it is then necessary to specify the specified object domain. The specified object domain is specified by setting initial values based on the shapes of the feature patterns of the specified object domains used in pattern matching for identifying the image for extraction, and then specifying a specified object domain in the image for extraction using a dynamic contour model, dynamic grid model, etc.

For example, when the foregoing specified object domain is a human face, by using a probability density function derived from a color distribution of human faces, skin areas of faces can be separated from the base image.

Further, since a moving image is an image series made up of still images arranged in a time sequence, in order to follow a specified object domain in a moving image, the foregoing method is applied, namely, an image for extraction is first identified in the base image, and then a specified object domain is specified in the image for extraction.

Specifically, first, the moving image is displayed on the display device as a series of still images. These images are treated as base images. Then, images for extraction are identified in the first base image in the series using an image tool (a coordinate input device such as a mouse) or by template matching.

Here, when using an image tool such as a mouse to identify images for extraction, a domain indicated using the image tool is stored in memory as a feature pattern, as are the position and size of the indicated domain. When identifying images for extraction by template matching, on the other hand, the size of the feature pattern used to determine the identified domain is stored in memory, as is the position of the domain of the base image corresponding to this feature pattern.

Then, for the second image of the image series, a plurality of combinations of feature pattern size and position, each altered slightly from those stored for the first image, are prepared, and evaluation values are calculated by comparing each of these combinations with the second image. This yields a plurality of evaluation values, and, using the best evaluation value, i.e., the one for which the stored feature pattern and a corresponding portion of the second image are the most similar, the size and position of the stored feature pattern are used to extract from the second image the image for extraction, which contains therein a specified object domain.

The foregoing processing is then performed on the third image of the series, and by performing this processing in turn for each subsequent image of the series, it is possible to follow a specified object domain in the moving image. Generally, in this sequence of processing, the stored feature pattern is replaced with a new feature pattern from time to time.

Accordingly, when the specified object domain to be followed in the moving image is a human face, if the feature pattern stored in advance is a probability density function derived, as described above, from a color distribution of human faces, skin areas of human faces can be separated from the base images. In other words, a human face can be followed in a moving image.

However, when using a personal computer and image processing software to extract a target object, i.e., an image for extraction containing therein a specified object domain, from an electronically converted base image obtained by a CCD camera, etc., cutting out a portion of the base image so that it contains a specified object domain, and, moreover, so that the target object is arranged in a balanced manner therein, requires some amount of experience, just as in the case of image extraction method (1) above using a photograph and scissors.

For example, when the specified object domain of an image for extraction is positioned on an edge of the screen, in order to cut out the image for extraction in such a way that the specified object domain is arranged in a balanced manner within the image for extraction, it is necessary to first cut out the image for extraction, and then to change its position so that the specified object domain is in the center of the image for extraction. Thus the operations of image extraction are very complicated.

Further, when using a method such as template matching to identify images for extracting from a base image, a difference must be calculated between the stored feature patterns and each position of the base image, thus necessitating a large quantity of calculations.

Moreover, when the size of the feature patterns contained in the base image is unknown, it is necessary to prepare stored feature patterns in a range of sizes from small to large, and to calculate differences between each of these and each position of the base image. This further increases the quantity of calculations.

In addition, when a feature pattern contained in the base image has been deformed or rotated, or when a feature pattern for which illumination conditions have been stored differs greatly between the stored conditions and the way it actually appears in the base image, the template matching method is unable to satisfactorily identify images for extraction from the base image.

Further, when specifying a specified object domain in an image for extraction, the dynamic contour model or dynamic grid model is used, but the dynamic contour model has the following problems. Namely, since what is extracted is the contour (outline) of a specified object domain, a domain surrounded by such a contour is generally considered to be a specified object domain. Accordingly, since the evaluation value obtained by calculating a difference is a convergence with a minimal value, a contour which is not the contour of the target object, but another contour, may be extracted.

With the dynamic grid model, too, like the dynamic contour model, a domain may be extracted in error if the evaluation value arrives at a local solution.

Moreover, both models are forms of processing which require many repeated computations, and necessitate a large quantity of calculations. In particular, the dynamic grid model requires a very large quantity of calculations for each computation, and thus necessitates an even larger quantity of calculations than the dynamic contour model.

Further, when the specified object domain to be specified in the image for extraction is a human face, a probability density function is first derived from a color distribution of human faces, and then applied to the base image to separate skin areas of faces therefrom, but when the illumination conditions at the time of derivation of the probability density function differ greatly from the illumination conditions when extracting the specified object domain from the base image, the specified object domain cannot be accurately specified from the base image.

Further, conventional processing for following a specified object domain in a moving image has the same problems as the processing with still images discussed above.

SUMMARY OF THE INVENTION

It is an object of the present invention to provide an image processing device capable of performing image processing which, when extracting a target object from a base image, does not require that an operator have a large amount of experience, which can accurately specify a specified object domain quickly and regardless of illumination conditions, and which can also accurately perform processing for following a specified object domain in a moving image.

In order to attain the foregoing object, an image processing device according to the present invention extracts from an image obtained from outside the device a partial image containing a specified object domain for extraction, and includes: image extraction processing means, which set two mutually exclusive provisional domains in the obtained image, and extract the partial image based on separability of the two provisional domains.

In the foregoing structure, a partial image containing a specified object domain is extracted from the obtained image based on separability of two set provisional domains. Accordingly, the specified object domain to be extracted can be clearly distinguished from other image domains. In other words, by calculating separability of the two provisional domains, it is possible to detect a state in which the specified object domain is contained in the provisional domains.

In this way, when a state is detected in which the specified object domain is contained in the provisional domains, if an image containing the provisional domains is extracted as the partial image, the specified object domain is necessarily arranged in a balanced manner in the partial image.

Accordingly, using the foregoing image extraction processing means, a partial image containing a specified object domain can be extracted quickly and with certainty, such that the specified object domain is arranged in a balanced manner therein.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 14(a) and 14(b) are explanatory drawings schematically showing image extraction processing, with FIG. 14(a) showing a base image, and FIG. 14(b) showing an image for extraction extracted from the base image shown in FIG. 14(a).

FIG. 15 is an enlarged view of the image for extraction shown in FIG. 14(b).

FIGS. 16(a) through 16(c) are explanatory drawings showing processing for extracting a specified object domain from the image for extraction shown in FIG. 15.

FIG. 17 is a graph showing a normal probability density function expressing a distribution of pixel values of pixels within an image domain.

FIGS. 23(a) and 23(b) are explanatory drawings showing execution of a process for measuring separability while suitably shifting the center of a window.

FIG. 26 is a flow-chart showing the flow of processing for extraction from a base image using separability windows.

FIG. 37 is a flow-chart showing the flow of processing for producing a facial mask.

FIGS. 38(a) through 38(h) are explanatory drawings showing the flow of preparation of a facial mask.

FIGS. 42(a) through 42(g) are drawings explaining processing for detecting the vertical position of the nose.

DESCRIPTION OF THE EMBODIMENTS

First Embodiment

Figure 1:
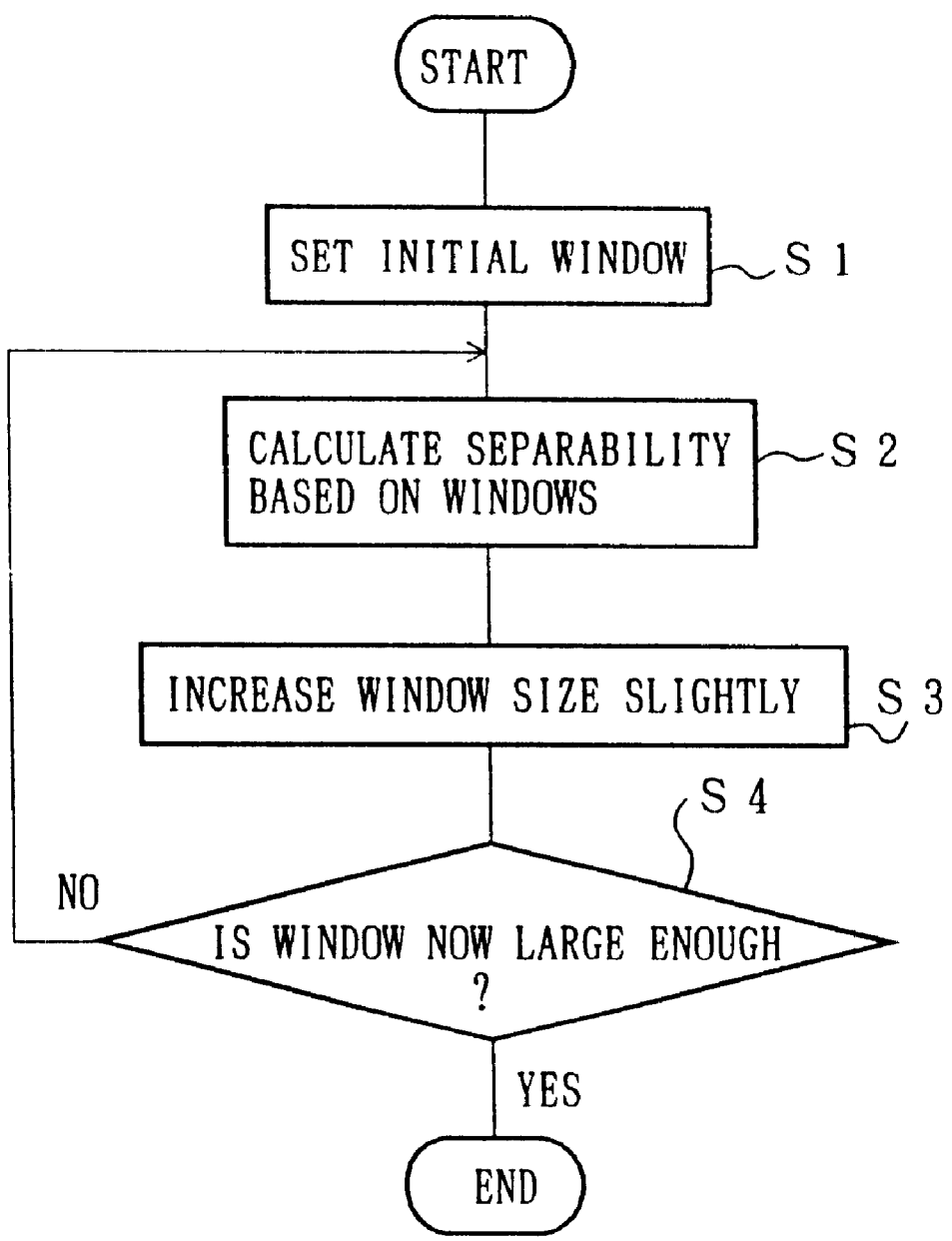
FIG. 1 is a flow-chart showing the flow of image extraction processing in an image processing device according to the present invention.

The following will explain one embodiment of the present invention.

The image processing device according to the present embodiment is a device which performs processing for extracting from an image inputted into the device from the exterior thereof, i.e., an image obtained from the exterior of the device (hereinafter referred to as the "base image") an object contained therein, for example, for extracting from a photograph a human face the operator wishes to cut out.

As shown in, for example, FIG. 2, the present image processing device includes an image obtaining device 11 (image obtaining means) for obtaining an electronic image (still image) or series of electronic images (moving image); an image extraction processing device 12 for performing image extraction processing, in which an image domain containing an object the operator wishes to cut out (hereinafter referred to as the "specified object domain") is extracted from the base image obtained by the image obtaining device 11; a result output device 13, for outputting the image extracted by the image extraction processing device 12; and a processing information recording and reproducing device 14, for recording and/or reproducing information relating to the processing performed by the image extraction processing device 12.

The processing information recording and reproducing device 14 is a device which performs recording and reproducing of information in a recording medium readable by a computer contained in the image extraction processing device 12. For the processing information recording and reproducing device 14, an external recording and reproducing device is used, such as a floppy disk drive, CD-ROM drive, magneto-optical disk drive, etc. As the recording medium, the foregoing floppy disk drive uses a floppy disk, the foregoing CD-ROM drive uses a CD-ROM disk, and the magneto-optical disk drive uses a magneto-optical disk. For a processing information recording and reproducing device 14 of another type, it goes without saying that a recording medium corresponding to the device is used.

In the recording medium are recorded processing programs necessary for the processing performed by the image extraction processing device 12, various data needed in this processing, etc., and, as needed, information processed by the image extraction processing device 12. The details of the recording medium will be discussed later.

Accordingly, the processing information recording and reproducing device 14 records in the recording medium information processed in the image extraction processing device 12, and also reads from the recording medium and sends to the image extraction processing device 12 processing information, such as processing programs, various processing data, etc. necessary in the processing performed by the image extraction processing device 12.

Further, the processing information recording and reproducing device 14 can function in place of the image obtaining device 11 by reproducing a recording medium which records image information which is the object of the processing performed by the image extraction processing device 12, and sending this image information to the image extraction processing device 12.

When, conversely, the image obtaining device 11 also serves as the processing information recording and reproducing device 14, the image obtaining device 11 may be a device which obtains a digital still or moving image from a recording medium such as a floppy disk, CD-ROM, hard disk, magneto-optical disk, digital video disk, etc. If a CD-ROM or digital video disk is used, one capable of both recording and reproducing of information is used.

Further, examples of devices which may be used as the image obtaining device 11 include a device such as a scanner device, which obtains a digital still image from a still image such as a photograph or printed image; an analog/digital conversion device, which converts an analog moving image obtained from television or video to a digital moving image; a digital image obtaining device, such as a digital camera or digital video camera, which obtains a digital still or moving image; and a device which obtains a digital still or moving image from a network such as the Internet or a LAN.

An image obtained in one of the foregoing ways is sent to the image extraction processing device 12, where it undergoes predetermined image extraction processing, and the result of this processing is sent to the result output device 13, in order to inform the operator of the result of processing.

As the result output device 13, a display device such as a monitor, which displays a specified object domain extracted by the image extraction processing device 12, or another electronic device (printer, etc.), is used.

The image extraction processing device 12 includes a memory section 15 and a computing section 16, and performs processing in which provisional domains are used to extract a specified object domain from a base image obtained by the image obtaining device 11. Here, a provisional domain is an image domain which contains a specified object domain the operator wishes to cut out. The details of image extraction processing using the provisional domains will be discussed later.

Figure 3:
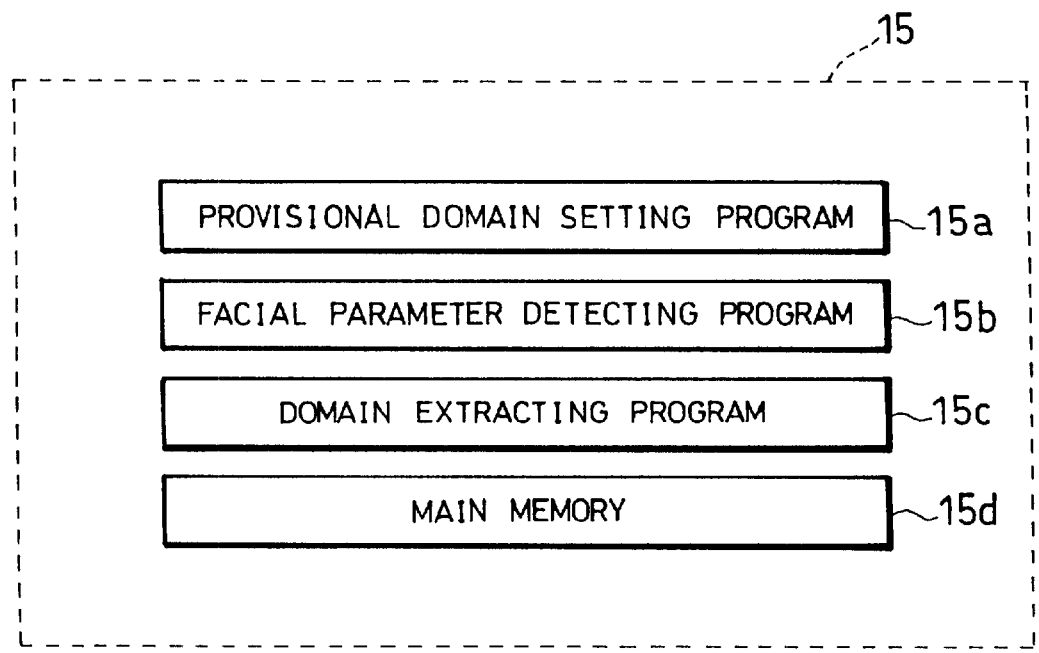
FIG. 3 is an explanatory drawing showing the details of a memory section of the image processing device shown in FIG. 2.

As shown in FIG. 3, the memory section 15 of the image extraction processing device 12 is made up of a ROM (not shown) for storing processing programs such as a provisional domain setting program 15a, a facial parameter detecting program 15b, a domain extracting program 15c, etc.; and a RAM (not shown), which is a main memory 15d for temporarily storing the base image, and for temporarily storing the processing programs stored in the ROM, etc.

The provisional domain setting program 15a is a program for setting a shape for provisional domains necessary to calculate separability (to be discussed below). The present embodiment uses as the provisional domain setting program 15a a program which allows the operator to freely draw the shape for the provisional domains using a coordinate input device such as a pen or a mouse.

The facial parameter detecting program 15b is a program for detecting facial parameters such as facial width, vertical axis of symmetry, vertical positions of eyes, nose, and mouth, etc. The present embodiment uses for the facial parameter detecting program 15b a program which is a method of detecting the vertical positions of, for example, eyes, nose, and mouth, i.e., a method which uses histograms which project in a horizontal direction brightness values of a facial image corresponding to an extracted facial skin domain. The details of processing with this kind of facial parameter detecting program 15b will be discussed in the third embodiment below.

The domain extracting program 15c is a program for extracting a domain containing an object. The present embodiment uses for the domain extracting program 15c a program which calculates a probability density function on the assumption that a distribution of pixel values within a set provisional domain (a provisional domain differing from the provisional domain used to calculate separability) is a normal distribution, and extracts the domain containing the object by applying this probability density function to the base image.

Figure 18:
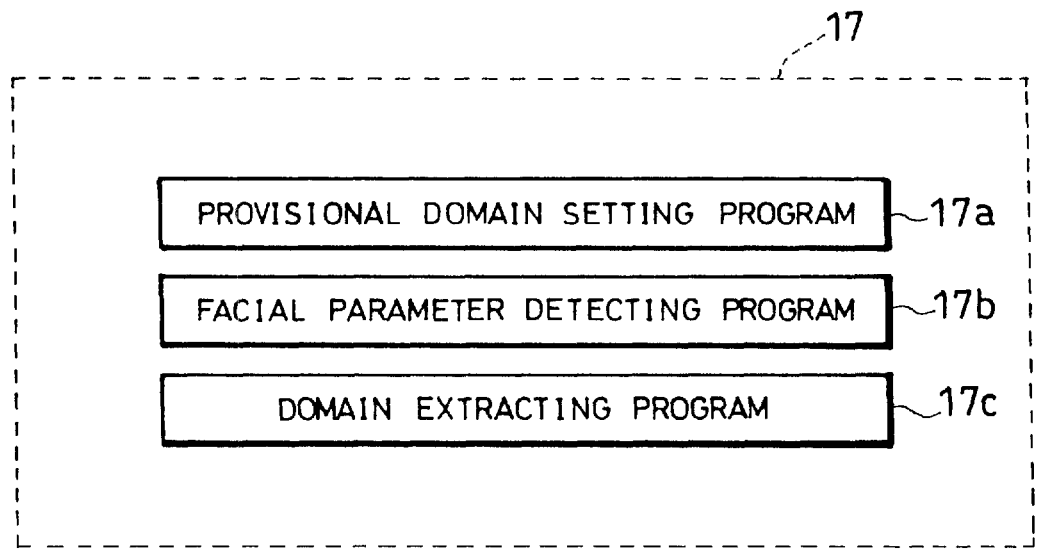
FIG. 18 is an explanatory drawing showing a recording medium which records, as a computer-readable program, the contents stored in the memory section of the image processing device shown in FIG. 2.

Each of the foregoing programs may, as discussed above, be stored in advance in the ROM, or, as shown in FIG. 18, they may be recorded in a recording medium 17 such as a CD-ROM or a floppy disk. In this case, it is sufficient to record in the recording medium 17 at least one of a provisional domain setting program 17a, a facial parameter detecting program 17b, and a domain extracting program 17c as image extraction processing program(s) Remaining programs may be stored in the ROM of the memory section 15.

Figure 4:
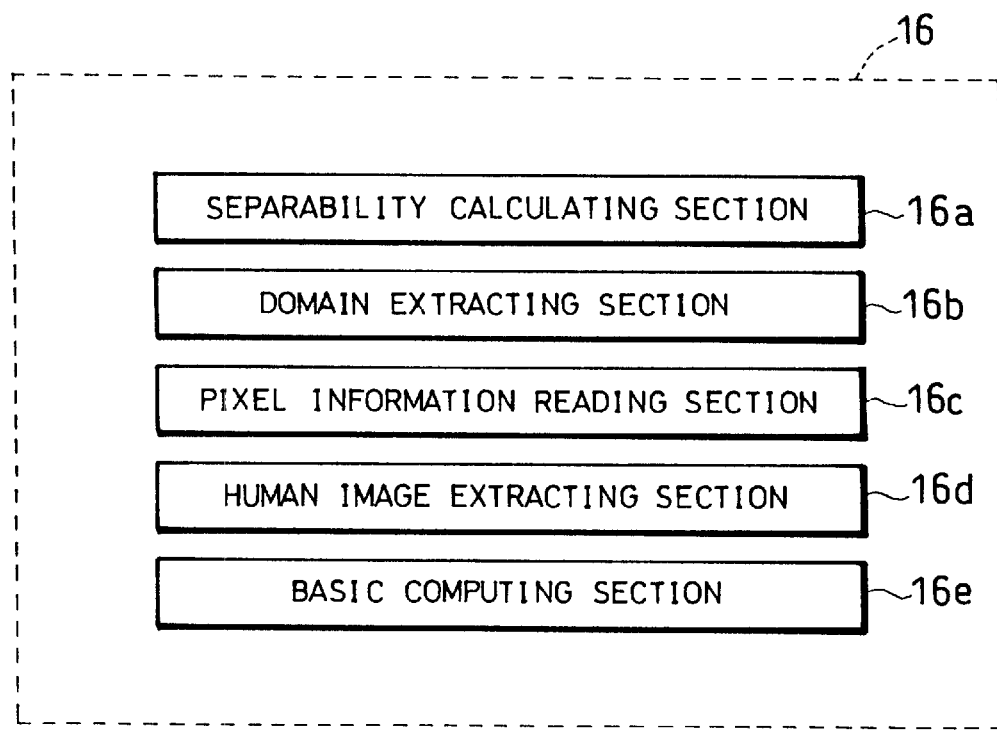
FIG. 4 is an explanatory drawing showing the details of a computing section of the image processing device shown in FIG. 2.

Next, as shown in FIG. 4, the computing section 16 of the image extraction processing device 12 is made up of various processing sections for performing the processing to be performed on the base image obtained by the image obtaining device 11. Specifically, the computing section 16 (image extraction processing means) includes a separability calculating section 16a (calculating means), a domain extracting section 16b, a pixel information reading section 16c, a human image extracting section 16d, and a basic computing section 16e, and performs various processing in concert with the processing programs stored in the memory section 15, image data of the base image, etc.

The separability calculating section 16a is a processing section which calculates separability of two provisional domains. When a given group is divided into two classes, separability generally means the proportion of variation of the entire group accounted for by variation between the two classes. Separability is a maximum value of 1 when the two classes are completely separate, and closer to a minimum value of 0 when the two classes are not completely separate. Accordingly, separability is used in determining an optimum threshold in binarization. The details of calculation of separability by the separability calculating section 16a will be discussed later.

The domain extracting section 16b is a processing section which extracts a domain containing an object on the basis of pixel information of the provisional domains set by executing the provisional domain setting program 15a.

The pixel information reading section 16c is a processing section which reads out pixel information from the base image stored in the memory section 15.

The human image extracting section 16d is a processing section which cuts out human images from the base image on the basis of the facial parameters detected by executing the facial parameter detecting program 15b.

The basic computing section 16e is a processing section which performs basic computing such as addition, subtraction, multiplication, and division.

The following will explain processing for extracting a specified object domain from a base image. The processing explained below is performed by the image extraction processing device 12.

First, setting of provisional domains in the base image will be explained.

Figure 5:
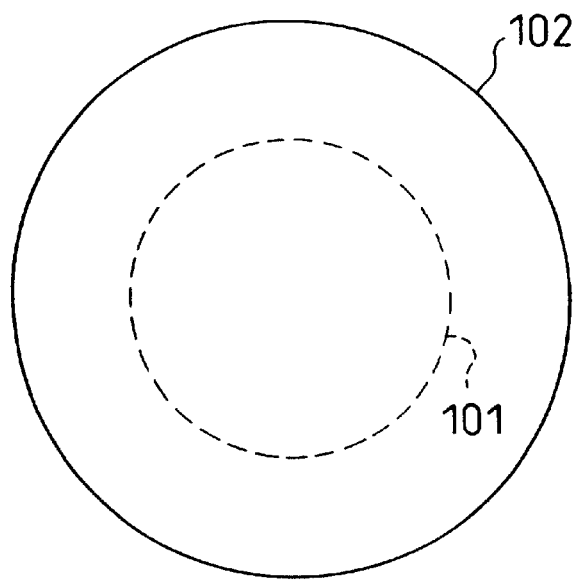
FIG. 5 is an explanatory drawing showing windows used in image extraction in the image processing device shown in FIG. 2.
Figure 6:
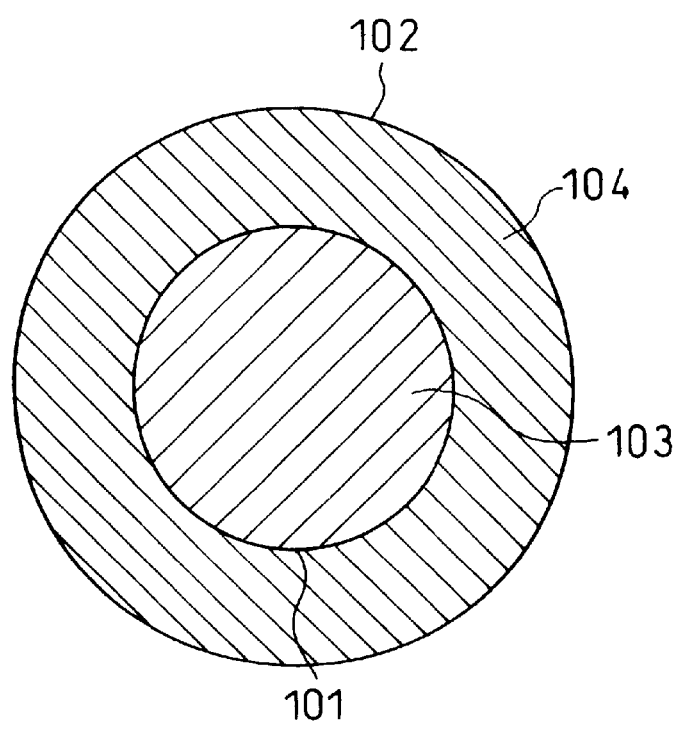
FIG. 6 is an explanatory drawing showing windows used in image extraction in the image processing device shown in FIG. 2.

When the shape of the object to be extracted (hereinafter referred to simply as the "object") is already known, for example, if the shape of the object is circular as shown in FIG. 5, a first circle 101 and a second circle 102 of different sizes, which are concentric circles, are set. Then, as shown in FIG. 6, the domain enclosed by the first circle 101 is a first provisional domain 103 (first window), and the domain enclosed by the second circle 102 but excluding the domain enclosed by the first circle 101 is a second provisional domain 104 (second window).

Figure 7C:
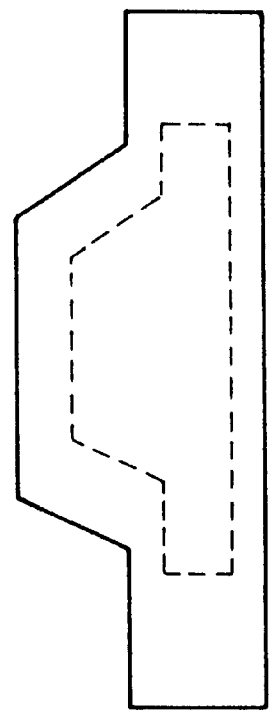
FIGS. 7(a) through 7(c) are explanatory drawings showing various shapes for the foregoing windows, with FIG. 7(a) showing rectangular windows, FIG. 7(b) oval windows, and FIG. 7(c) windows shaped like an automobile.
Figure 7B:
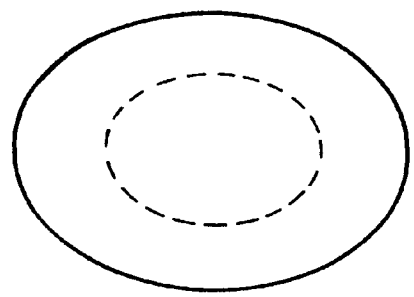
Figure 7A:
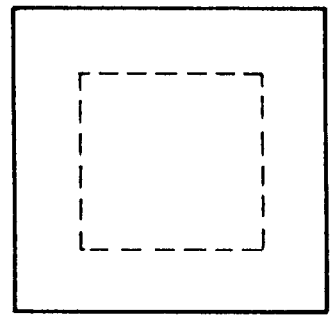

In this way, if the shape of the object the operator wishes to cut out is circular, circular windows are set, and if it is another previously known shape, windows of that shape are set. In other words, if the shape of the object is already known, it is preferable for the shape of the windows to correspond to the shape of the object. For example, if the object is rectangular, as shown in FIG. 7(a), rectangular windows are set. Again, if the object is oval, as shown in FIG. 7(b), oval windows are set. Again, if the object is shaped like an automobile, as shown in FIG. 7(c), it is preferable to set automobile-shaped windows.

Specifically, in the image extraction processing device 12, the provisional domain setting program 15a stored in the memory section 15 is executed by the computing section 16, thus setting desired windows in the base image.

The following will explain, with reference to the flow-chart in FIG. 1, processing for extracting a domain for extraction using windows set as above.

Figure 8:
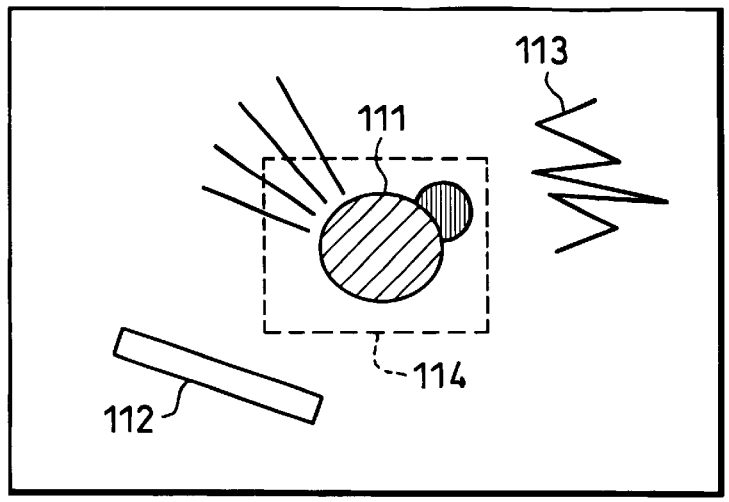
FIGS. 8(a) and 8(b) are explanatory drawings schematically showing image extraction processing, with FIG. 8(a) showing a base image, and FIG. 8(b) showing an image for extraction extracted from the base image shown in FIG. 8(a).
Figure 8:
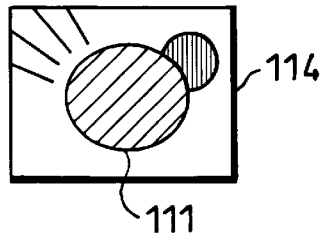

Here, if a base image obtained by the image obtaining device 11 is, for example, an image like that shown in FIG. 8(a), in which objects 111 through 113 are present on the display screen, and if the object the operator wishes to extract from the base image is a circular object 111, the foregoing processing involves extracting an image for extraction 114, shown in FIG. 8(b), which is made up of an extracted domain containing the object 111. Here, an image for extraction is a partial image cut out from the base image in such a way as to contain the specified object domain.

First, an initial window is set (S1).

Figure 9:
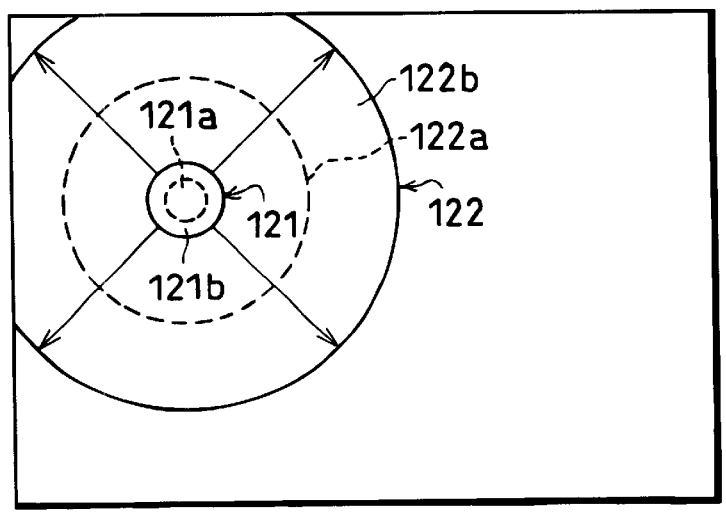
FIG. 9 is an explanatory drawing showing processing for enlarging the foregoing windows.

Specifically, a window of initial size (an initial window) is set at a desired position in the base image. Since, as shown in FIG. 8(a), the object 111 which is to be extracted from the base image is circular, the image extraction processing device 12 sets an initial window 121, shown in FIG. 9, at a desired position in the base image.

The initial window 121 includes two concentric circles of differing radius, and the two circles delineate a first window 121a, which is a domain enclosed by the inner circle, and a second window 121b, which is a domain enclosed by the outer circle but excluding the first window 121a.

The sizes of the windows making up the initial window 121 are set depending on the possible sizes of the object to be extracted, etc., but are usually set to a size smaller than the base image.

Next, based on the windows, separability is calculated (S2).

Specifically, image information contained in the two windows (the first window 121a and the second window 121b) is obtained. Here, image information means the number of pixels contained within each window, and the pixel value of each pixel. Pixel value is a value possessed by each pixel; for example, when the base image is a dark/light image, pixel value is a brightness value. Then, in the image extraction processing device 12, on the basis of pixel values obtained by the separability calculating section 16a of the computing section 16, a separability η of the first window 121a and the second window 121b is calculated.

The separability η is calculated by the separability calculating section 16a, as follows. For example, in FIG. 9, $P_{inner}$ is the inner domain (the first window 121a), $P_{outer}$ is the outer domain (the second window 121b) and P is a domain including both inner and outer domains. Further, $n_{inner}$ is the number of pixels contained within the domain $P_{inner}$, $n_{outer}$ is the number of pixels contained within the domain $P_{outer}$, and N is the number of pixels contained within the domain P, i.e., $n_{inner}+n_{outer}$. Then, if $P_i$ is a pixel value at a given location i within the domain P, P~ is a mean pixel value of the pixels within the domain P, $P_{inner}$~ is a mean pixel value of the pixels within the domain $P_{inner}$, and $P_{outer}$~ is a mean pixel value of the pixels within the domain $P_{outer}$, then the following Equations (1) through (3) can be derived.

$$\eta = \frac{\sigma_b^2}{\sigma_T^2} \quad (1)$$

$$\sigma_b^2 = n_{inner}(\overline{P_{inner}}-P)^2 + n_{outer}(\overline{P_{outer}}-P)^2 \quad (2)$$

$$\sigma_T^2 = \sum_{i=1}^{N} (P_i - \overline{P})^2 \qquad (3)$$

$N = n_{inner+nouter}$

In Equations (1) through (3), $\overline{P}$ indicates P~ (the mean of the pixel values in the domain P); $\overline{P_{inner}}$ indicates $P_{inner}$~ (the mean of the pixel values in the domain $P_{inner}$); and $\overline{P_{outer}}$ indicates $P_{outer}$~ (the mean of the pixel values in the domain $P_{outer}$).

Separability η, calculated as above, is then temporarily stored in the main memory 15d of the memory section 15 of the image extraction processing device 12.

Next, the size of the window is slightly increased, and separability is calculated for the enlarged window (S3).

Specifically, in the image extraction processing device 12, the domain extracting section 16b of the computing section 16, on the basis of the calculated separability η, slightly increases the size of the initial window 121, thereby setting an enlarged window 122. During enlargement of the window, the center of the window is not changed. For example, if the initial window 121 is circular, the enlarged window 122 is set by increasing the radius of the circle while keeping its center fixed.

When the sizes of the first and second windows 121a and 121b have been set in advance, the foregoing enlargement may be performed by multiplying these set sizes by a fixed number of times. Accordingly, the enlarged window 122, like the initial window 121, includes two concentric circles of different radius, and the two circles delineate a first window 122a, which is a domain enclosed by the inner circle, and a second window 122b, which is a domain enclosed by the outer circle but excluding the first window 122a.

Next, it is determined whether the window is now large enough (S4).

Here, separability of the first and second windows 122a and 122b of the enlarged window 122 is calculated in the same way as separability of the first and second windows 121a and 121b of the initial window 121.

As explained above, the separability calculating section 16a of the computing section 16 gradually enlarges the window while calculating separability at the time of each enlargement, and when it is determined that the window is of sufficient size, stops enlargement of the window and calculation of separability.

If it is determined that the window is not yet of sufficient size, processing returns to S2, and window enlargement and calculation of separability are performed again.

"Sufficient size" is, for example, the size at the time the boundary of the inner window exceeds the limits of the screen. Here, "screen" means the extent of the base image initially obtained by the operator. By setting the window in this way, the window can be used to extract an image containing the specified object (an image for extraction), as will be discussed below.

Figure 10:
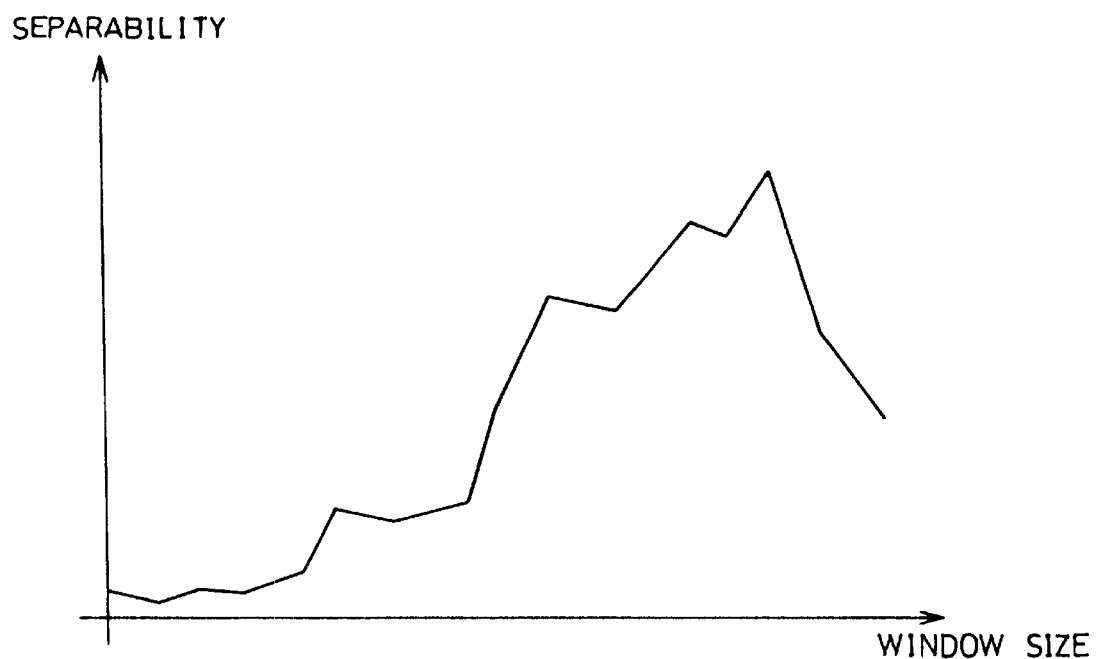
FIG. 10 is a graph showing a relationship between window size and separability when the windows shown in FIG. 9 are enlarged.

The foregoing process makes it possible to observe a transition in separability as a window centered on a specific position of the base image (inputted image) is gradually enlarged. In other words, for a given position on the specified object, a graph can be obtained of the transition in separability, like that shown in FIG. 10. Since the base image has been quantized, the foregoing graph can be obtained for a pixel located in a given position on the specified object. The process of obtaining a graph of transition in separability for a given pixel of the base image is called the separability measurement process.

Figure 11:
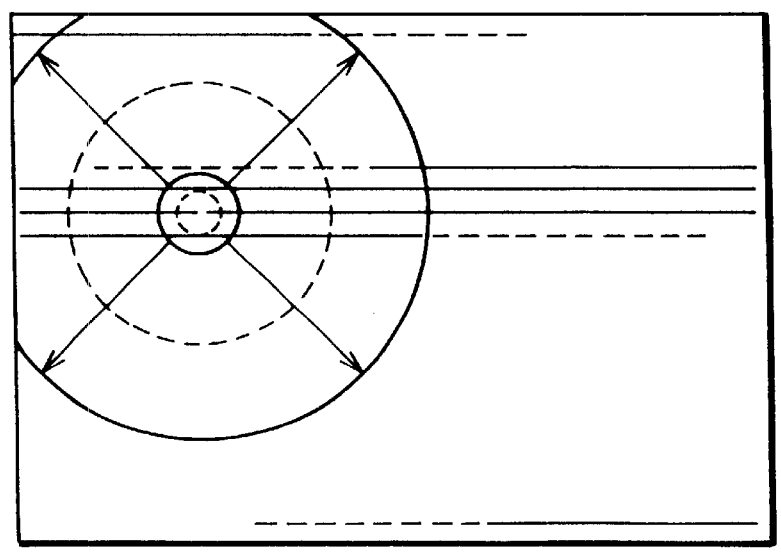
FIG. 11 is an explanatory drawing showing a separability measurement process performed by the image processing device shown in FIG. 2.

In the present embodiment, the foregoing separability measurement process is performed for every pixel of the base image. For example, in the base image shown in FIG. 11, the separability measurement process is carried out for each pixel in turn, beginning with the pixel in the upper left-hand corner, and ending with the pixel in the lower right-hand corner. Then, among the plurality of separability transition graphs obtained in this way, for graphs in which separability values and transition conform to fixed rules, window position and window size are stored in the memory section 15 of the image extraction processing device 12.

Here, the fixed rules are provided so as to set a threshold value for separability, and to store in the memory section 15 the position and size of the window when separability calculated by the separability measurement process exceeds the threshold value.

Accordingly, when separability calculated by the separability measurement process does not exceed the threshold value, it is judged unlikely that the window contains a specified object domain, and separability is measured for the next window.

Next, with reference to FIG. 12, the manner of obtaining the transition in separability will be explained.

Figure 12:
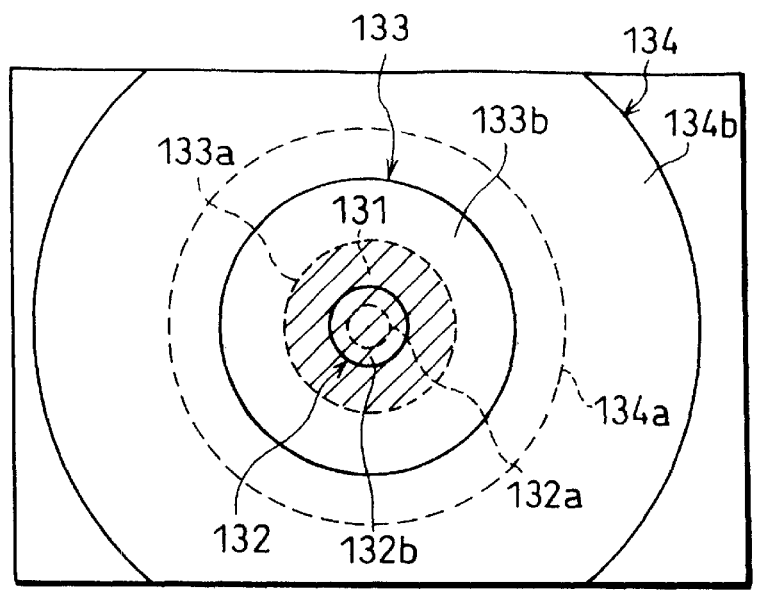
FIG. 12 is an explanatory drawing showing transition in separability of the foregoing windows.

Here, as shown in FIG. 12, a single circular domain 131, made up of pixels of equivalent pixel value, is present against a uniform background. The following will explain transition of separability when the window for calculation of separability is also circular. FIG. 12 shows performance of the separability measurement process when the center of the window coincides with the center of the circular domain 131.

FIG. 12 shows examples of three windows set in the base image. For example, the innermost window is an initial window 132, which is made up of a first window 132a (inner domain) and a second window 132b (outer domain).

After calculating separability for the initial window 132, a first enlarged window 133, made up of a first window 133a (inner domain) and a second window 133b (outer domain), is set outside the initial window 132. Then, after calculating separability of the first and second windows 133a and 133b of the first enlarged window 133, a second enlarged window 134, made up of a first window 134a (inner domain) and a second window 134b (outer domain), is set outside the first enlarged window 133. Then separability of the first and second windows 134a and 134b of the second enlarged window 134b is calculated. Further, separability of the initial window 132 and the first enlarged window 133, and separability of the first enlarged window 133 and the second enlarged window 134, are also measured.

In FIG. 12, the boundary of the inner first window 133a of the first enlarged window 133 coincides with the contour of the circular domain 131.

Figure 13:
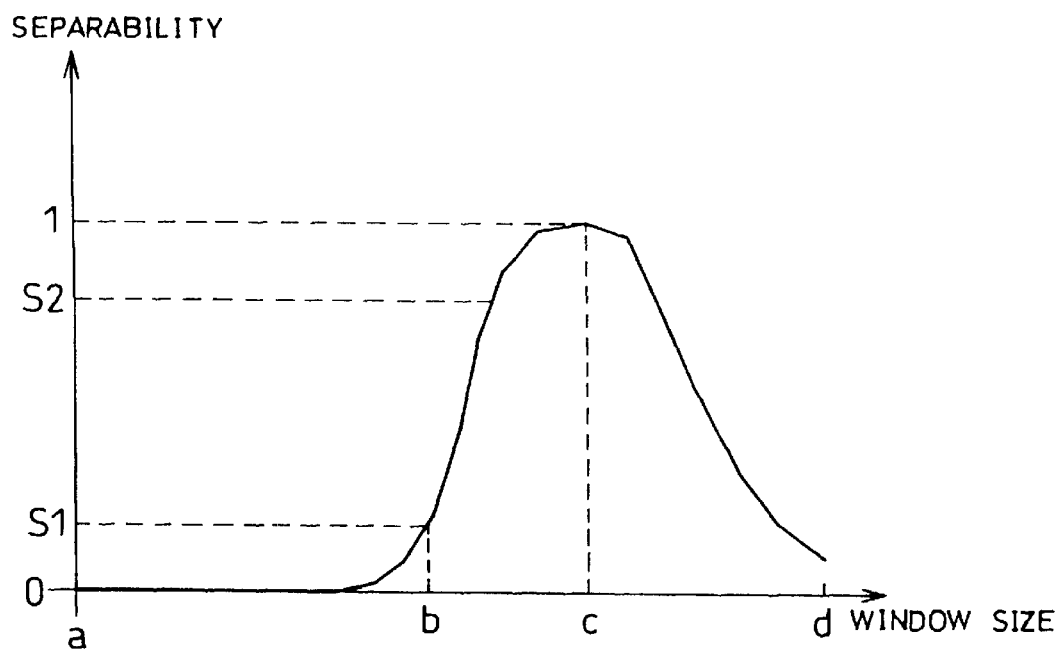
FIG. 13 is a graph showing transition of separability of the windows shown in FIG. 12.

FIG. 13 shows a graph of transition of separability, obtained by the foregoing separability measurement process. Here, the window in FIG. 12 which corresponds to a window size a in the graph is the initial window 132; that corresponding to a window size c is the first enlarged window 133; and that corresponding to a window size d is the second enlarged window 134. In other words, the graph shows that the initial window 132 is the window of initial size, and that the second enlarged window 134 is the window of maximum size. Further, the graph also shows that in the first enlarged window 133, the boundary of the inner first window 133a coincides with the contour of the circular domain 131.

The following is also evident from the graph in FIG. 13. In the separability measurement process, separability is calculated as the window size is gradually increased, beginning with window size a. As shown in FIG. 12, the initial window 132 falls entirely within the circular domain 131, i.e., the first window 132a (inner domain) and the second window 132b (outer domain) are both filled with pixels having exactly the same pixel values. Thus the separability value is 0. The separability value remains 0 up through the time the boundary of the window coincides with the contour of the circular domain 131.

Then, after the boundary of the window crosses the contour of the circular domain 131, both pixels making up the circular domain 131 and pixels making up the background fall within the outer domain of the window, and thus separability begins to increase. This increase in separability continues up through the time when the size of the window reaches window size c, i.e., when the boundary of the first window 133a of the first enlarged window 133 coincides with the contour of the circular domain 131.

Thereafter, after the size of the window exceeds window size c, since pixels making up the background also fall within the window, separability begins to decrease, and continues to decrease the larger the window becomes.

Accordingly, since separability reaches its maximum when the boundary of the first window 133a (inner domain) of the first enlarged window 133 coincides with the contour of the circular domain 131 (at window size c in the graph in FIG. 13), the domain enclosed by the first window 133a of the first enlarged window 133 at this time can be considered to be the object domain.

Further, as the size of the window is gradually increased, when separability exceeds 0, the domain enclosed by the boundary of the window at that time can be considered to be the object domain.

Here, when the foregoing separability measurement process is applied to an actual image, since the background of the base image is rarely completely uniform, a suitable threshold value s1 can be set for the measured separability, as shown in FIG. 13, and the domain enclosed by the boundary of the outer window when separability exceeds the threshold value s1 (at window size b) can be judged to be the object domain; or, alternatively, when separability exceeds a fixed threshold value s2 (<1) and reaches its maximum, the domain enclosed by the boundary of the inner domain of the window at that time can be judged to be the object domain. In other words, since separability is a normalized quantity which does not depend on a difference in pixel values between the background and the object, provided the foregoing threshold values s1 and s2 are suitably set, the same threshold values can be applied regardless of the actual pixel values (color, brightness, etc.) of the background and the object.

By means of the foregoing processing, it is possible to detect a boundary containing therein a specified object the operator wishes to cut out. Part of the base image can then be cut out based on the position and size of this boundary. For example, in FIG. 14(a), the base image includes a circular target object 135, and a corresponding object domain 136 has been detected. Presuming a circumscribing rectangle 137, the rectangle 137 is given a suitable margin to obtain an enlarged rectangle 138. The rectangle 138 is then cut out, as shown in FIG. 14(b). As a result, the rectangle 138, which is a partial image (an image for extraction) can be cut out from the base image in such a way as to contain the target object 135.

Next, after the rectangle 138 (an image for extraction which contains the target object 135) has been cut out from the base image, the target image 135 must be extracted from the rectangle 138. The following will explain, with reference to FIGS. 15 and 16(a) through 16(c), processing for extracting the target object 135 from the rectangle 138. Here, extraction of an image for extraction or extraction of a specified object domain is performed by execution of the domain extracting program 15c by the computing section 16.

In FIG. 15, the target object 135 is located substantially in the center of the rectangle 138, and a first object 139 and a second object 140, which are not objects to be extracted, are located in the vicinity of the target object 135. Further, the target object 135, the first object 139, and the second object 140 are each made up of pixels of uniform color, brightness, etc.

Generally, even with objects which appear to have a uniform brightness to human eyes, the pixel values (expressing color, brightness, etc.) of the pixels in the domain of the object are not exactly the same. Accordingly, if the distribution of pixel values in a domain judged to be a single color by human eyes is investigated, there are cases in which this distribution can be approximated by a normal distribution (normal probability density function) like that shown in FIG. 17. In such a case, mean and variance values can be used to calculate a lower-limit pixel value P1 and an upper-limit pixel value P2 of an area, shown on the Figure by diagonal hatching, when apparent certainty is within a suitable range. Here, an example of a suitable range of apparent certainty is, say, within 95%.

Accordingly, the same can be said for the target object 135 in the rectangle 138 shown in FIG. 15. In other words, the pixel values of the pixels making up the target object 135 have a normal distribution. Further, since the target object 135 is arranged substantially in the center of the rectangle 138, the target object 135 can be identified in the rectangle 138 by investigating the distribution of pixel values of pixels near the center of the rectangle 138.

Specifically, first, as shown in FIG. 16(a), a rectangular domain 138a is set substantially in the center of the rectangle 138, and an approximation of the pixel values of the pixels of the target object 135 is found by investigating the distribution of pixel values of the pixels contained within the domain 138a.

Next, from the pixel value distribution (probability function) obtained above, lower-limit and upper-limit pixel values of a suitable probability range are found, and the pixels within the rectangle 138 are divided into pixels with pixel values within that range and those with pixel values outside that range. As a result of this division, the target object 135 (without some of its pixels) and noise components 135a are obtained, as shown in FIG. 16(b). In this state, the target object 135 has not been accurately extracted, but it can be completely extracted, as shown in FIG. 16(c), by performing interpolation processing (expansion/reduction processing, etc.), in which missing pixels of the target object 135 are interpolated, and processing to eliminate the noise components 135a (processing for eliminating isolated points).

In the foregoing explanation, the separability measurement process was carried out for all positions, i.e., all pixels of the base image, but in this case, processing may take too long. Accordingly, one possible way to reduce processing time is to indicate one point of the base image, and to perform separability measurement for this point.

Figure 2:
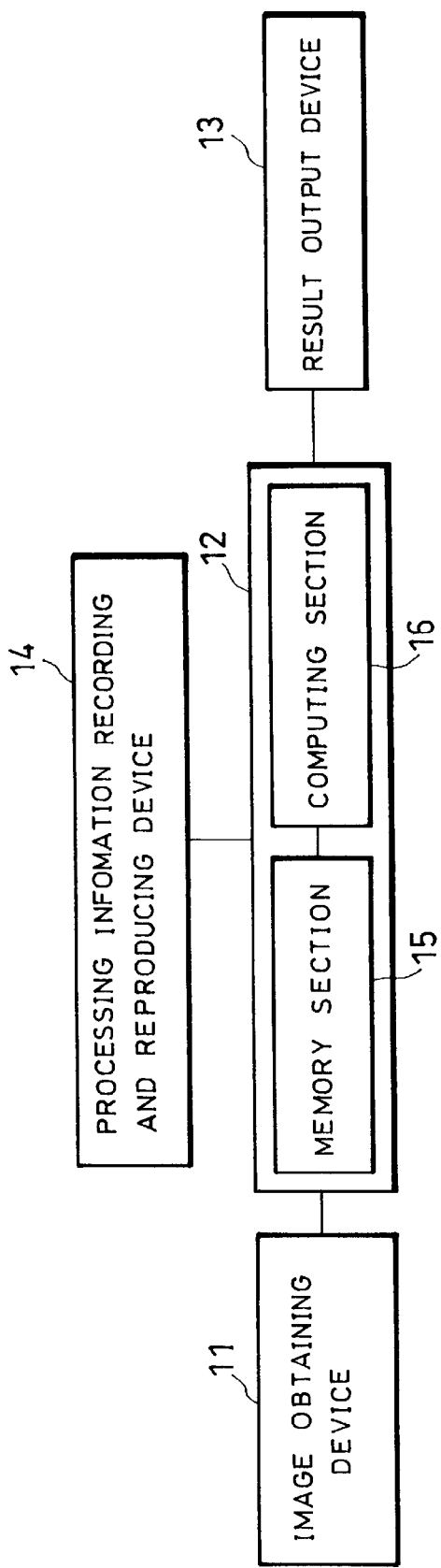
FIG. 2 is a block diagram schematically showing the structure of an image processing device according to one embodiment of the present invention.
Figure 19:
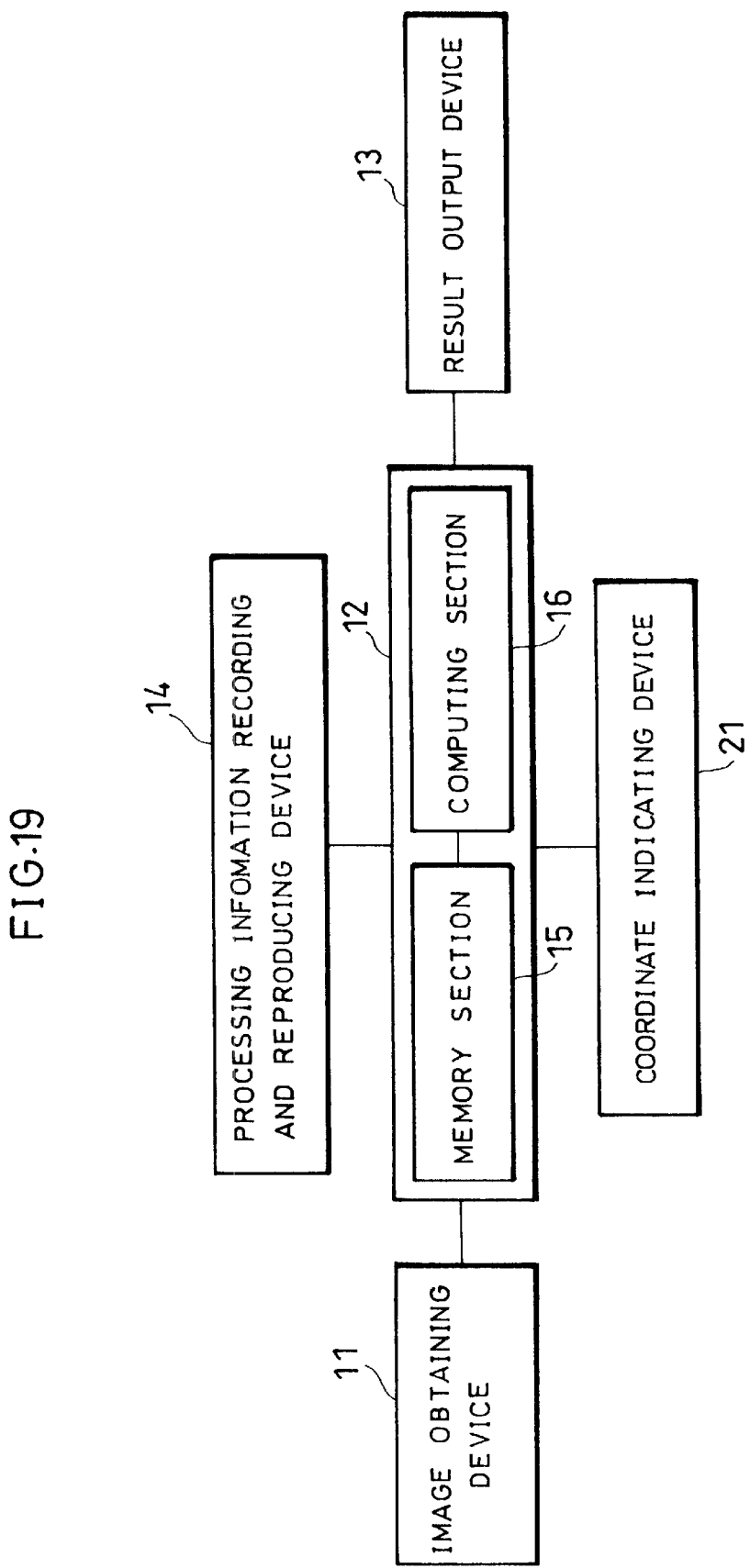
FIG. 19 is a block diagram schematically showing the structure of an image processing device according to another embodiment of the present invention.

In this case, for the image processing device explained above, an image processing device like that shown in FIG. 19 can be used, in which the image extraction processing section 12 of the image processing device shown in FIG. 2 is connected to a coordinate indicating device 21 (point indicating means). In other words, in the foregoing image processing device, the separability measurement process is carried out for a given pixel of the base image, indicated by the coordinate indicating device 21. Then, by investigating a transition in separability obtained thereby in accordance with the foregoing rules, i.e., the rules shown in FIG. 12, a partial image containing a specified object domain, which itself contains the point indicated by the coordinate indicating device 21, can be extracted from the base image.

Accordingly, in an image processing device like that shown in FIG. 2, since no coordinates are indicated in the base image by the operator, there are a plurality of candidates for the domain to be extracted. It is therefore necessary to perform processing to choose a suitable domain from among these candidates by applying the foregoing rules, or to allow the operator to choose the most suitable domain. The image processing device shown in FIG. 19, in contrast, is provided with the coordinate indicating device 21, and thus a single domain extent can be extracted with certainty by performing the separability measurement process only once.

As a result, the image processing device shown in FIG. 19 can select a domain extent in less time than it takes the image processing device shown in FIG. 2 to do so, and thus the total processing time required for extraction of the object can be reduced.

Further, the image extraction processing device 12 of the image processing device shown in FIG. 19, like the image extraction processing device 12 of the image processing device shown in FIG. 2, sets a provisional domain in part of a partial image extracted so as to contain a specified object domain, obtains image information within this provisional domain, and, on the basis of this image information, extracts a domain, smaller than the foregoing partial image, which contains the specified object.

Further, when the image information obtained is pixel distribution information, the foregoing image extraction processing device 12 calculates a probability density function from this distribution information, and, by applying the probability density function to the foregoing partial image, extracts a domain, smaller than the foregoing partial image, which contains the specified object.

By fixing the point indicated by the coordinate indicating device 21 in the center of the window used in extracting the target object, an image for extraction can be extracted in such a way that the object is arranged in a balanced manner therein.

For example, in a rectangle 138 shown in FIG. 20 (an image containing the target object 135 and a first object 139), the center of the window used to extract the target object 135 (hereinafter referred to as the "separability window") is fixed on a point X indicated by the coordinate indicating device 21.

Accordingly, an image for extraction obtained thereby is limited to a domain extent for which the indicated point X is the center of the separability window.

The following will explain, with reference to FIGS. 19 through 23, processing for extracting a domain for extraction when the center of the separability window is fixed.

Figure 20:
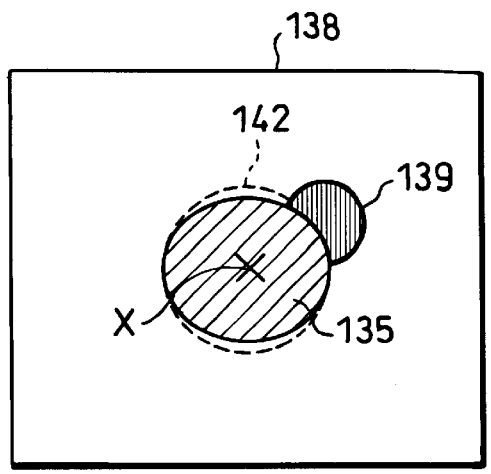
FIG. 20 is an explanatory drawing showing processing for extracting images for extraction, performed by the image processing device shown in FIG. 19.

First, as shown in FIG. 20, in a base image including a circular target object 135, when a point X substantially coinciding with the center of the target object 135 is indicated by the coordinate indicating device 21, a separability window is obtained which is a circular domain having a boundary 142 which encircles the target object 135. Using a separability window obtained in this way, processing can be performed to suitably extract the target object 135.

Figure 21:
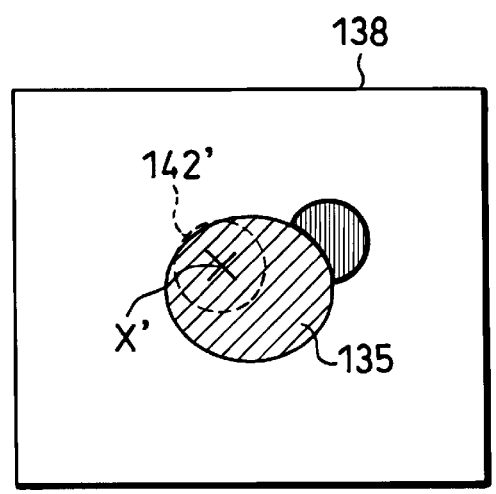
FIG. 21 is an explanatory drawing showing processing for extracting images for extraction, performed by the image processing device shown in FIG. 19.

On the other hand, as shown in FIG. 21, in a base image including a circular target object 135, when a point X' not coinciding with the center of the target object 135 is indicated by the coordinate indicating device 21, a separability window is obtained which has a boundary 142' enclosing an extent smaller than the target object 135. This is because the separability measurement process is performed with the center of the window fixed, and because separability exceeds the threshold value when the boundary of the outer window meets the boundary 142', or reaches its maximum when the boundary of the inner window meets the boundary 142'.

In this way, if the center of the window and the center of the object to be extracted do not coincide or substantially coincide, the separability window is not suitably set, and an erroneous image for extracting may be extracted.

Figure 22A:
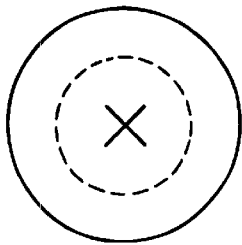
FIGS. 22(a) and 22(b) are explanatory drawings showing window enlargement processing when the centers of two windows are the same.
Figure 22B:
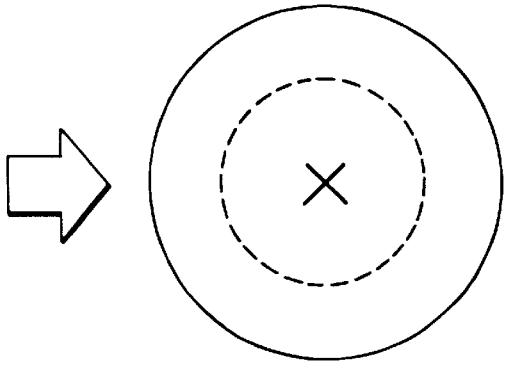

Consequently, in order to solve the foregoing problem, the separability measurement process is performed without fixing the center of the window, shifting the center as necessary. Specifically, if a separability window at a given point in time is as shown in FIG. 22(*a*), the window at the next point in time, as shown in FIG. 22(*b*), has the same center as the window in FIG. 22(*a*), and the sizes of the inner and outer windows have been enlarged in accordance with certain rules.

Here, processing for extraction of a specified object using the foregoing separability windows will be explained with reference to FIGS. 23(*a*) and 23(*b*), and the flow-chart shown in FIG. 26.

First, an arbitrary point on the target object is indicated using the coordinate indicating device 21. Then an initial window is set, made up of an inner window and an outer window centered on the indicated point (S11).

Here, as shown in FIG. 23(*a*), an initial window 150*a*, with inner and outer windows arranged as concentric circles, is set. Incidentally, in FIGS. 23(*a*) and 23(*b*), solid lines show the boundary of each outer window, and broken lines show the boundary of each inner window.

Next, the inner window is fixed, and a plurality of outer windows are set (S12).

In other words, the initial separability window 150*a* is an original separability window, and a plurality of separability windows are set in addition to this original separability window. Here, as shown in FIG. 23(*a*), a total of nine separability windows 150*a* through 150*i*, including the initial separability window 150*a*, are set.

In each of the nine separability windows 150*a* through 150*i*, the position of the inner window is the same, but the position of the outer window is shifted. In the separability window 150*b*, the outer window is shifted up and to the left by the radius of the inner window. Further, for each of the remaining separability windows, the outer window is shifted by the radius of the inner window. In other words, the separability window 150*c* is shifted upward, 150*d* shifted up and to the right, 150*e* shifted to the left, 150*f* shifted to the right, 150*g* shifted down and to the left, 150*h* shifted downward, and 150*i* shifted down and to the right.

Next, separability is calculated for each window (S13).

In other words, separability is calculated for each of the nine separability windows 150*a* through 150*i*, set as shown in FIG. 23(*a*).

Then the separability window with the smallest separability is selected (S14). The separability window with the smallest separability is stored in memory as the minimum separability window, and the separability value thereof is treated as a representative separability value for the nine separability windows set above. In the present embodiment, assume the separability window 150*d* shown in FIG. 23(*a*) is stored in memory as the minimum separability window.

Next, for the minimum separability window stored in memory in S14, it is determined whether the respective centers of the inner and outer windows coincide (S15). If it is determined that the respective centers do not coincide, operations proceed to S16. If, on the other hand, it is determined that the respective centers coincide, operations proceed directly to S17.

In other words, if, as in the separability windows other than 150a shown in FIG. 23(a), the respective centers of the inner and outer windows of the minimum separability window do not coincide, the inner window is shifted so that the center thereof coincides with the center of the outer window (S16).

Then, the sizes of the inner and outer windows are increased slightly (S17).

Specifically, as shown in FIG. 23(b), for a minimum separability window 150d, in which the respective centers of the inner and outer windows do not coincide, the inner window is shifted so that its center coincides with that of the outer window (S16), yielding a separability window 150j, and then the window size of the separability window is increased slightly (S17), yielding a separability window 150k.

Accordingly, if, in S15, the respective centers of the inner and outer windows of the separability window selected in S14 coincide, i.e., if the respective centers coincide like those of the initial window 150a shown in FIG. 23(a), operations proceed directly to S17, and the window size is increased slightly.

As discussed above, a window is obtained whose inner and outer windows have a common center, and then, with the center fixed, the sizes of the inner and outer windows are increased according to certain rules to obtain an enlarged window like the separability window 150k shown in FIG. 23(b), which is used as the original separability window in the next step.

Next, it is determined whether the window is now large enough (S18).

In other words, separability of the inner and outer windows of the separability window 150k is calculated, and if it is determined that the window is now large enough, enlargement of the window is stopped.

If, on the other hand, it is determined that the window is not yet large enough, operations return to S12, and using the separability window 150k as the original separability window, a plurality of separability windows are set by fixing the inner window and shifting the outer window. Here, "large enough" means, for example, the size when the boundary of the inner window exceeds the limits of the screen. The screen is the extent of the base image originally obtained by the operator. By setting a window as above, this window can be used to perform extraction of an image including a specified object (image for extraction).

Next, in order to use a separability window of suitable size to obtain a boundary of the image for extraction (hereinafter referred to as the "object boundary"), one of the two following methods may be used.

[Method A]

Figure 24:
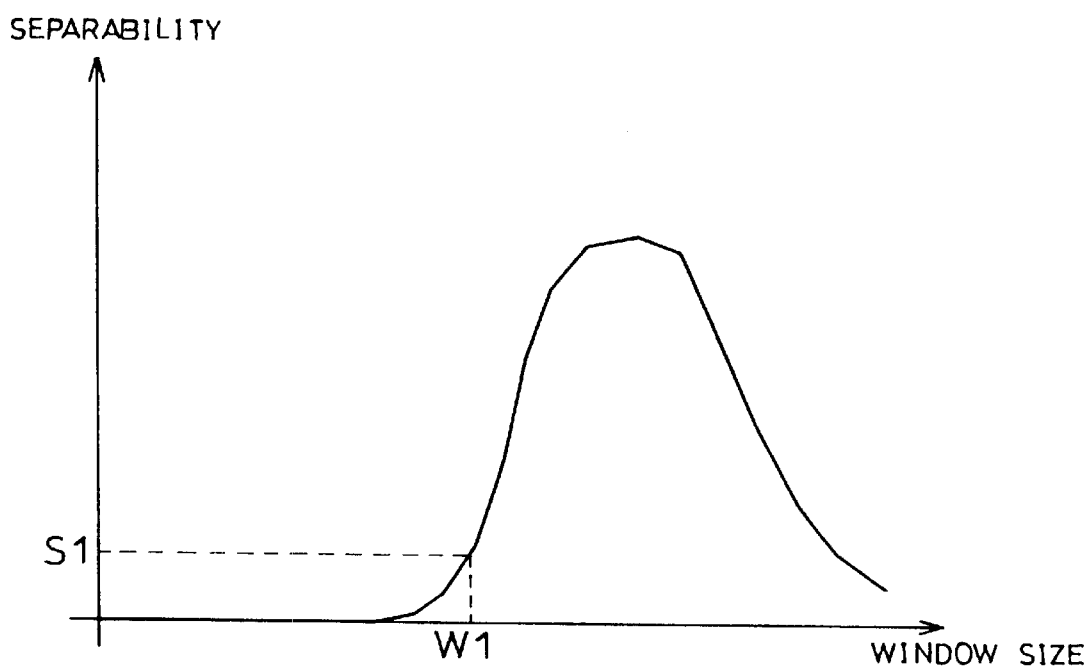
FIG. 24 is a graph showing a separability series, obtained by a separability measurement process.

A separability series obtained in the separability measurement process can be expressed as a graph like that shown in FIG. 24. In the graph shown in FIG. 24, when separability exceeds a threshold value S1 (when the separability window is a window size W1), the boundary of the outer window of the separability window at that time can be considered to be the object boundary. Then, it is possible to realize an image processing device which is able to extract from the base image an image for extraction containing a specified object domain which in turn includes a point indicated by the coordinate indicating device 21 of the image processing device shown in FIG. 19.

[Method B]

In the separability measurement process, the minimum separability window for each step is stored in memory. The image for extraction is extracted using these stored minimum separability windows. In other words, the outer window of each separability window is used as the inner window of the next separability window; by enlarging the inner window while keeping the center fixed, a new separability window is set.

In other words, a series of separability windows is obtained in which the outer window of each step of the first separability measurement process becomes the inner window for the next step thereof.

Figure 25:
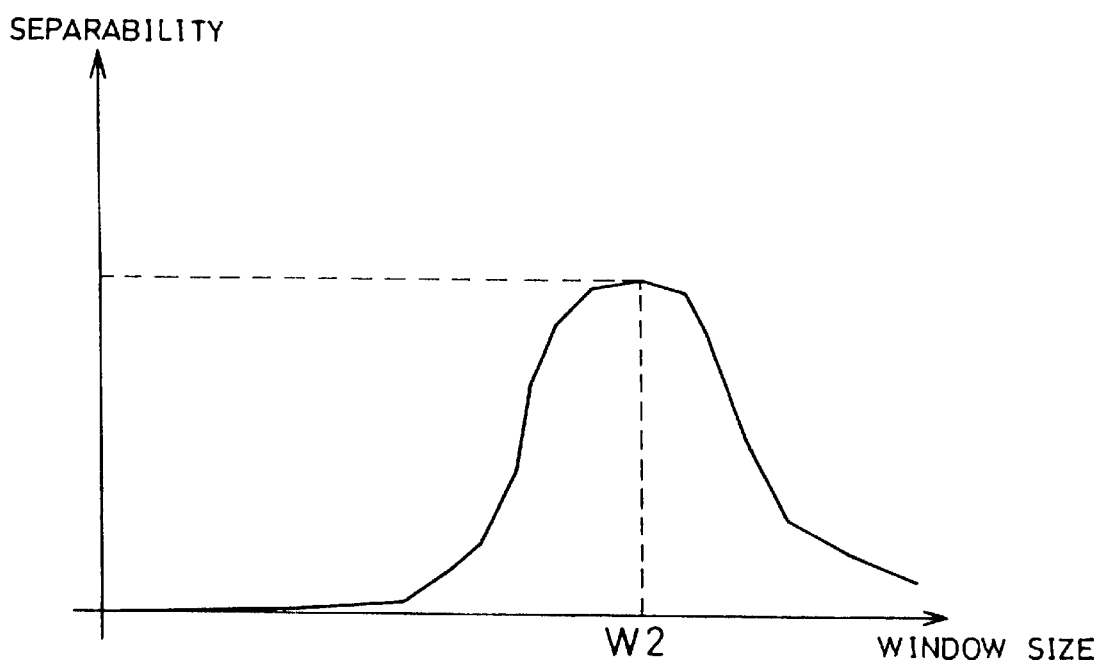
FIG. 25 is a graph showing a separability series, obtained by a separability measurement process.

Then, by calculating separability for each window of this series, a graph showing the separability series, like that in FIG. 25, can be obtained. In the graph showing the separability series, when separability reaches its maximum, the boundary of the inner window at that time (with a window size of W2) can be considered to be the object boundary. Then, it is possible to realize an image processing device which is able to extract from the base image an image for extraction containing a specified object domain which in turn includes a point indicated by the coordinate indicating device 21 of the image processing device shown in FIG. 19.

The first embodiment above explained processing performed on a single obtained image (base image), and thus the image inputted into the image processing device was in a still state. The second embodiment below will explain a method for using the processing explained above to follow a moving image.

Second Embodiment

The following will explain another embodiment of the present invention. The device for performing the processing explained below is the device shown in FIGS. 2 and 19, and accordingly explanation of this device will be omitted here.

Prior to explaining processing for following a moving image, detection of an object will be explained with reference to the flow-charts in FIGS. 29 and 30.

Figure 29:
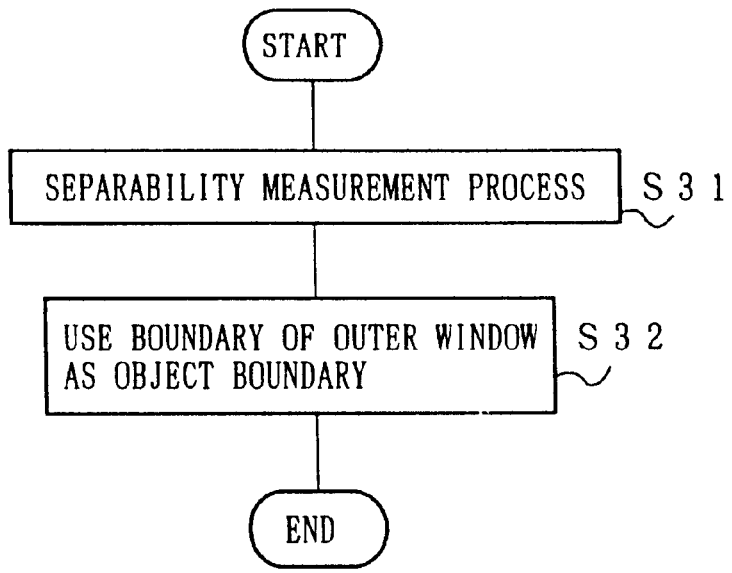
FIG. 29 is a flow-chart showing a sub-routine for detecting an object boundary in the processing for following a moving image shown in FIG. 28.

FIG. 29 is a flow-chart showing the flow of processing in the foregoing method A for detecting an object boundary using a separability window. Again, FIG. 30 is a flow-chart showing the flow of processing in the foregoing method B for detecting an object boundary using a separability window.

When using method A, as shown in FIG. 29, the separability measurement process is first executed (S31) Here, the separability measurement process executed is either that shown in FIG. 1, or that shown in FIG. 26.

Next, from the separability results obtained, the outer boundary of the provisional domain (window) is treated as the object boundary (S32). In other words, the boundary of the outer window of the separability window is treated as the object boundary.

Figure 30:
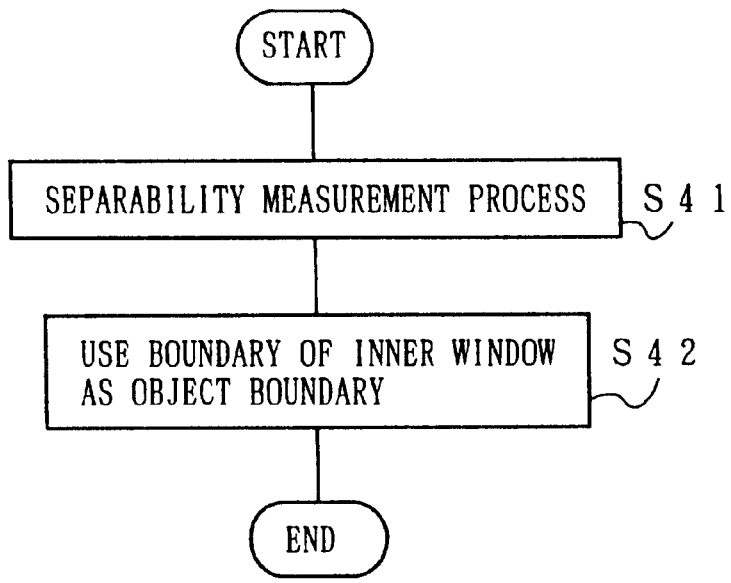
FIG. 30 is a flow-chart showing a sub-routine for detecting an object boundary in the processing for following a moving image shown in FIG. 28.

When using method B, as shown in FIG. 30, the separability measurement process is first executed (S41). Here again, the separability measurement process executed is either that shown in FIG. 1, or that shown in FIG. 26.

Next, from the separability results obtained, the inner boundary of the provisional domain (window) is treated as the object boundary (S42). In other words, the outer boundary of the inner window of the separability window is treated as the object boundary.

Figure 28:
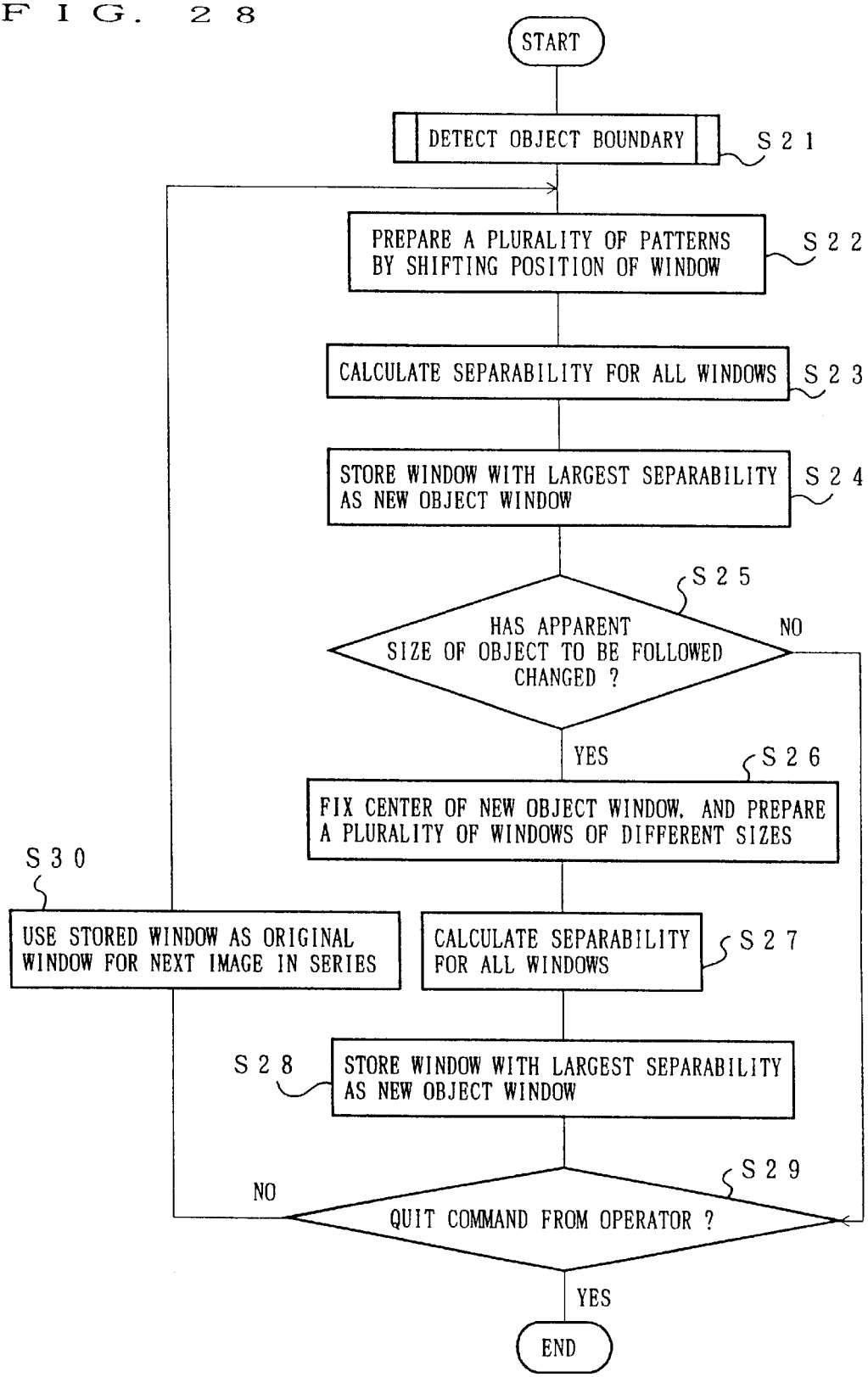
FIG. 28 is a flow-chart showing the flow of processing for following a moving image.

Next, with reference to FIG. 28, processing for following a moving image will be explained. First, the object boundary is detected (S21). Here, the object boundary is detected by either method A or method B.

Figure 27A:
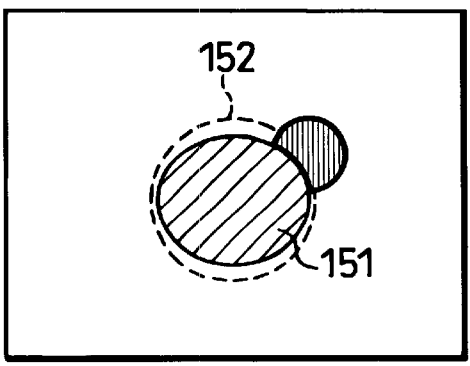
FIGS. 27(a) through 27(d) are drawings explaining processing for following a moving image.

The detected object boundary, as shown in FIG. 27(a), is an object boundary 152 obtained for a target object 151 in one image (the image in question) in the series of images stored in the memory section 15. Then, in the next image in the series, as shown in FIG. 27(b), the target object 151 has moved to the position of a target object 153, while the object boundary 152 remains in the same position, as an object boundary 154.

Figure 27B:
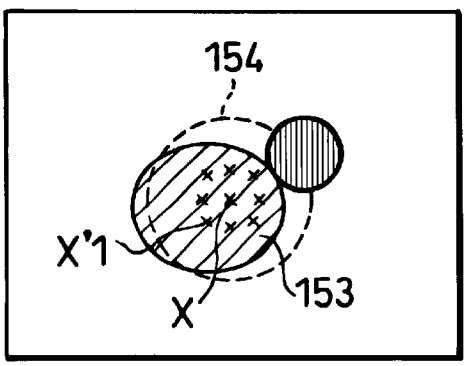

The object boundary 154 shown in FIG. 27(b) is the boundary of either the inner or outer window used in the separability measurement process. Accordingly, the object boundary 154 is used as the original window for this image. Here, whether the object boundary 154 is the boundary of the inner window or the outer window depends on the method of finding the object boundary after the separability measurement process.

Then, after the object is detected and the original window is set in S21, a plurality of patterns are prepared, each of which shifts the position of the window (S22). In other words, in FIG. 27(b), around a point X indicating the center of the object boundary 152 of FIG. 27(a) are set eight points X' each an equal distance above, below, to the left, to the right, and in diagonal directions from the point X, and eight boundaries, each centered on one of the points X', are presumed. Here, the direction of movement of the target object, the number of patterns, the distance of shift, etc. are determined by the quantity of movement of the object in the series of inputted images, the precision with which the object is to be followed, etc.

Next, separability is calculated for all of the provisional windows (S23).

In other words, the object boundary 154 is the boundary of a window whose center is the point X, and for the other windows centered on the points X', each window boundary is shifted by the same amount its center X' is shifted from the point X. For this reason, there are nine centers (including the original center X), and a window boundary corresponding to each center, and each of these window boundaries is used as an inner window in the separability measurement process.

Accordingly, by presuming an outer window for each of these nine inner windows, separability can be calculated for each of nine separability windows.

Then, the window having the greatest separability is stored in memory as the new object window (S24).

Figure 27D:
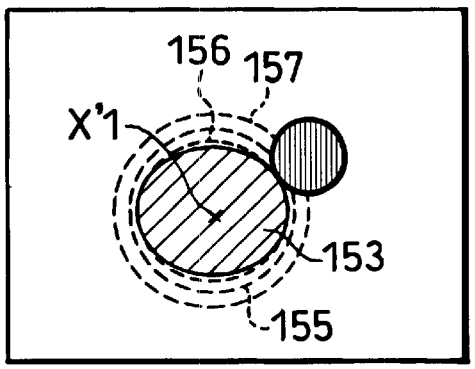
Figure 27C:
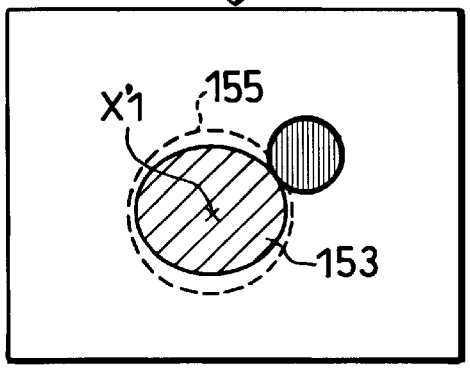

Specifically, as shown in FIG. 27(b), if a window centered on a point X'1, located below and to the left of the point X, is determined to be the window with the greatest separability, the point X'1 and an object boundary 155 centered thereon become the center and window boundary, respectively, of the new object window, as shown in FIG. 27(c).

Next, it is determined whether the apparent size of the object being followed has changed (S25). Here, if the apparent size of the object has not changed, operations proceed to S29, where it is determined whether there is a quit command from the operator. Then, if there is a quit command from the user, processing for following the moving image stops.

If, on the other hand, there is no quit command from the operator in S29, the window stored in memory becomes the original window for the next image in the series (S30), and operations return to S22.

In this way, when there is no change in the apparent size of the object, processing is repeated using the window stored in S24 as the original window for the next image in the series, and as a result, the target object can be followed. Accordingly, the foregoing processing is sufficient to follow the movement of the target object when the apparent size of the target object in the base image does not change, i.e., when the target object moves parallel to the camera.

If, on the other hand, it is determined in S25 that the apparent size of the target object has changed, i.e., when the target object moves toward or away from the camera, it is necessary to follow this movement toward or away from the camera, as well as the foregoing movement parallel to the camera.

In this case, if, as shown in FIG. 27(d), the window boundary and window center at the time of following parallel movement are the object boundary 155 and the point X'1, respectively, the object boundary 155 and the point X'1 are used as the original window for this image.

Then, with the center of the new object window fixed, a plurality of windows of different sizes are prepared (S26). Here, the center of the window (the point X'1) is fixed, and a window reduced in size by a certain amount and a window increased in size by a certain amount are set.

In FIG. 27(d), two windows are set: a smaller window 156, reduced in size from the original window, and a larger window 157, increased in size from the original window. However, the number of smaller windows 156 and larger windows 157 is not limited to one each.

Then, using each of these windows as an inner window, outer windows corresponding to each are set, thus yielding separability windows for the separability measurement process. The number of separability windows and the respective amounts of change in their sizes are determined by the amount of movement of the object in the inputted series of images, the precision with which the object is to be followed, etc.

Next, it is determined whether there is a quit command from the operator (S29). Then, if there is a quit command from the user, processing for following the moving image stops. If, on the other hand, there is no quit command from the operator, operations proceed to S30, and the window stored in memory in S28 becomes the original window for the next image in the series. Then operations return to S22, and processing is repeated. By repeating these steps, movement of the target object toward or away from the camera can be followed.

Accordingly, various possible uses for the present invention become possible by providing a device (such as a video camera, etc.) with a function for following moving images as explained above.

For example, if a video camera is provided with the foregoing function for following moving images, it can be controlled so as to always keep a target object in the center of the frame.

Again, if an air conditioner is provided with such a function, if the target object is a person in the room where the air conditioner is installed, fine adjustment of the output of the air conditioner in accordance with the movement of the person becomes possible.

Again, if a video camera provided with an object-following function is installed in an automobile, it can contribute to automatic driving, etc. by following images of other automobiles, obstacles, etc.

The first and second embodiments above chiefly explained methods of extracting an object to be extracted, i.e. a target object. The third embodiment below will discuss a specific example in which the target object is a human face.

Third Embodiment

The following will explain a further embodiment of the present invention.

In the present embodiment, since the specified object is a human face, extraction of the specified object will be carried out with oval first and second provisional domains (first and second windows).

Incidentally, in the present embodiment, the structure of the image processing device and the method of extracting specified objects are the same as in the first and second embodiments above, and accordingly explanation thereof will be omitted here. Accordingly, the following explanation can be applied to either still or moving images, and the methods of extracting specific objects explained in both the first and second embodiments above can be applied to what follows.

In other words, the image processing device explained in either of the first and second embodiments above can be given a structure suited to extraction of a human face if chroma values or hue values, calculated from the RGB values of the pixel values making up an inputted digital image (base image), are used for the pixel values used to calculate separability between the first and second provisional domains, and for the pixel values making up the specified object.

In an image processing device according to the present embodiment, the first stage of extraction of a domain including a human face is to use oval first and second provisional domains to detect in the base image a domain having substantially the same shape as the provisional domains, by means of the methods discussed in the first and second embodiments above.

An oval domain detected in the base image in this way includes a human face. However, although human faces are for the most part oval when viewed from the front, they are not perfectly oval, and vary by person. For this reason, the second stage of extraction of a domain including a human face is to investigate the interior of the detected oval domain in more detail to detect a correct facial domain, thereby improving the precision of extraction of a partial image which includes a human face (specified object domain). Further, in this way, the specified object domain can be accurately extracted from the extracted partial image.

A structure suited to extraction of a human face as above is the image extraction processing device 12 shown in FIG. 2 or FIG. 19, further including means for obtaining image information from within the extracted human facial domain, and means for detecting from this image information numerical information made up of facial width, vertical axis of symmetry, and vertical positions of eyes, nose, and mouth, which, based on this numerical information, extracts part of the partial image so that a face portion of the facial domain has a predetermined size and position.

The following will explain the details of processing for extracting a specified object domain when the specified object domain is a human facial domain. The steps of the following processing are performed by the image computing section 16 shown in FIG. 2 or FIG. 19, in accordance with the facial parameter detecting program 15b shown in FIG. 3.

Prior to extraction processing proper, a skin color distribution of human faces is analyzed, by means of the following steps.

Figure 31:
FIGS. 31(a) and 31(b) are explanatory drawings showing an example of preparation of an image by extracting only skin areas from an image of a human face, with FIG. 31(a) showing an image of a human face, and FIG. 31(b) showing the extracted skin areas.
Figure 31:
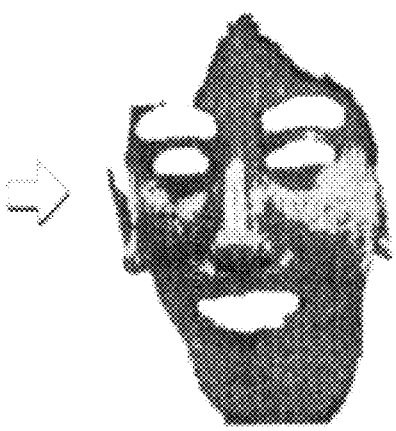

1. A person manually extracts only skin areas from an image showing a human face (FIG. 31(a)), yielding a skin area image (FIG. 31(b)).

2. Similar skin area images are prepared from other images of human faces, yielding a plurality of such images.

Figure 32A:
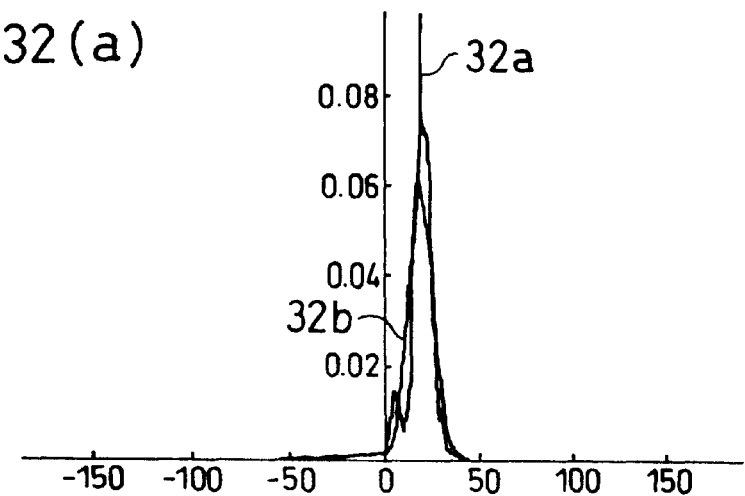
FIGS. 32(a) through 32(c) show frequency-of-occurrence histograms expressing pixel distributions, with FIG. 32(a) being a histogram of hue, FIG. 32(b) a histogram of chroma, and FIG. 32(c) a histogram of brightness.
Figure 32B:
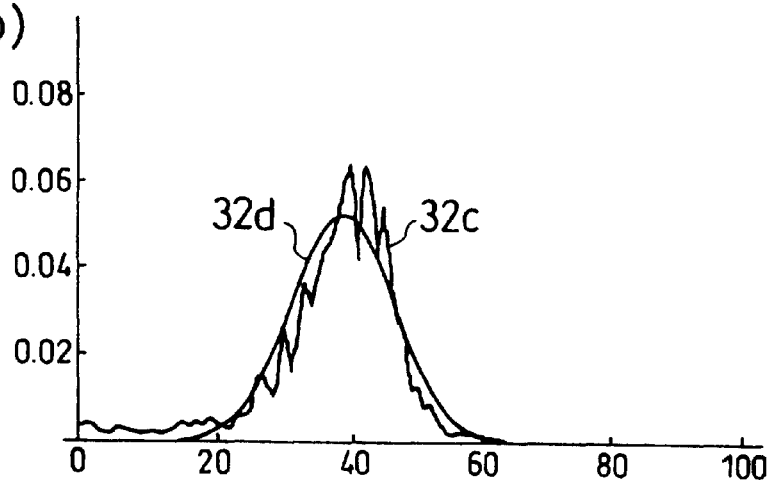
Figure 32C:
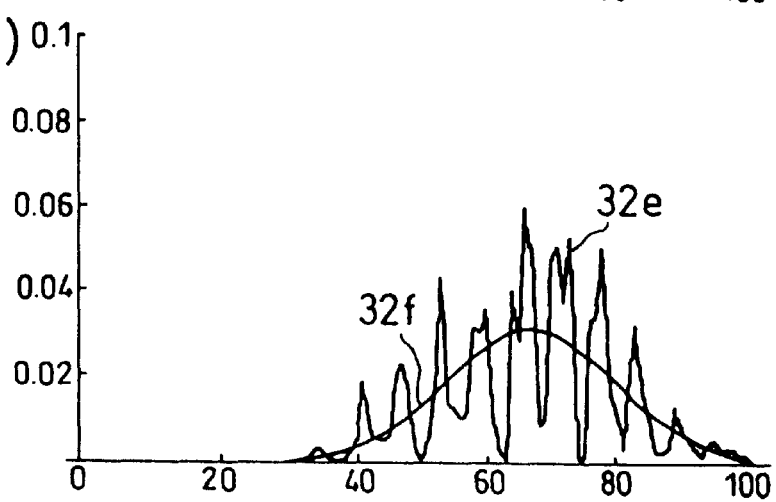

3. Color distribution of pixels of these skin area images is shown as frequency-of-occurrence histograms like those shown in FIGS. 32(a) through 32(c). Curve 32a shown in FIG. 32(a) is a histogram of hue, curve 32c shown in FIG. 32(b) is a histogram of chroma, and curve 32e shown in FIG. 32(c) is a histogram of brightness.

4. Then, mean and variance of distribution are calculated for each histogram, and a normal probability density function best fitting each distribution is found. Normal probability density functions for hue, chroma, and brightness are shown by curve 32b in FIG. 32(a), curve 32d in FIG. 32(b), and curve 32f in FIG. 32(c), respectively.

In this way, a color distribution of human faces can be shown by normal probability density functions for hue, chroma, and brightness ($P_{hue}$(hue), $P_{sat}$(sat), and $P_{val}$(val), respectively) shown by the respective arguments of mean and variance thereof ($\mu_{hue}$ and $\sigma_{hue}^2$, $\mu_{sat}$, and $\sigma_{sat}^2$, and $\mu_{val}$ and $\sigma_{val}^2$, respectively). These functions are skin domain probability density functions. Each function is as shown in Equations (4) through (6) below.

$$P_{hue}(\text{hue}) \sim N(\mu_{hue}, \sigma_{hue}^2) \quad (4)$$

$$P_{sat}(\text{sat}) \sim N(\mu_{sat}, \sigma_{sat}^2) \quad (5)$$

$$P_{val}(\text{val}) \sim N(\mu_{val}, \sigma_{val}^2) \quad (6)$$

Here, when calculating mean and variance to find a suitable normal distribution, values which vary greatly from the mean (for example, values such as 100 or −150 in the hue histogram (curve 32b) shown in FIG. 32(a), where the hues of almost all pixels are distributed within ±30 of 20), lead to a large estimate for variance, even if there are few such values, and accordingly a normal distribution (probability density function) fitting a more accurate distribution can be obtained by calculating mean and variance after eliminating pixels having such values as anomalous values.

Next, the flow of processing for producing a facial skin domain image will be discussed with reference to the flow-chart in FIG. 33 and to FIG. 34.

Figure 34A:
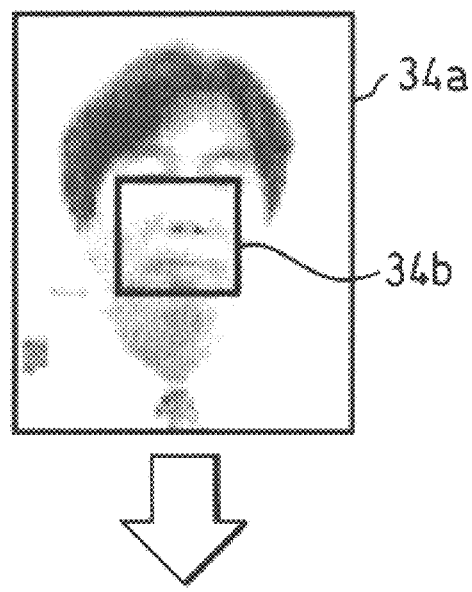
FIGS. 34(a) through 34(c) are explanatory drawings showing a case of input by the operator of a pattern expressing a domain.

First, the operator indicates a point or a domain (S51). In other words, an initial processing domain is set on the basis of input from the operator. For example, if the target object 135 shown in FIG. 16 is a human face, then, as shown in FIG. 34(a), a sampling rectangle, i.e. a set domain rectangle 34b, is set near the center of an image 34a extracted from the original image. Then, pixel values in the set domain rectangle 34b are investigated, and the probability density function of the next step is derived.

Next, pixels having values for hue, chroma, and brightness which are less than a certain probability, or which are outside a certain range, are eliminated (S52). In other words, the hue, chroma, and brightness values of each pixel are substituted into the three probability density functions calculated in the previous step, having as their respective arguments hue, chroma, and brightness, and the probabilities of the values of each pixel are found, and pixels with values having a certain probability or better are treated as initial facial skin candidate pixels. Here, in order to obtain a wide range of pixels, the probability is set to a relatively small value, such as 5%. In this way, within the domain set by the operator, pixels having at least some possibility of being skin are used as the initial facial skin candidate pixels.

Then, mean and variance of the remaining pixels are calculated (S53). In the foregoing explanation, the standard for selection of the facial skin candidate pixels was probability, but, depending on the characteristics of the image pickup system, etc., it is also effective, as necessary, to adjust a threshold value to a value near the pixel value (hue, chroma, or brightness) at that probability.

If the newly-calculated mean and variance for hue, chroma, and brightness are $\mu_{hue}'$ and $\sigma_{hue}'^2$, $\mu_{sat}'$ and $\sigma_{sat}'^2$, and $\mu_{val}'$ and $\sigma_{val}'^2$, respectively, then the new probability density functions having as their arguments hue, chroma, and brightness ($P_{hue}'$ (hue), $P_{sat}'$ (sat), and $P_{val}'$ (val)) are as shown in Equations (7) through (9) below.

$$P_{hue}'(\text{hue}) \sim N(\mu_{hue}', \sigma_{hue}'^2) \quad (7)$$

$$P_{sat}'(\text{sat}) \sim N(\mu_{sat}', \sigma_{sat}'^2) \quad (8)$$

$$P_{val}'(\text{val}) \sim N(\mu_{val}', \sigma_{val}'^2) \quad (9)$$

Pixels making up facial skin are then selected using the probability density functions shown in Equations (7) through (9) above.

In other words, using a probability density function based on the mean and variance for hue calculated in S53, among all the pixels of the entire image, pixels whose hue value is less than a certain probability, or which is outside a certain range, are eliminated (S54).

Specifically, using the pixel values of all of the pixels in the image as initial values, every pixel whose facial skin probability, obtained using the argument hue value ($P_{hue}'$ (hue)), is less than a predetermined value is eliminated.

Next, of the pixels remaining after the processing in S54, using a probability density function based on the mean and variance for chroma calculated in S53, pixels whose chroma value is less than a certain probability, or which is outside a certain range, are eliminated (S55).

Specifically, every pixel whose facial skin probability, obtained using the argument chroma value ($P_{sat}'$(sat)), is less than a predetermined value is eliminated.

Next, of the pixels remaining after the processing in S55, using a probability density function based on the mean and variance for brightness calculated in S53, pixels whose brightness value is less than a certain probability, or which is outside a certain range, are eliminated (S56).

Specifically, every pixel whose facial skin probability, obtained using the argument brightness value ($P_{val}'$(val)), is less than a predetermined value is eliminated.

Figure 34B:
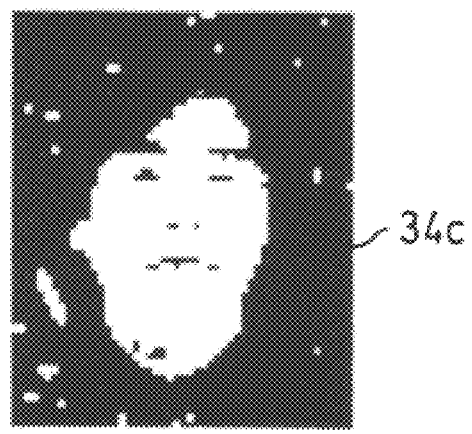
Figure 34C:
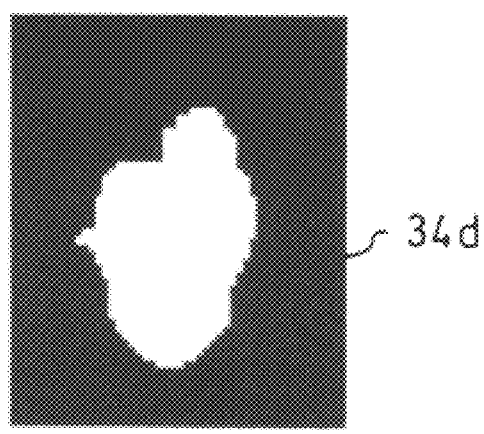

Finally, the collection of pixels remaining after the foregoing processing is treated as a facial skin domain image (S57). Thus, a facial skin domain image like the facial skin domain image 34c shown in FIG. 34(b) is obtained. Then, by means of processing for producing a facial mask, to be discussed below, the facial skin domain image 3c becomes a facial mask 34d, as shown in FIG. 34(c).

Here, the lower limit for probability, set as threshold value, is set higher than that used when finding the initial facial skin candidate pixels. For example, a probability of 5% can be used when finding the initial facial skin candidate pixels, and one of 30% in the processing in S54 through S56. In this way, noise pixels extracted in error when finding the initial facial skin candidate pixels are not extracted in error in the processing in the latter steps.

In the foregoing explanation, the standard for selection of the facial skin pixels was probability, but, depending on the characteristics of the image pickup system, etc., it is also effective, as necessary, to adjust a threshold value to a value near the pixel value (hue, chroma, or brightness) at that probability.

Figure 35A:
FIG. 35(a) shows an inputted image.
Figure 35B:
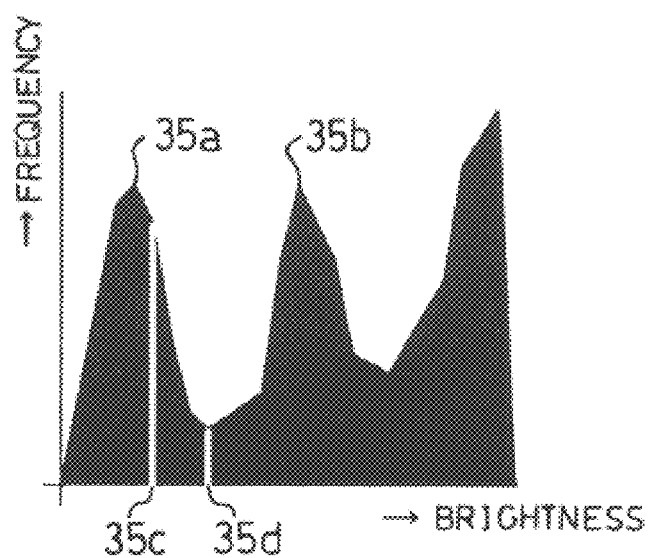
FIG. 35(b) is an explanatory drawing showing a relationship between brightness and frequency in the inputted image shown in FIG. 35(a).

For example, FIGS. 35(a) and 35(b) are drawings showing a relationship between brightness and frequency of occurrence. With regard to brightness in the image shown in FIG. 35(a), brightness of the facial skin and of the hair are clearly different. In a histogram prepared from this image, as shown in FIG. 35(b), a peak 35a at the low brightness end, showing brightness of the hair, and a peak 35b toward comparatively higher brightness, showing brightness of the facial skin, are evident.

With the image shown in FIG. 35(a), if pixels are selected by simply using probability as a threshold value, the threshold value is set in a position such as 35c in FIG. 35(b), and part of the hair is likely to be extracted as facial skin pixels. For this reason, in such a case, by applying, below a suitable brightness value, an algorithm such as Otsu's discrimination analysis algorithm (discussed in Taniuchi, Den, *Robot Vision=1*, Shokodo, 1990, ISBN 4-7856-3074-4 C3355), it becomes possible to set the threshold value for brightness at a more appropriate value, such as at 35d.

Figure 36A:
FIGS. 36(a) through 36(c) are explanatory drawings showing preparation of an image by extracting only skin areas from an image of a human face.
Figure 36B:
Figure 36C:

By means of the foregoing processing, by flexibly renewing the facial skin function, if the image to be processed is as shown in FIG. 36(a), a facial skin domain image like that shown in FIG. 36(c) can be obtained. An advantage of this is that erroneous extraction due to noise can be reduced in comparison with a facial skin domain image obtained by the conventional method (FIG. 36(b)), in which extraction is performed using a fixed function.

The following will explain, with reference to the flowchart in FIG. 37 and to FIG. 38, processing for producing a facial mask used to obtain numerical information made up of facial width, vertical axis of symmetry, and vertical positions of eyes, nose, and mouth. The following explains use of a color image as the base image, and accordingly, in the following explanation, the base image is an inputted color image.

Figure 33:
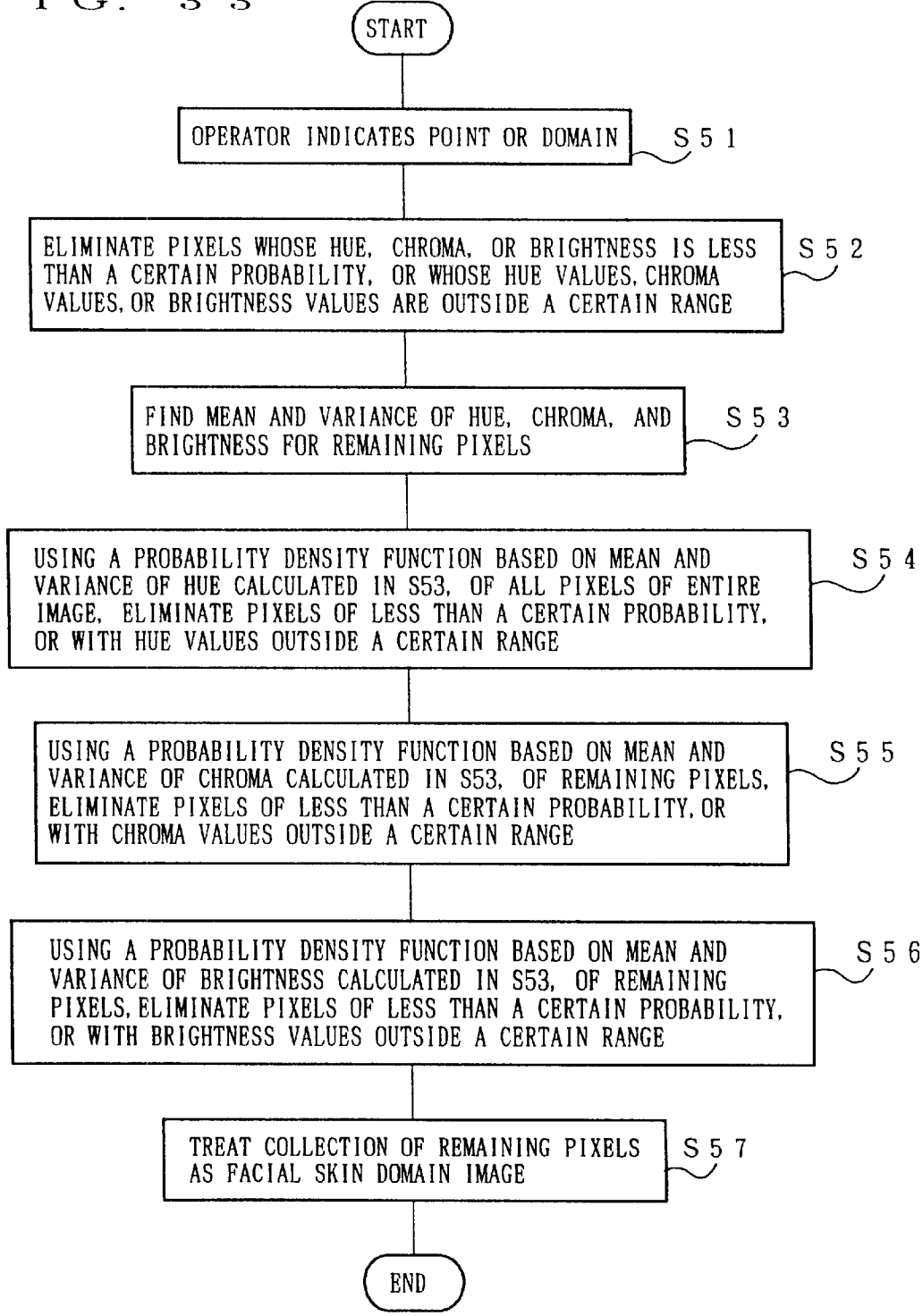
FIG. 33 is a flow-chart showing the flow of processing for producing a facial skin domain image.

First, a facial skin domain image is produced (S61) A facial skin domain image, such as that shown in FIG. 36(c), is produced by means of the processing shown in FIG. 33 (S51 through S57).

Next, a domain of maximum surface area is selected from the facial skin domain image produced in S61 (S62). For example, if the inputted color image (base image) is as shown in FIG. 38(a), label images are prepared by joining together contiguous pixels, as shown in FIG. 38(c), and then only the label image of largest area is retained, yielding a binary image like that shown in FIG. 38(d).

Next, processing for filling holes is performed (S63). Here, in the domain remaining after the foregoing processing, black pixels surrounded by white pixels (holes) are replaced by white pixels, yielding an image free of holes, as shown in FIG. 38(e).

Then, reduction processing is performed once (S64). In other words, the image obtained in S63 is reduced once.

Next, a domain of maximum surface area is selected (S65). In other words, in the image which has undergone reduction processing, label images are again prepared, and only the domain of largest area is retained.

Next, enlargement processing is performed n times (S66), and reduction processing is performed n times (S67). Thereafter, a domain of maximum surface area is selected (S68), yielding a facial mask like that shown in FIG. 38(f).

Accordingly, as discussed above, by means of the foregoing processing for producing a facial mask, a facial mask 34d, shown in FIG. 34(c), can be obtained from a facial skin domain image 34c, shown in FIG. 34(b).

Here, for n, a suitable value should be selected in accordance with the image's size, characteristics, etc., for example 3 to 4. Incidentally, enlargement processing and reduction processing are discussed, for example, in Taniuchi's *Robot Vision*.

The facial mask (shown in FIG. 38(*f*)) obtained by means of the foregoing processing is used in limiting an extent to be processed by, for example, the processing for detecting a central axis to be discussed below.

Figure 39:
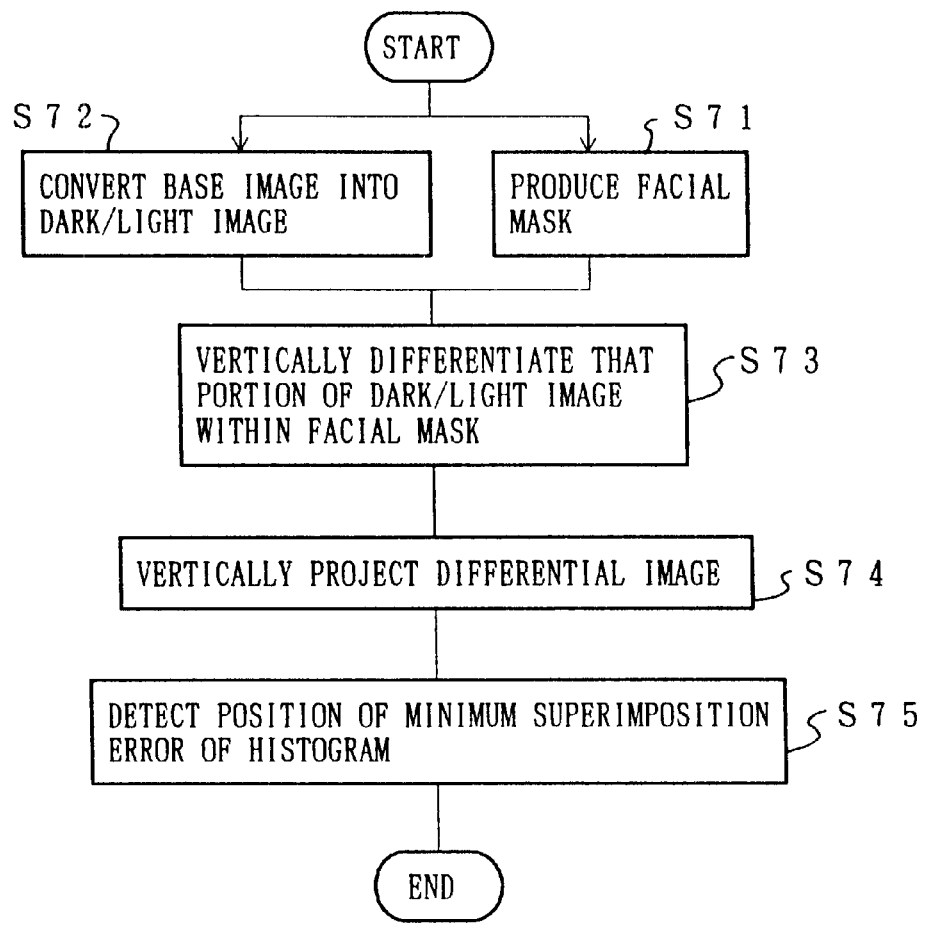
FIG. 39 is a flow-chart showing the flow of processing for detecting a central axis of a face.

Next, the flow of processing for detecting a central axis of the face will be discussed with reference to the flow-chart in FIG. 39 and to FIG. 38.

First, a facial mask is produced (S71). A facial mask is produced by means of the processing shown in FIG. 37.

In parallel with the producing of a facial mask in S71, the base image is converted into a dark/light image (S72). For example, extracting only brightness components from the base image shown in FIG. 38(*a*) yields the dark/light image shown in FIG. 38(*b*).

Next, that portion of the dark/light image within the facial mask is differentiated vertically (S73). In other words, a differential image is obtained whose pixel values are differential values in a vertical direction of those pixels of the dark/light image shown in FIG. 38(*b*) which correspond to the white pixels of the facial mask shown in FIG. 38(*f*). Such a differential image is as shown, for example, in FIG. 38(*g*).

Incidentally, in the differential image, pixels corresponding to the black pixels of the facial mask are given pixel values of 0. Here, in order to obtain a differential image, a method which makes use of Prewitt's operator, etc. (Taniuchi, *Robot Vision*) is used.

Next, the differential image obtained is projected vertically, yielding a histogram (S74). A histogram obtained in this way is as shown in FIG. 38(*h*).

Figure 40:
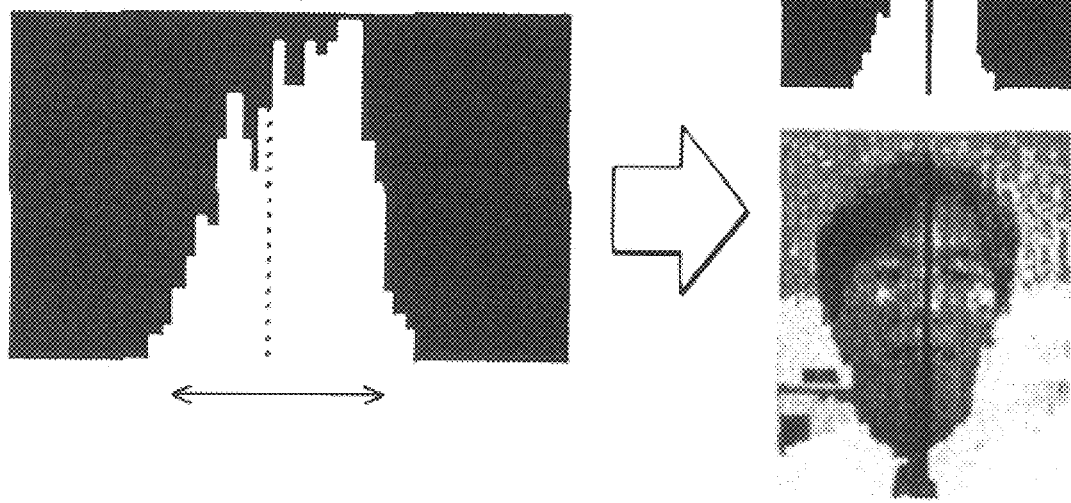
FIGS. 40(a) through 40(c) are drawings explaining processing for detecting a central axis of a face.

Next, a position of minimum superimposition error of the foregoing histogram is found (S75). Here, the vertical axis of the histogram is shown by the total of pixel values at the corresponding horizontal position in the differential image. Then, postulating a vertical axis which divides the histogram into left and right sections (as shown in FIG. 40(*a*)), a position for this vertical axis is searched for at which, if the histogram is folded along the vertical axis so as to superimpose the left and right sections, the square of a difference between corresponding superimposed columns of left and right sections is minimum, and this position is treated as the central axis of the face (FIG. 40(*c*)).

Figure 41:
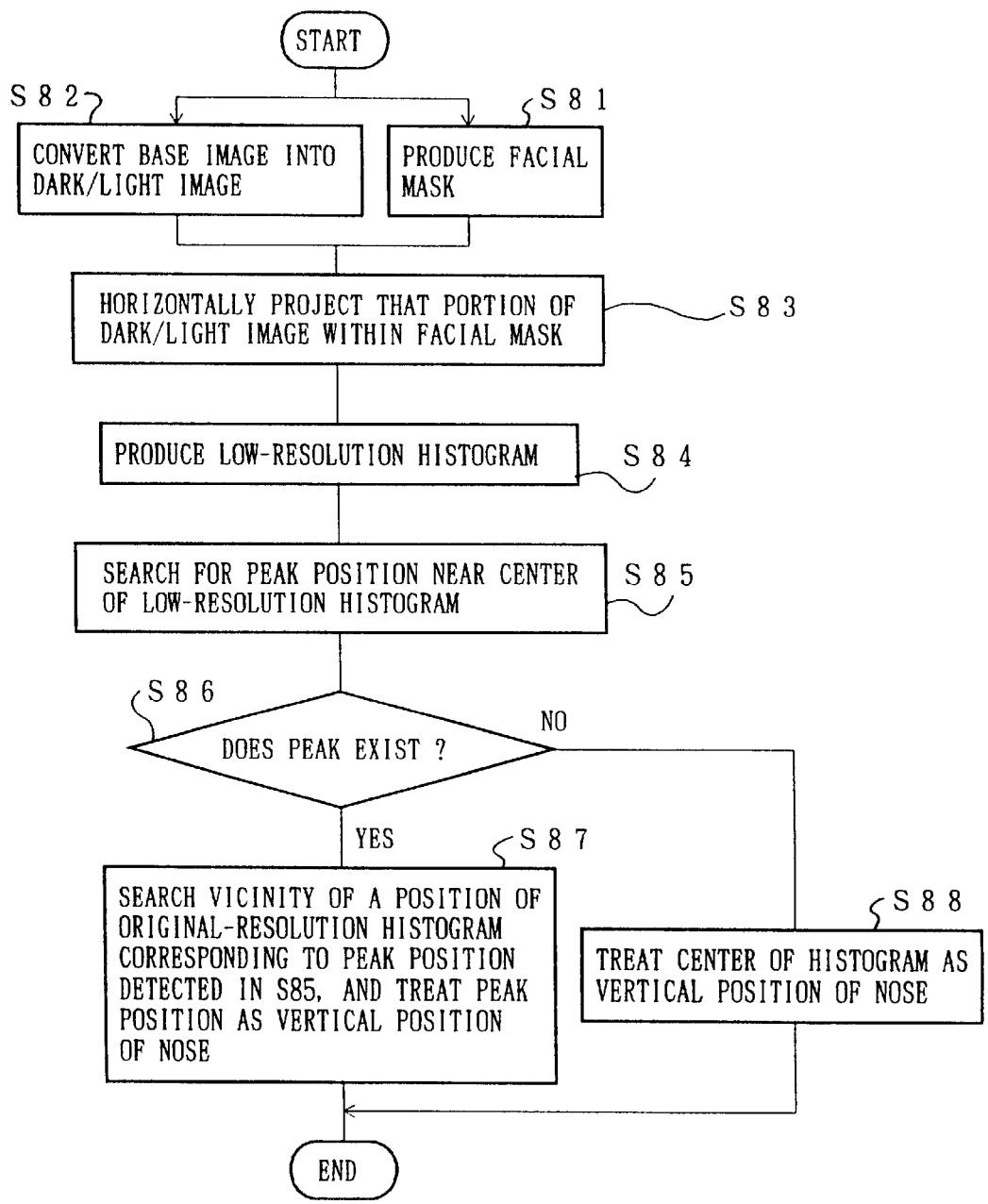
FIG. 41 is a flow-chart showing the flow of processing for detecting the vertical position of the nose in a face.

Next, the flow of processing for detecting the vertical position of the nose will be discussed with reference to the flow-chart in FIG. 41 and to FIG. 42.

First, a facial mask is produced (S81), while at the same time the inputted color image (base image) is converted into a dark/light image (S82). Here, the facial mask and the dark/light image are produced and converted from the base image shown in FIG. 42(*a*), yielding the facial mask shown in FIG. 42(*c*) and the dark/light image shown in FIG. 42(*b*).

Next, that portion of the dark/light image within the facial mask is projected horizontally (S83). In other words, the dark/light image within the facial mask is searched horizontally, and a histogram like that shown in FIG. 42(*d*), which projects mean brightness values, is produced.

Then a low-resolution histogram is produced (S84). In other words, resolution of the histogram produced above is decreased to produce a histogram like that shown in FIG. 42(*e*).

Next, a peak position is searched for around the center of the low-resolution histogram (S85). For example, in the low-resolution histogram shown in FIG. 42(*e*), a peak position 42*a* is found.

Then it is determined whether or not a peak exists (S86), and if no peak exists, the center of the histogram is treated as the vertical position of the nose (S88).

If, on the other hand, it is determined in S86 that there is a peak, the vicinity of a position of the histogram of original resolution corresponding to the peak position detected in S85 is searched, and the peak position is treated as the vertical position of the nose (S87).

In this way, when a peak exists, a peak position is searched for by searching the vicinity of a position of the histogram of original resolution corresponding to the peak position detected in S85. Thus, in the histogram of original resolution shown in FIG. 42(*f*), a peak position 42*b* is found. The peak position 42*b* is then treated as a vertical position 42*c* of the nose, as shown in FIG. 42(*g*).

Figure 43:
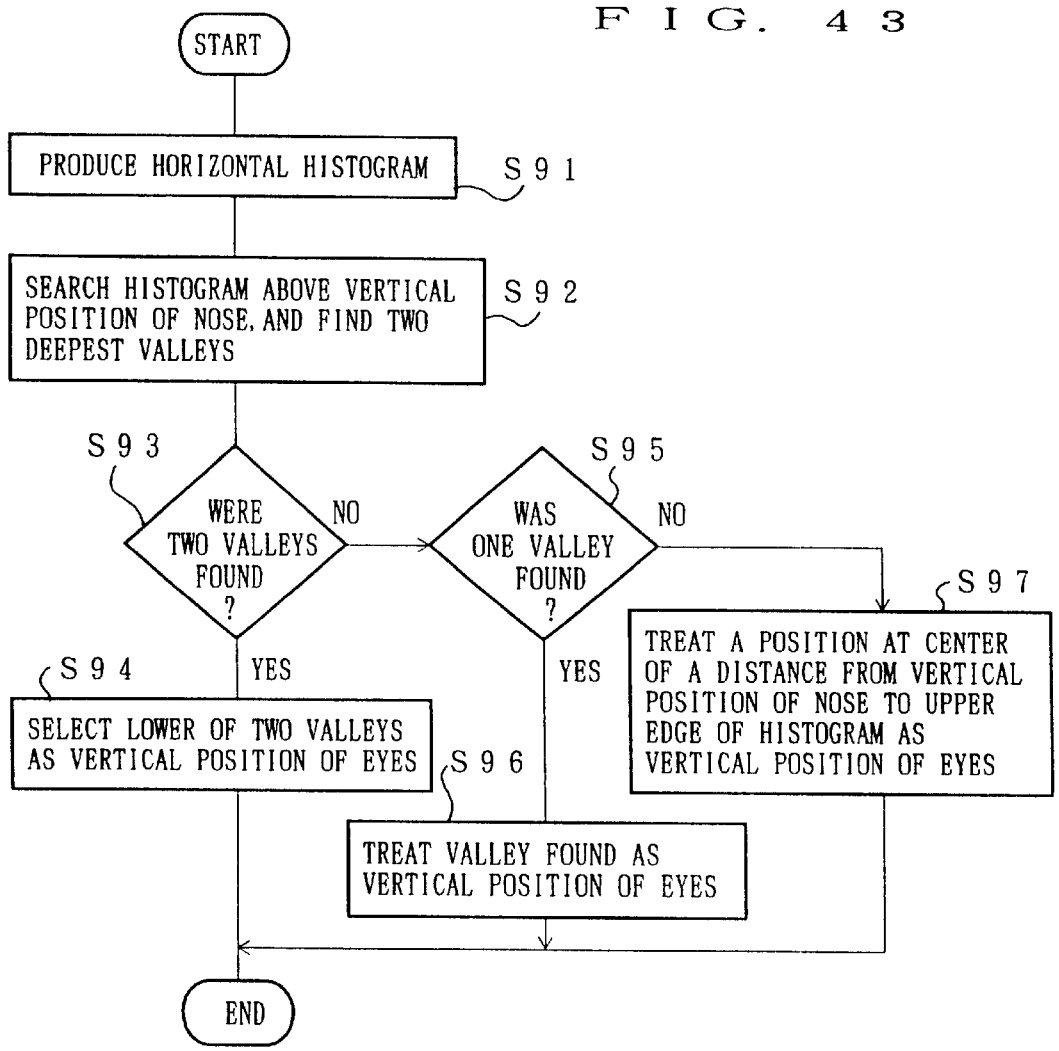
FIG. 43 is a flow-chart showing the flow of processing for detecting the vertical position of the eyes in a face.
Figure 44A:
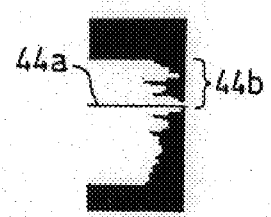
FIGS. 44(a) through 44(c) are drawings explaining processing for detecting the vertical position of the eyes.
Figures 44B, 44C:
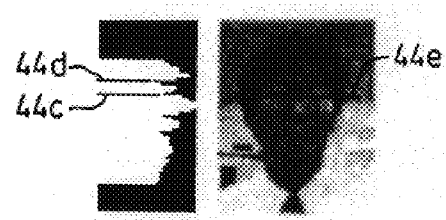

Next, the flow of processing for detecting the vertical position of the eyes will be discussed with reference to the flow-chart in FIG. 43 and to FIG. 44.

First, a histogram is prepared in a horizontal direction (S91). Preparation of this horizontal histogram is performed according to the method shown in the flow-chart shown in FIG. 41. The horizontal histogram is as shown in FIG. 44(*a*).

Next, searching the histogram above the vertical position of the nose, the two deepest valleys are found (S92).

Then it is determined whether two valleys have been found (S93). Here, if two valleys have been found, the lower of the two valleys is selected as the vertical position of the eyes (S94). In other words, as shown in FIG. 44(*a*), by searching the histogram in a range 44*b* above a vertical position 44*a* of the nose (detected according to the flow-chart in FIG. 41), the two deepest valleys 44*c* and 44*d*, shown in FIG. 44(*b*), are detected. When two valleys have been found, the lower of the two (valley 44*c*) is treated as the vertical position of the eyes.

If, on the other hand, it is determined in S93 that two valleys have not been found, it is next determined whether a single valley has been found (S95). Here, if a single valley has been found, the single valley is treated as the vertical position of the eyes (S96). In other words, when only one valley is found, that valley is treated as the vertical position of the eyes.

Further, if it is determined in S95 that not even one valley has been found, a position at the center of a distance from the vertical position of the nose to the upper edge of the histogram is treated as the vertical position of the eyes (S97). In other words, when not even one valley is found, a position at the center of a distance from the vertical position of the nose to the edge of the histogram is treated as the vertical position of the eyes. This is the vertical position 44*e* of the eyes, as shown in FIG. 44(*c*).

Figure 45:
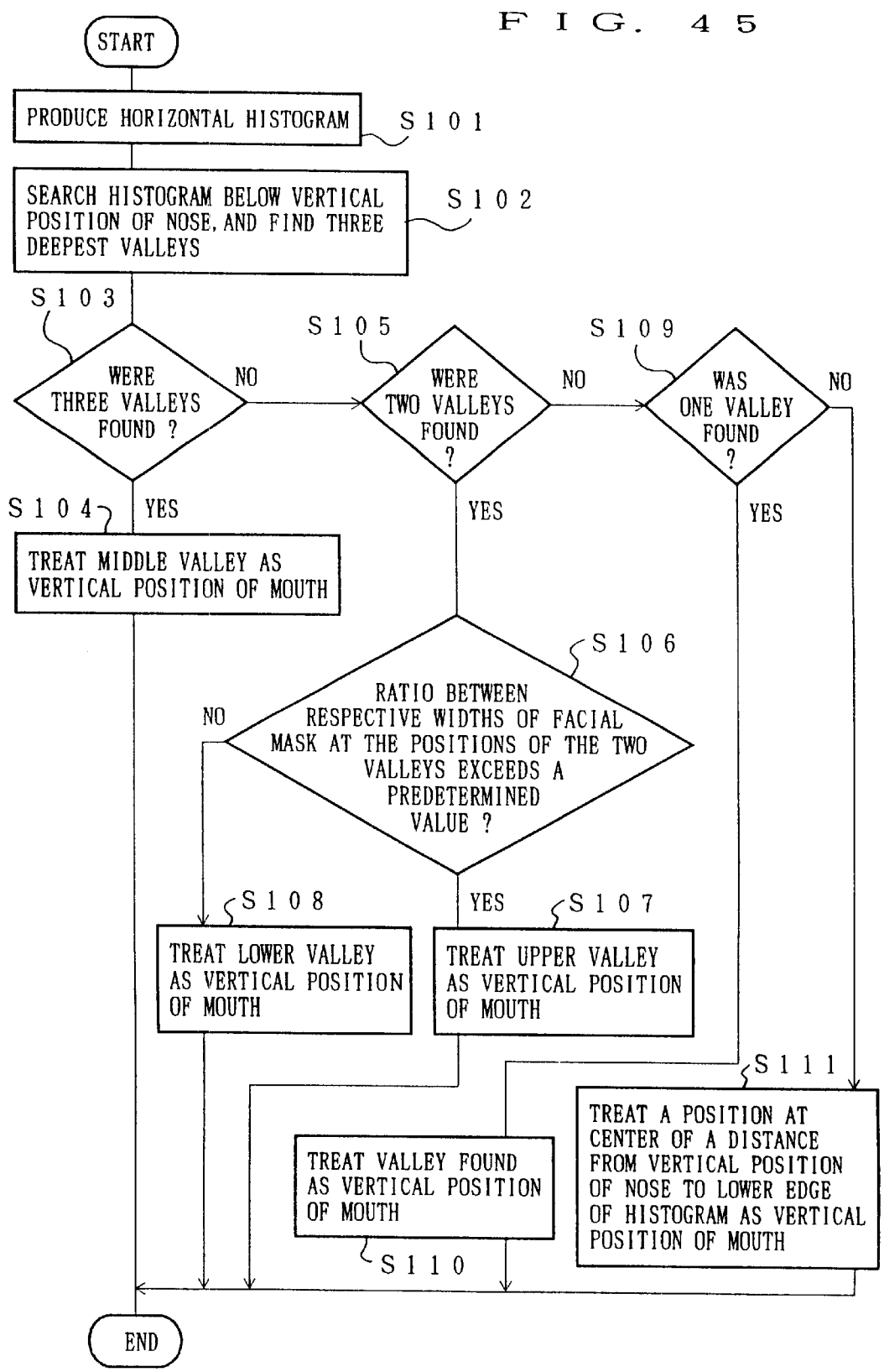
FIG. 45 is a flow-chart showing the flow of processing for detecting the vertical position of the mouth in a face.

Next, the flow of processing for detecting the vertical position of the mouth will be discussed with reference to the flow-chart in FIG. 45 and to FIG. 46.

First, a histogram is prepared in a horizontal direction (S101). Preparation of this horizontal histogram is performed according to the method shown in the flow-chart shown in FIG. 41. The horizontal histogram is as shown in FIG. 46(*a*).

Next, searching the histogram below the vertical position of the nose, the deepest three valleys are found (S102).

Then it is determined whether three valleys have been found (S103). Here, if three valleys have been found, the middle valley is selected as the vertical position of the mouth (S104).

Figure 46A:
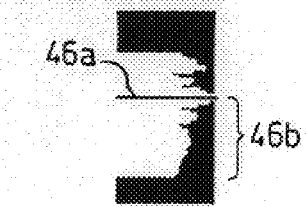
FIGS. 46(a) through 46(d) are drawings explaining processing for detecting the vertical position of the mouth.
Figures 46B, 46C:
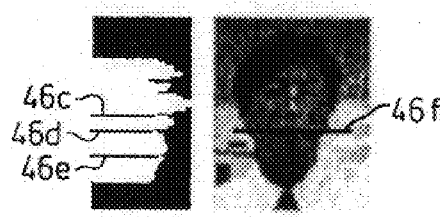

In other words, as shown in FIG. 46(*a*), by searching the histogram in a range 46*b* above a previously detected vertical position 46*a* of the nose, the three deepest valleys 46*c* through 46*e*, shown in FIG. 46(*b*), are detected. When three valleys have been found, the middle valley (valley 46*d*) is treated as the vertical position of the mouth. This is the vertical position 46*f* of the mouth, as shown in FIG. 46(*c*).

If, on the other hand, it is determined in S103 that three valleys have not been found, it is determined whether two valleys have been found (S105). Here, if two valleys have been found, it is determined whether a ratio between respective widths of the facial mask at the positions of the two valleys exceeds a predetermined value (S106).

If the ratio of widths of the facial mask in S106 does not exceed the predetermined value, the lower of the two valleys is treated as the vertical position of the mouth (S108).

Again, if the ratio of widths of the facial mask in S106 exceeds the predetermined value, the upper of the two valleys is treated as the vertical position of the mouth (S107).

Figure 46D:
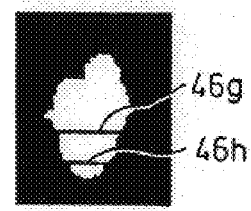

In other words, when only two valleys are found, first, as shown in FIG. 46(d), widths 46g and 46h of the facial mask at the respective positions of the valleys are detected. Then a ratio of the width 46h of the facial mask at the position of the lower valley to the width 46g of the facial mask at the position of the upper valley is calculated, and if the value thereof exceeds a predetermined value (0.7, for example), the upper valley is treated as the vertical position of the mouth. If the ratio does not exceed the predetermined value, the lower valley is treated as the vertical position of the mouth.

Again, if it is determined in S105 that two valleys have not been found, it is next determined whether a single valley has been found (S109). Here, if a single valley has been found, the single valley is treated as the vertical position of the mouth (S110). If, on the other hand, not even one valley has been found, a position at the center of a distance from the vertical position of the nose to the lower edge of the histogram is treated as the vertical position of the mouth (S111).

Figure 47:
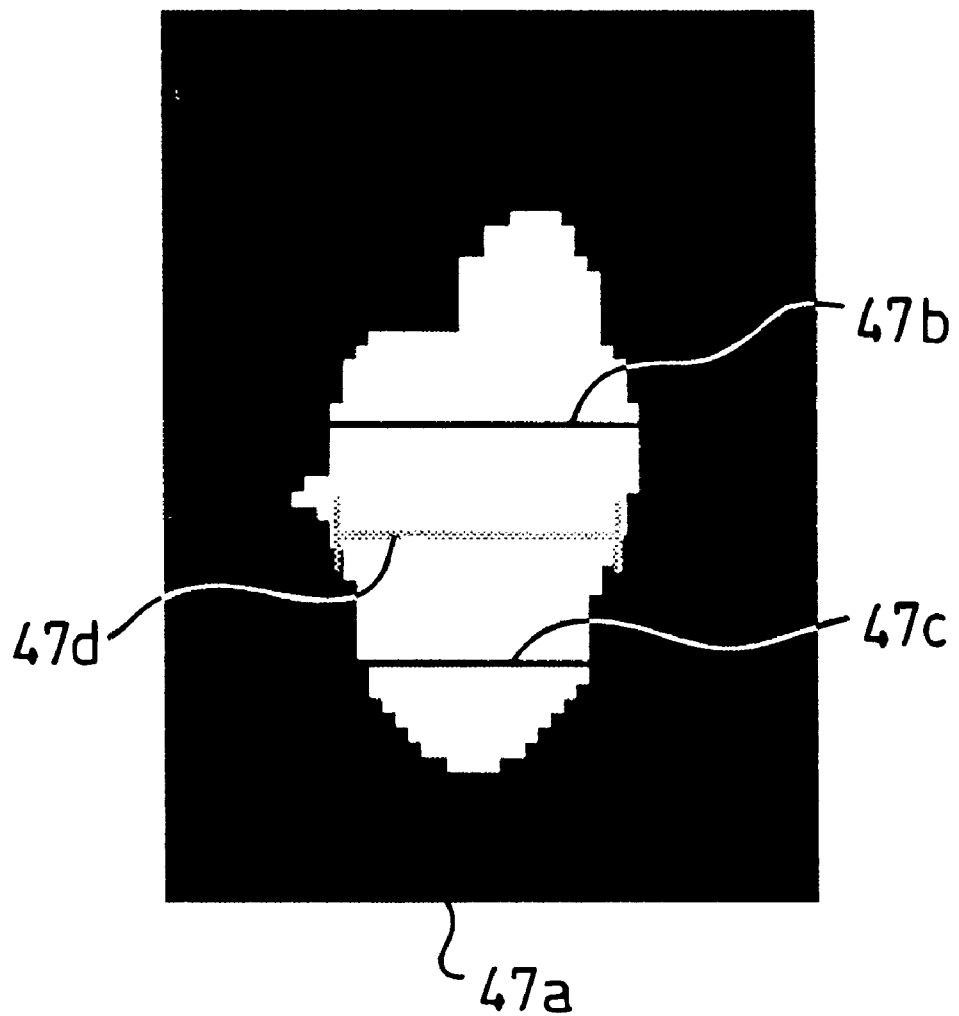
FIG. 47 is a drawing explaining processing for detecting the width of a facial mask.

By means of the foregoing processing, as shown in FIG. 47, a facial mask 47a, a vertical position 47b of the eyes and a vertical position 47c of the mouth are obtained. Then, widths of the facial mask 47a are found by searching the pixels horizontally at successive positions from the vertical position of the eyes to the vertical position of the mouth. A median value of the facial widths within this range is treated as a facial width 47d.

Figure 48:
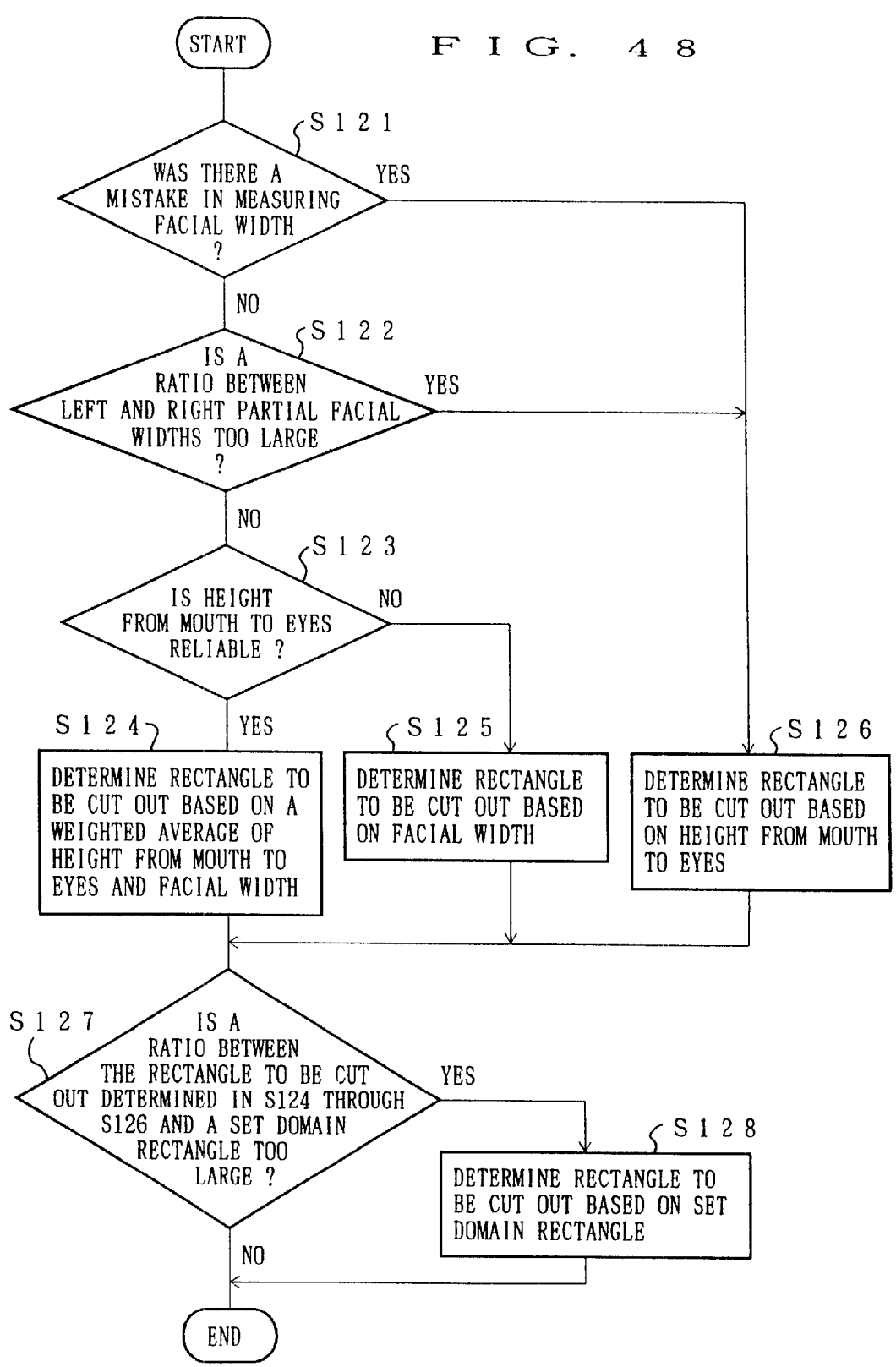
FIG. 48 is a flow-chart showing the flow of processing for cutting a rectangularly shaped part out of an obtained image.

Next, after detecting, from the facial mask, central axis, vertical positions of eyes and mouth, height from mouth to eyes, and facial width, this information is used to cut out from the original image a rectangular partial image which includes the face, such that facial size, horizontal position, and vertical position fit therein in a balanced manner. The following will explain the flow of processing for cutting out this partial image, with reference to the flow-chart in FIG. 48.

First, it is determined whether a mistake was made in measuring the facial width (S121). In other words, it is determined whether the facial width is reliable. As discussed above, facial width was detected by searching the pixels horizontally at successive positions from the vertical position of the eyes to the vertical position of the mouth. Since, as discussed above, the central axis of the face has been found, a part of the facial width to the left of the central axis is treated as left partial facial width, and a part of the facial width to the right of the central axis is treated as right partial facial width.

Accordingly, it can be determined whether a mistake was made in measuring facial width by confirming that neither the left partial facial width nor the right partial facial width is 0.

If it is determined in S121 that no mistake was made in measuring facial width, it is determined whether a ratio between left and right partial facial widths is too large (S122). In other words, a ratio between the left and right facial widths is calculated, and it is determined whether this ratio is within a certain range of a previously set threshold value.

If the ratio between left and right partial facial widths in S122 is not too large, i.e., when the ratio between left and right partial facial widths is within a certain range of the previously set threshold value (if the facial width is reliable), it is determined whether the detected height from mouth to eyes is reliable (S123). The method of making this determination is, for example, to calculate a ratio between the detected height from mouth to eyes to the height of the extracted image extracted from the inputted image, and to confirm whether this ratio is within a certain range of a previously set threshold value.

Then, if it was determined in S123 that the height from mouth to eyes was reliable, a rectangle to be cut out is determined from a weighted average of the height from mouth to eyes and the facial width (S124). In other words, when both the facial width and the height from mouth to eyes are reliable, the rectangle to be cut out is determined from both of these values. Specifically, first, the detected central axis and vertical position of the nose are used as standard points. Then the facial width and the height from mouth to eyes are multiplied by a previously set factor, and a weighted arithmetic mean is calculated. Then a rectangle to be cut out is obtained by adding to each standard point, in right, left, upward and downward directions, a length obtained by multiplying the calculated mean by a previously set factor.

If, on the other hand, it is determined in S123 that the height from mouth to eyes is not reliable, the rectangle to be cut out is determined based solely on the facial width (S125). In other words, if the ratio of the height from mouth to eyes is outside a certain range from the threshold value, the detected vertical positions of the eyes and mouth (and the height from mouth to eyes) is determined to be unreliable, and the rectangle to be cut out is determined from the facial width. Specifically, using as standard points the detected central axis of the face and the vertical center of an oval domain containing the human face, calculated from the two provisional domains, a rectangle to be cut out is obtained by adding to each standard point, in right, left, upward and downward directions, a length obtained by multiplying the facial width by a previously set factor.

If it is determined in S121 that a mistake was made in measuring facial width, or if the ratio between left and right partial facial widths in S122 is too large, the supposed facial width is determined to be unreliable, and the rectangle to be cut out is determined from the detected height from mouth to eyes (S126). Specifically, using as standard points the detected central axis and the detected vertical position of the nose, a rectangle to be cut out is determined by adding to each standard point, in left, right, upward, and downward directions, a length obtained by multiplying the height from mouth to eyes by a previously set factor.

Finally, it is determined whether a ratio between the rectangle to be cut out determined in S124 through S126 and a set domain rectangle is too large (S127). In other words, a ratio between size of the rectangle to be cut out and a rectangle size calculated from the set domain rectangle is calculated, and it is determined whether this ratio is within a certain range of a previously set threshold value. Here, the "set domain rectangle" corresponds to the object domain 136 (see FIG. 14(a)) obtained for the target object 135 by the image processing device in the first embodiment above.

If, in S127, the ratio is within a certain range of the threshold value, processing is terminated.

If, on the other hand, the ratio in S127 is not within a certain range of the threshold value, the rectangle to be cut out is determined to be unsuitable, and a rectangle to be cut out is determined from the set domain rectangle (S128). Specifically, using as a standard point the center of the set domain rectangle, a rectangle to be cut out is determined by adding to the standard point, in left, right, upward, and downward directions, a length obtained by multiplying the height of the set domain rectangle by a previously set factor.

As discussed above, when the specified object domain is a human face domain, a desired human image can be extracted in a balanced manner from an image (photograph, etc.) showing people. At this time, by first limiting an extent in the base image by using two provisional domains to extract a domain containing the human face domain, and then extracting the human face domain on the basis of image information obtained from the human face domain, the human face domain can be extracted accurately and quickly.

Incidentally, as image information obtained from the human facial domain, not only facial color information, but also facial structure information can be used. In other words, when viewed from the front, a human face has a fixed structure of, for example, a mouth below two eyes, and accordingly such structural information peculiar to human faces can be used as the basis for extracting the facial domain. In this case, as well, in searching the base image for a domain having a structure peculiar to human faces, by first limiting an extent in the base image by using two provisional domains to extract a domain containing the human face domain, the domain search can be performed accurately and quickly.

However, if extraction of a facial domain on the basis of facial color and structural information is attempted over the entirety of the base image, without first limiting the extent by means of processing using the two provisional domains, correct domain extraction is difficult. This is because, due to individual differences in facial color, etc., and to differences in illumination, etc., the range of human faces contains a large extent of information, thus making it difficult to extract a correct facial domain without first limiting the extent. Thus it is easy to see that the domain extraction processing according to the present embodiment, making use of two provisional domains, is a superior technique.

As discussed above, a first image processing device according to the present invention extracts from an image obtained from outside the device a partial image containing a specified object domain for extraction, and includes: image extraction processing means, which set two mutually exclusive provisional domains in the obtained image, and extract the partial image based on separability of the two provisional domains.

In the foregoing structure, a partial image containing a specified object domain is extracted from the obtained image based on separability of two set provisional domains. Accordingly, the specified object domain to be extracted can be clearly distinguished from other image domains. In other words, by calculating separability of the two provisional domains, it is possible to detect a state in which the specified object domain is contained within the provisional domains.

In this way, when a state is detected in which the specified object domain is contained within the provisional domains, if an image containing the provisional domains is extracted as the partial image, the specified object domain is necessarily arranged in a balanced manner in the partial image.

Accordingly, using the foregoing image extraction processing means, a partial image containing a specified object domain can be extracted quickly and with certainty, such that the specified object domain is arranged in a balanced manner therein.

In order to realize the foregoing image extraction processing means, the following second image processing device, for example, can be applied.

A second image processing device according to the present invention is structured as the first image processing device above, in which the image extraction processing means include: domain setting means, which set two mutually exclusive provisional domains in the obtained image; image information obtaining means, which obtain image information of each of the provisional domains; calculating means, which, based on the image information, calculate separability of the two provisional domains; and image extracting means, which, based on the calculated separability, extract part of the obtained image such that the specified object domain present in the obtained image is contained in the partial image.

Further, in order to extract the specified object image from the partial image extracted above, the following third image processing device, for example, can be applied.

A third image processing device according to the present invention is structured as the second image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

Further, the foregoing image information may be pixel distribution information, as in the following fourth image processing device.

In a fourth image processing device according to the present invention, when the image information obtained is pixel distribution information, a probability density function is calculated from the distribution information, and, by applying the probability density function to the foregoing partial image, a domain is extracted which is smaller than the partial image, and which contains the specified object domain.

A fifth image processing device according to the present invention is structured as any one of the first through fourth image processing devices above, in which the specified object domain is a human face domain.

In this way, if the specified object domain is a human face domain, a desired human image can be extracted in a balanced manner from an image (photograph, etc.) showing people. At this time, by extracting the human face domain on the basis of image information obtained from the human face domain, the human face domain can be extracted accurately and quickly.

A sixth image processing device according to the present invention is structured as the fifth image processing device above, in which the image extracting means include: means for obtaining image information of an extracted human face domain; and means for detecting from the image information numerical information made up of facial width, vertical axis of symmetry, and vertical positions of eyes, nose, and mouth; in which the image extracting means, based on the numerical information, extract part of the obtained image such that a facial portion contained in the human face domain has a predetermined size and position.

A seventh image processing device according to the present invention is structured as the first image processing device above, further including: point indicating means which indicate a given point in the obtained image; in which the image extraction processing means include: domain setting means which, when the point indicating means indicate a point in the center of the specified object domain present in the obtained image, set a first provisional domain containing the indicated point and a second provisional domain exclusive of the first provisional domain; calculating means which calculate separability of the first and second provisional domains based on image information of the first and second provisional domains; and image extracting means which, based on a separability series obtained by incrementally changing the sizes of the first and second provisional windows, extract part of the obtained image such that the specified object domain, containing at its own center the point indicated by the point indicating means, falls in the center of the partial image.

With the foregoing structure, in addition to the effects of the first image processing device above, since a point in the center of the specified object domain is indicated, and the provisional domains are set based on the indicated point, the amount of calculation of separability of provisional domains is reduced. As a result, the time required for extraction of a partial image can be greatly reduced.

An eighth image processing device according to the present invention is structured as the seventh image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

With the third image processing device above, a plurality of partial images (candidate domains) are extracted, and it is necessary to select a suitable one from among them, but with the eighth image processing device, since a point in the specified image domain is indicated by the point indicating means and the partial image is extracted based on the indicated point, the specified image can be extracted from the partial image with certainty.

Further, the foregoing image information may be pixel distribution information, as in the following ninth image processing device.

A ninth image processing device according to the present invention is structured as the eighth image processing device above, which, when the image information obtained is pixel distribution information, calculates a probability density function from the distribution information, and, by applying the probability density function to the foregoing partial image, extracts a domain, smaller than the partial image, which contains the specified object domain.

A tenth image processing device according to the present invention is structured as any one of the seventh through ninth image processing devices above, in which the specified object domain is a human face domain.

In this way, if the specified object domain is a human face domain, a desired human image can be extracted in a balanced manner from an image (photograph, etc.) showing people. At this time, by extracting the human face domain on the basis of image information obtained from the human face domain, the human face domain can be extracted accurately and quickly.

Moreover, since a point in the specified image domain is indicated by the point indicating means, the human face domain of a particular person can be extracted with certainty.

An eleventh image processing device according to the present invention is structured as the tenth image processing device above, in which the image extracting means include: means for obtaining image information of an extracted human face domain; and means for detecting from the image information numerical information made up of facial width, vertical axis of symmetry, and vertical positions of eyes, nose, and mouth; in which the image extracting means, based on the numerical information, extract part of the obtained image such that a facial portion contained in the human face domain has a predetermined size and position.

With the foregoing structure, in addition to the effects of the eleventh image processing device above, when extracting a portrait image from the human face domain, a single portrait image can be extracted with certainty.

A twelfth image processing device is structured as the seventh image processing device above, in which, when the point indicating means indicate a point in a position other than the center of the specified object domain present in the obtained image, the image extracting means, based on a separability series obtained by incrementally changing the sizes and positions, or the sizes, positions, and shapes of the provisional windows, extract part of the obtained image so as to contain the specified object domain, which in turn contains the point indicated by the point indicating means.

Incidentally, when the center of the provisional domains and the center of the specified object domain are in roughly the same position, it is satisfactory if the point indicating means indicate a point roughly in the center of the specified object domain, but when the respective centers of the provisional domains and the specified object domain differ, the provisional domains cannot be set satisfactorily if the point indicating means indicate a point in the center of the specified object domain, and an erroneous specified object domain may be extracted.

However, with the structure of the twelfth image processing device, in addition to the effects of the seventh image processing device above, even if the respective centers of the provisional domains and the specified object domain differ because the point indicating means indicate a point in a position other than the center of the specified object domain, the specified object domain can still be extracted with certainty.

A thirteenth image processing device according to the present invention is structured as the twelfth image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

A fourteenth image processing device according to the present invention is structured as the thirteenth image processing device above, which, when the image information obtained is pixel distribution information, calculates a probability density function from the distribution information, and, by applying the probability density function to the foregoing partial image, extracts a domain, smaller than the partial image, which contains the specified object domain.

A fifteenth image processing device according to the present invention is structured as any one of the twelfth through fourteenth image processing devices above, in which the specified object domain is a human face domain.

In this way, if the specified object domain is a human face domain, a desired human image can be extracted in a balanced manner from an image (photograph, etc.) showing people. At this time, by extracting the human face domain on the basis of image information obtained from the human face domain, the human face domain can be extracted accurately and quickly.

Moreover, even if the respective centers of the specified object domain and the partial image to be extracted differ because the point indicating means indicate a point in a position other than the center of the specified object domain, the specified object domain, which is a human face domain in this case, can still be extracted without error.

A sixteenth image processing device according to the present invention is structured as the fifteenth image processing device above, in which the image extracting means include: means for obtaining image information of an extracted human face domain; and means for detecting from the image information numerical information made up of facial width, vertical axis of symmetry, and vertical positions of eyes, nose, and mouth; in which the image extracting means, based on the numerical information, extract part of the obtained image such that a facial portion contained in the human face domain has a predetermined size and position.

With the foregoing structure, in addition to the effects of the fifteenth image processing device above, when extracting a portrait image from the human face domain, a single portrait image can be extracted with certainty.

A seventeenth image processing device according to the present invention is structured as the first image processing device above, in which the image extraction processing means further include memory means which store the obtained image; and, when the obtained image is a moving image made up of a series of electronic images, the image extraction processing means read out, as an image in question, a given image of the series of images stored in the memory means; extract part of the image in question such that a specified object domain present in the image in question is contained in the partial image; set in the image in question a pair of windows made up of two provisional domains; using image information of the pair of windows as initial values for the next image in the series of obtained images, change size and position of the provisional domains to obtain various changed image information; and use the changed image information to determine the most suitable pair of windows.

With the foregoing structure, in addition to the effects of the first image processing device above, a time sequence of partial images are extracted in such a way that the specified object domain is arranged in a balanced manner therein, and thus a specified object domain can be followed in a moving image.

An eighteenth image processing device according to the present invention is structured as the seventeenth image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

A nineteenth image processing device according to the present invention is structured as either the seventeenth or eighteenth image processing device above, in which the specified object domain in the series of electronic images stored in the memory means is a human face domain.

In this way, if the specified object domain in the series of electronic images stored in the memory means is a human face domain, a desired human image can be extracted in a balanced manner from a moving image showing people. Consequently, the specified object domain, which in this case is a human face domain, can be followed in a moving image.

A twentieth image processing device according to the present invention is structured as the seventeenth image processing device above, further including: point indicating means which indicate a given point in the obtained image; in which the image extraction processing means include: memory means which store the obtained image; means which, when the obtained image is a moving image made up of a series of electronic images, and when the image extraction processing means read out, as an image in question, a given image of the series of images stored in the memory means and the point indicating means indicate a point in the center of the specified object domain present in the image in question, set a first provisional domain containing the indicated point and a second provisional domain exclusive of the first provisional domain; means for calculating separability of the specified object domain and the first and second provisional domains based on image information of the first and second provisional domains; and means which, based on a separability series obtained by incrementally changing the sizes of the first and second provisional domains, extract part of the image in question such that the specified object domain, containing at its own center the point indicated by the point indicating means, falls in the center of the partial image; in which the image extraction processing means, using pixel values of the two provisional domains as initial values for the next image in the series of obtained images, change size and position of the provisional domains to obtain various image information, and use the image information to determine the most suitable pair of windows.

With the foregoing structure, in addition to the effects of the seventeenth image processing device above, since a point in the center of the specified object domain is indicated, and the provisional domains are set based on the indicated point, the amount of calculation of separability of provisional domains is reduced. As a result, the time required for extraction of a partial image can be greatly reduced.

A twenty-first image processing device according to the present invention is structured as the twentieth image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

With the foregoing structure, in addition to the effects of the twentieth image processing device above, a further provisional domain is set in part of the partial image extracted so as to contain the specified object domain, image information of the provisional domain is obtained, and, based on the image information, a domain, smaller than the partial image, which contains the specified object domain, is extracted. Accordingly, the specified object domain can be extracted from the partial image with certainty, and, as a result, the specified object domain can be followed with greater accuracy.

A twenty-second image processing device according to the present invention is structured as either the twentieth or the twenty-first image processing device above, in which the specified object domain in the series of electronic images stored in the memory means is a human face domain.

In this way, if the specified object domain in the series of electronic images stored in the memory means is a human face domain, a desired human image can be extracted in a balanced manner from a moving image showing people. Consequently, the specified object domain, which in this case is a human face domain, can be followed in a moving image.

A twenty-third image processing device according to the present invention is structured as the seventeenth image processing device above, further including: point indicating means which indicate a given point in the obtained image; in which the image extraction processing means include: memory means which store the obtained image; means which, when the obtained image is a moving image made up of a series of electronic images, and when the image extraction processing means read out, as an image in question, a given image of the series of images stored in the memory means and the point indicating means indicate a given point in the specified object domain present in the image in question, set a first provisional domain containing the indicated point and a second provisional domain exclusive of the first provisional domain; means for calculating separability of the specified object domain and the first and second provisional domains based on image information of the first and second provisional domains; and means which, based on a separability series obtained by incrementally changing the sizes of the first and second provisional domains, extract part of the image in question such that the specified object domain, which contains the point indicated by the point indicating means, falls in the center of the partial image; in which the image extraction processing means, using pixel values of the two provisional domains as initial values for the next image in the series of obtained images, change size and position of the provisional domains to obtain various image information, and use the image information to determine the most suitable pair of windows.

With the foregoing structure, in addition to the effects of the seventeenth image processing device above, even if the respective centers of the provisional domains and the specified object domain differ because the point indicating means indicate a point in a position other than the center of the specified object domain, the specified object domain can still be extracted with certainty. Accordingly, a partial image containing a specified object domain can be followed in a moving image with greater accuracy.

A twenty-fourth image processing device according to the present invention is structured as the twenty-third image processing device above, which, when the image information obtained is pixel distribution information, calculates a probability density function based on the distribution information, and, by applying the probability density function to the foregoing partial image, extracts a domain, smaller than the partial image, which contains the specified object domain.

A twenty-fifth image processing device according to the present invention is structured as the twenty-third image processing device above, in which the image extracting means set a provisional domain in part of the partial image extracted so as to contain the specified object domain, obtain image information of the provisional domain, and, based on the image information, extract a domain, smaller than the partial image, which contains the specified object domain.

A twenty-sixth image processing device according to the present invention is structured as any one of the twenty-third through twenty-fifth image processing devices above, in which the specified object domain in the series of electronic images stored in the memory means is a human face domain.

In this way, if the specified object domain in the series of electronic images stored in the memory means is a human face domain, a desired human image can be extracted in a balanced manner from a moving image showing people. Consequently, the specified object domain, which in this case is a human face domain, can be followed in a moving image.

Further, a twenty-seventh image processing device according to the present invention is structured as the twenty-sixth image processing device above, in which the image extracting means include: means for obtaining image information of an extracted human face domain; and means for detecting from the image information numerical information made up of facial width, vertical axis of symmetry, and vertical positions of eyes, nose, and mouth; in which the image extracting means, based on the numerical information, extract part of the obtained image such that a facial portion contained in the human face domain has a predetermined size and position.

Again, as means of achieving the aforementioned objects, in addition to the respective means of the first through twenty-seventh image processing devices above, a program for executing image extraction processing according to the present invention may be recorded in a computer-readable recording medium.

Specifically, a first computer-readable recording medium according to the present invention records an image extraction processing program for causing a computer to execute processing including the steps of: setting two mutually exclusive provisional domains in an obtained image; and extracting a specified object domain based on image information of the provisional domains.

A second computer-readable recording medium according to the present invention records an image extraction processing program for causing a computer to execute processing including the steps of: setting two mutually exclusive provisional domains in an obtained image; obtaining image information of the respective provisional domains; calculating separability of the provisional domains based on the image information; and extracting part of the obtained image such that a specified object domain present in the obtained image is contained in the partial image.

A third computer-readable recording medium according to the present invention records an image extraction processing program for causing a computer to execute processing including the steps of: when a point at the center of a specified object domain present in an obtained image is indicated, setting a first provisional domain containing the indicated point and a second provisional domain exclusive of the first provisional domain; calculating separability of the first and second provisional domains based on image information of the first and second provisional domains; and, based on a separability series obtained by incrementally changing the sizes of the first and second provisional domains, extracting part of the obtained image such that the specified object domain, containing at its own center the indicated point, falls in the center of the partial image.

A fourth computer-readable recording medium according to the present invention records an image extraction processing program for causing a computer to execute processing including the step of: when a point other than the center of a specified object domain present in an obtained image is indicated, based on a separability series obtained by incrementally changing the sizes and positions, or the sizes, positions, and shapes of provisional domains, extracting part of the obtained image so as to contain the specified object domain, which in turn contains the indicated point.

A fifth computer-readable recording medium according to the present invention records an image extraction processing program for causing a computer to execute processing including the steps of: when a stored obtained image is a moving image made up of a series of electronic images, reading out a given image of the series of stored images as an image in question; extracting part of the image in question so as to contain a specified object domain present in the image in question; setting in the image in question a pair of windows made up of two provisional domains; and, using image information of the two provisional domains as initial values for the next image in the series of obtained images, changing size and position of the provisional domains to obtain various changed image information, and using the changed image information to determine the most suitable pair of windows.

A sixth computer-readable recording medium according to the present invention records an image extraction processing program for causing a computer to execute processing including the steps of: when an obtained image is a moving image made up of a series of electronic images stored in memory means, and when a given image of the stored series of images is read out as an image in question and a point in the center of a specified object domain present in the image in question is indicated, setting a first provisional domain containing the indicated point and a second provisional domain exclusive of the first provisional domain; calculating separability of the specified object domain and the first and second provisional domains based on image information of a pair of windows made up of the first and second provisional domains; based on a separability series obtained by incrementally changing the sizes of the first and second provisional domains, extracting part of the image in question such that the specified object domain, containing at its own center the indicated point, falls in the center of the partial image; setting in the image in question a pair of windows made up of two provisional domains; and, using image information of the pair of windows as initial values for the next image in the series of obtained images, changing size and position of the provisional domains to obtain various changed image information, and using the changed image information to determine the most suitable pair of windows.

A seventh computer-readable recording medium according to the present invention records an image extraction processing program for causing a computer to execute processing including the steps of: when an obtained image is a moving image made up of a series of electronic images, and when a given image of the stored series of images is read out as an image in question and a given point in a specified object domain present in the image in question is indicated, setting a first provisional domain containing the indicated point and a second provisional domain exclusive of the first provisional domain; calculating separability of the specified object domain and the first and second provisional domains based on image information of the first and second provisional domains; based on a separability series obtained by incrementally changing the sizes of the first and second provisional domains, extracting part of the image in question such that the specified object domain, containing at its own center the indicated point, falls in the center of the partial image; setting in the image in question a pair of windows made up of two provisional domains; and, using image information of the pair of windows as initial values for the next image in the series of obtained images, changing size and position of the provisional domains to obtain various changed image information, and using the changed image information to determine the most suitable pair of windows.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention and the scope of the patent claims set forth below.

What is claimed is:

1. An image processing device which extracts from an image obtained from outside said image processing device a partial image containing a specified object domain for extraction, comprising:

image extraction processing means, which set two mutually exclusive provisional domains in the obtained image, and extract the partial image based on separability of the two provisional domains, wherein said image extraction processing means extract the partial image based on a separability series obtained by incrementally changing the sizes of the two provisional domains, and wherein the sizes of the two provisional domains are changed by setting the two provisional domains in the obtained image to initially have sizes smaller than a size of the obtained image, and then successively increasing the sizes of the two provisional domains, while keeping their centers fixed, until they exceed limits of a screen of the obtained image.

2. The image processing device set forth in claim 1, wherein:

the two mutually exclusive provisional domains are a first provisional domain and a second provisional domain surrounding the first provisional domain, an inner boundary of the second provisional domain being in contact with an outer boundary of the first provisional domain.

3. The image processing device set forth in claim 2, wherein:

the outer boundary of the first provisional domain has a shape which is substantially the same as that of the specified object domain for extraction.

4. The image processing device set forth in claim 2, wherein:

respective outer boundaries of the first and second provisional domains have mutually similar shapes.

5. The image processing device set forth in claim 4, wherein:

respective outer boundaries of the first and second provisional domains have shapes which are substantially the same as that of the specified object domain for extraction.

6. The image processing device set forth in claim 2, wherein:

said image extraction processing means extract the partial image based on a separability series obtained by incrementally changing the sizes of the first and second provisional domains.

7. The image processing device set forth in claim 2, wherein:

said image extraction processing means set first provisional domains centered on each of the pixels of the obtained image.

8. The image processing device set forth in claim 1, wherein said image extraction processing means include:

domain setting means, which set the two mutually exclusive provisional domains in the obtained image;

image information obtaining means, which obtain image information of each of the provisional domains;

calculating means, which, based on the image information, calculate the separability of the two provisional domains; and image extracting means, which, based on the calculated separability, extract the partial image from the obtained image such that the specified object domain present in the obtained image is contained in the partial image.

9. The image processing device set forth in claim 8, wherein:
said image extracting means set a further provisional domain in part of the partial image extracted so as to contain the specified object domain, obtain image information of the further provisional domain, and, based on the image information, extract a domain, smaller than the partial image, which contains the specified object domain.

10. The image processing device set forth in claim 9, wherein:
when the image information obtained is pixel distribution information, said image extracting means calculate a probability density function from the distribution information, and, by applying the probability density function to the partial image, extract a domain, smaller than the partial image, which contains the specified object domain.

11. The image processing device set forth in claim 1, wherein:
the specified object domain is a human face domain.

12. The image processing device set forth in claim 11, wherein said image extracting means include:
means for obtaining image information of an extracted human face domain; and
means for detecting, as numerical information, facial characteristics from the image information;
wherein said image extracting means, based on the numerical information, extract the partial image from the obtained image such that a facial portion contained in the human face domain has a predetermined size and position.

13. The image processing device set forth in claim 12, wherein:
said numerical information is at least one of facial width, vertical axis of symmetry, vertical position of eyes, vertical position of nose, and vertical position of mouth.

14. An image processing device which extracts from an image obtained from outside said image processing device a partial image containing a specified object domain for extraction, comprising:
image extraction processing means, which set two mutually exclusive provisional domains in the obtained image, and extract the partial image based on separability of the two provisional domains,
point indicating means which indicate a given point in the obtained image, the point indicated by the point indicating means in the obtained image being indicated by a user, wherein:
said image extraction processing means include:
domain setting means, which set the two mutually exclusive provisional domains in the obtained image;
image information obtaining means, which obtain image information of each of the provisional domains;
calculating means, which, based on the image information, calculate separability of the two provisional domains; and
image extracting means, which, based on the calculated separability, extract the partial image from the obtained image such that the specified object domain present in the obtained image is contained in the partial image, and wherein
said domain setting means set a first provisional domain containing the point indicated by said point indicating means, and a second provisional domain exclusive of the first provisional domain; and
said image extracting means extract the partial image from the obtained image such that the partial image contains the specified object domain, which in turn contains the point indicated by said point indicating means.

15. The image processing device set forth in claim 14, wherein:
the second provisional domain surrounds the first provisional domain, an inner boundary of the second provisional domain being in contact with an outer boundary of the first provisional domain.

16. The image processing device set forth in claim 15, wherein:
at least one of an outer boundary of the first provisional domain and an outer boundary of the second provisional domain has a shape which is substantially the same as that of the specified object domain for extraction.

17. The image processing device set forth in claim 14, wherein:
when said point indicating means indicate a point in the center of the specified object domain present in the obtained image, said domain setting means set a first provisional domain containing the point indicated by said point indicating means, and a second provisional domain exclusive of the first provisional domain, and incrementally change sizes of the first and second provisional domains; and
said image extracting means, based on a separability series obtained by incrementally changing the sizes of the first and second provisional windows, extract the partial image from the obtained image such that the specified object domain, which is present in the obtained image and which contains at its own center the point indicated by said point indicating means, falls in the center of the partial image.

18. The image processing device set forth in claim 17, wherein:
said image extracting means set a further provisional domain in part of the partial image extracted so as to contain the specified object domain, obtain image information of the further provisional domain, and, based on the image information, extract a domain, smaller than the partial image, which contains the specified object domain.

19. The image processing device set forth in claim 18, wherein:
when the image information obtained is pixel distribution information, said image extracting means calculate a probability density function from the distribution information, and, by applying the probability density function to the partial image, extract a domain, smaller than the partial image, which contains the specified object domain.

20. The image processing device set forth in claim 17, wherein:
the specified object domain is a human face domain.

21. The image processing device set forth in claim 20, wherein said image extracting means include:

means for obtaining image information of an extracted human face domain; and means for detecting, as numerical information, facial characteristics from the image information;

wherein said image extracting means, based on the numerical information, extract the partial image from the obtained image such that a facial portion contained in the human face domain has a predetermined size and position.

22. The image processing device set forth in claim 21, wherein:

said numerical information is at least one of facial width, vertical axis of symmetry, vertical position of eyes, vertical position of nose, and vertical position of mouth.

23. The image processing device set forth in claim 14, wherein:

when said point indicating means indicate a point in a position other than the center of the specified object domain present in the obtained image, said domain setting means set a first provisional domain containing the point indicated by said point indicating means, and a second provisional domain exclusive of the first provisional domain, and incrementally change sizes of the first and second provisional domains; and said image extracting means, based on a separability series obtained by incrementally changing the sizes and positions of the first and second provisional windows, extract the partial image from the obtained image so as to contain the specified object domain, which is present in the obtained image and which contains the point indicated by said point indicating means.

24. The image processing device set forth in claim 23, wherein:

said image extracting means sets a further provisional domain in part of the partial image extracted so as to contain the specified object domain, obtain image information of the further provisional domain, and, based on the image information, extract a domain, smaller than the partial image, which contains the specified object domain.

25. The image processing device set forth in claim 24, wherein:

when the image information obtained is pixel distribution information, said image extracting means calculate a probability density function from the distribution information, and, by applying the probability density function to the partial image, extract a domain, smaller than the partial image, which contains the specified object domain.

26. The image processing device set forth in claim 23, wherein:

the specified object domain is a human face domain.

27. The image processing device set forth in claim 26, wherein said image extracting means include:

means for obtaining image information of an extracted human face domain; and means for detecting, as numerical information, facial characteristics from the image information;

wherein said image extracting means, based on the numerical information, extract the partial image from the obtained image such that a facial portion contained in the human face domain has a predetermined size and position.

28. The image processing device set forth in claim 27, wherein:

said numerical information is at least one of facial width, vertical axis of symmetry, vertical position of eyes, vertical position of nose, and vertical position of mouth.

29. The image processing device set forth in claim 14, wherein:

said domain setting means incrementally change not only the sizes and positions, but also the shapes of the first and second provisional domains; and said image extracting means, based on a separability series obtained by incrementally changing the sizes, positions, and shapes of the first and second provisional windows, extract the partial image from the obtained image so as to contain the specified object domain, which is present in the obtained image and which contains the point indicated by said point indicating means.

30. The image processing device set forth in claim 29, wherein:

the second provisional domain surrounds the first provisional domain, an inner boundary of the second provisional domain being in contact with an outer boundary of the first provisional domain; and said domain setting means include means for changing the shape of the second provisional domain by modifying the outer boundary of the second provisional domain with the first provisional domain in a fixed state.

31. An image processing device which extracts from an image obtained from outside said image processing device a partial image containing a specified object domain for extraction, comprising:

image extraction processing means, which set two mutually exclusive provisional domains in the obtained image, and extract the partial image based on separability of the two provisional domains, wherein said image extraction processing means further include memory means which store the obtained image; and when the obtained image is a moving image made up of a series of electronic images, said image extraction processing means read out, as an image in question, a given image of the series of images stored in the memory means; extract a partial image from the image in question such that a specified object domain present in the image in question is contained in the partial image; set in the image in question a pair of windows as initial windows for the next image in the series of obtained images, change the sizes and positions of the provisional domains to obtain various image information; and use the image information to determine the most suitable pair of windows.

32. The image processing device set forth in claim 31, wherein:

said image extracting means set a further provisional domain in part of the partial image extracted so as to contain the specified object domain, obtain information of the further provisional domain, and, based on the image information, extract a domain, smaller than the partial image, which contains the specified object domain.

33. The image processing device set forth in claim 31, wherein:

the specified object domain in the series of electronic images stored in said memory means is a human face domain.

34. The image processing device set forth in claim 31, further comprising:

point indicating means which indicate a given point in the obtained image;

wherein said image extraction processing means include:
  means which, when the obtained image is a moving image made up of a series of electronic images, and when the image extraction processing means read out, as an image in question, a given image of the series of images stored in the memory means and said point indicating means indicate a point in the center of the specified object domain present in the image in question, set a first provisional domain containing the indicated point and a second provisional domain exclusive of the first provisional domain;
  means for calculating separability of the specified object domain and the first and second provisional domains based on image information of the first and second provisional domains; and
  means which, based on a separability series obtained by incrementally changing the sizes of the first and second provisional domains, extract the partial image from the image in question such that the specified object domain, containing at its own center the point indicated by said point indicating means, falls in the center of the partial image;
  wherein said image extraction processing means, using a pair of windows made up of the two provisional domains as initial windows for the next image in the series of obtained images, change size and position of the provisional domains to obtain various image information, and use the image information to determine the most suitable pair of windows.

35. The image processing device set forth in claim 34, wherein:
  said image extracting means sets a further provisional domain in part of the partial image extracted so as to contain the specified object domain, obtain image information of the further provisional domain, and, based on the image information, extract a domain, smaller than the partial image, which contains the specified object domain.

36. The image processing device set forth in claim 34, wherein:
  the specified object domain in the series of electronic images stored in said memory means is a human face domain.

37. The image processing device set forth in claim 31, further comprising:
  point indicating means which indicate a given point in the obtained image;
  wherein said image extraction processing means include:
    memory means which store the obtained image;
    means which, when the obtained image is a moving image made up of a series of electronic images, and when said image extraction processing means read out, as an image in question, a given image of the series of images stored in the memory means and said point indicating means indicate a given point in the specified object domain present in the image in question, set a first provisional domain containing the indicated point and a second provisional domain exclusive of the first provisional domain;
    means for calculating separability of the specified object domain and the first and second provisional domains based on image information of the first and second provisional domains; and
    image extracting means, which, based on a separability series obtained by incrementally changing the sizes of the first and second provisional domains, extract the partial image from the image in question such that the partial image contains the specified object domain, which is present in the obtained image and contains the point indicated by said point indicating means;
  wherein said image extraction processing means, using a pair of windows made up of the two provisional domains as initial windows for the next image in the series of obtained images, change the sizes and positions of the provisional domains to obtain various image information, and use the image information to determine the most suitable pair of windows.

38. The image processing device set forth in claim 37, wherein:
  when the image information obtained is pixel distribution information, said image extracting means calculate a probability density function from the distribution information, and, by applying the probability density function to the partial image, extract a domain, smaller than the partial image, which contains the specified object domain.

39. The image processing device set forth in claim 38, wherein:
  said image extracting means set a further provisional domain in part of the partial image extracted so as to contain the specified object domain, obtain image information of the further provisional domain, and, based on the image information, extract a domain, smaller than the partial image, which contains the specified object domain.

40. The image processing device set forth in claim 37, wherein:
  the specified object domain in the series of electronic images stored in said memory means is a human face domain.

41. The image processing device set forth in claim 40, wherein said image extracting means include:
  means for obtaining image information of an extracted human face domain; and
  means for detecting, as numerical information, facial characteristics from the image information;
  wherein said image extracting means, based on the numerical information, extract the partial image from the obtained image such that a facial portion contained in the human face domain has a predetermined size and position.

42. The image processing device set forth in claim 41, wherein:
  said numerical information is at least one of facial width, vertical axis of symmetry, vertical position of eyes, vertical position of nose, and vertical position of mouth.

43. A computer-readable recording medium which records an image extraction processing program for causing a computer to execute processing including the steps of:
  setting two mutually exclusive provisional domains in an obtained image;
  extracting a specified object domain based on image information of the provisional domains,
  wherein the step of extracting a specified object domain comprises:
    obtaining a separability series by incrementally changing the sizes of the two provisional domains, the sizes of the two provisional domains being changed by setting the two provisional domains in the obtained image to initially have sizes smaller than a size of the obtained image and then successively increasing the sizes of the two provisional domains, while keeping their centers fixed, until they exceed limits of a screen of the obtained image.

44. A computer-readable medium which records an image extraction processing program for causing a computer to execute processing including the steps of:

setting two mutually exclusive provisional domains in an obtained image;

obtaining image information of the respective provisional domains;

calculating separability of the provisional domains based on the image information;

extracting a partial image from the obtained image such that a specified object domain present in the obtained image is contained in the partial image, wherein the sizes of the two provisional domains are incrementally changed to obtain a separability series and the partial image is extracted based on the separability series, and wherein the sizes of the two provisional domains are changed by setting the two provisional domains in the obtained image to initially have sizes smaller than a size of the obtained image and then successively increasing the sizes of the two provisional domains, while keeping their centers fixed, until they exceed limits of a screen of the obtained image.

45. A computer-readable recording medium which records an image extraction processing program for causing a computer to execute processing including the steps of:

when a point at a center of a specified object domain present in an obtained image is indicated by a user, setting a first provisional domain containing the indicated point and a second provisional domain exclusive of the first provisional domain;

calculating separability of the first and second provisional domains based on image information of the first and second provisional domains; and based on a separability series obtained by incrementally changing the sizes of the first and second provisional domains, extracting a partial image from the obtained image such that the specified object domain, which is present in the obtained image and which contains the indicated point at its own center, falls in the center of the partial image.

46. A computer-readable recording medium which records an image extraction processing program for causing a computer to execute processing including the steps of:

when a point other than a center of a specified object domain present in an obtained image is indicated by a user, setting a first provisional domain containing the indicated point and a second provisional domain exclusive of the first provisional domain, calculating separability of the first and second provisional domains based on image information of the first and second provisional domains, and based on a separability series obtained by incrementally changing the sizes and positions, or the sizes, positions, and shapes of provisional domains, extracting a partial image from the obtained image so as to contain the specified image domain, which is present in the obtained image, and which contains the indicated point.

47. A computer-readable recording medium which records an image extraction processing program for causing a computer to execute processing including the steps of:

when a stored obtained image is a moving image made up of a series of electronic images, reading out a given image of the series of stored images as an image in question;

extracting a partial image from the image in question so as to contain a specified object domain present in the image in question;

setting in the image in question a pair of windows made up of two provisional domains; and using the pair of windows made up of the two provisional domains as initial windows for the next image in the series of obtained images, changing the sizes and positions of the provisional domains to obtain various image information, and using the image information to determine the most suitable pair of windows.

48. A computer-readable recording which records an image extraction processing program for causing a computer to execute processing including the steps of:

when an obtained image stored in memory means is a moving image made up of a series of electronic images, and when a given image of the stored series of images is read out as an image in question and a point in the center of a specified object domain present in the image in question is indicated, setting a first provisional domain containing the indicated point and a second provisional domain exclusive of the first provisional domain;

calculating separability of the specified object domain and the first and second provisional domains based on image information of a pair of windows made up of the first and second provisional domains;

based on a separability series obtained by incrementally changing the sizes of the first and second provisional domains, extracting a partial image from the image in question such that the specified object domain, containing the indicated point at its own center, falls in the center of the partial image;

setting in the image in question a pair of windows made up of two provisional domains; and using the pair of windows made up of the two provisional domains as initial windows for the next image in the series of obtained images, changing size and position of the provisional domains to obtain various image information, and using the image information to determine the most suitable pair of windows.

49. A computer-readable recording medium which records an image extraction processing program for causing a computer to execute processing including the steps of:

when a stored obtained image is a moving image made up of a series of electronic images, and when a given image of the stored series of images is read out as an image in question and a given point in a specified object domain present in the image in question is indicated, setting a first provisional domain containing the indicated point and a second provisional domain exclusive of the first provisional domain;

calculating separability of the specified object domain and the first and second provisional domains based on image information of the first and second provisional domains;

based on a separability series obtained by incrementally changing the sizes and positions of the first and second provisional domains, extracting a partial image from the image in question such that the specified object domain, which is present in the obtained image and which contains the indicated point, falls in the center of the partial image;

setting in the image in question a pair of windows made up of two provisional domains; and using the pair of windows made up of the two provisional domains as initial windows for the next image in the series of obtained images, changing the sizes of the provisional domains to obtain various image information, and using the image information to determine the most suitable pair of windows.

50. An image processing method comprising:

(a) setting a window comprising first and second mutually exclusive provisional domains in a base image;

(b) calculating separability of the first provisional domain and the second provisional domain based on image information contained in the respective domains;

(c) increasing the size of the window;

(d) repeating steps (b) and (c) until the size of the window exceeds a predetermined window size;

(e) determining whether the window contains a specified object domain based on the calculated separabilities; and (f) extracting a partial image containing the specified object domain from the base image if step (e) determines that the window contains a specified object domain.

51. The image processing method set forth in claim 50, wherein the predetermined window size is based on the extent of the base image.

52. The image processing method as set forth in claim 50, wherein the second provisional domain surrounds the first provisional domain, an inner boundary of the second provisional domain contacting an outer boundary of the first provisional domain.

53. The image processing method as set forth in claim 50, wherein steps (a)–(f) are repeated for each pixel of the base image.

54. The image processing method as set forth in claim 50, wherein steps (a)–(f) are performed for pixels of the base image specified using a coordinate indicating device.

55. The image processing method as set forth in claim 50, further comprising:

(g) setting a further provisional domain in part of the partial image extracted in step (f);

(h) obtaining image information of the further provisional domain; and (i) based on the image information, extracting a domain, smaller than the partial image, which contains the specified object domain.

56. The image processing method as set forth in claim 55, wherein the image information is pixel distribution information.

57. A computer-readable medium having computer-executable instructions for performing the steps recited in claim 55.

58. A computer-readable medium having computer-executable instructions for performing the steps recited in claim 50.

* * * * *